(12) United States Patent
Rodriguez

(10) Patent No.: US 9,118,771 B2
(45) Date of Patent: Aug. 25, 2015

(54) INTUITIVE COMPUTING METHODS AND SYSTEMS

(71) Applicant: Digimarc Corporation, Beaverton, OR (US)

(72) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 58 days.

(21) Appl. No.: 13/790,607

(22) Filed: Mar. 8, 2013

(65) Prior Publication Data

US 2013/0324161 A1 Dec. 5, 2013

Related U.S. Application Data

(60) Division of application No. 13/708,434, filed on Dec. 7, 2012, which is a division of application No. 13/401,332, filed on Feb. 21, 2012, now Pat. No. 8,422,994, which is a division of application No.

(Continued)

(51) Int. Cl.
*H04M 1/725* (2006.01)
*G01C 21/20* (2006.01)
(Continued)

(52) U.S. Cl.
CPC ........... *H04M 1/72522* (2013.01); *G01C 21/00* (2013.01); *G01C 21/20* (2013.01); *G01C 21/36* (2013.01); *G06F 3/005* (2013.01); *G06F 3/011* (2013.01); *G06F 3/023* (2013.01); *G06F 3/04817* (2013.01); *G06F 3/04842* (2013.01);
(Continued)

(58) Field of Classification Search
USPC .......................... 455/456.1; 705/14.4; 707/736
See application file for complete search history.

(56) References Cited

U.S. PATENT DOCUMENTS 6,738,494 B1 5/2004 Savakis et al.
7,627,477 B2 12/2009 Wang et al.
(Continued)

FOREIGN PATENT DOCUMENTS

WO WO2006025797 3/2006
WO WO2010022185 2/2010

OTHER PUBLICATIONS

Baldzer, et al, Location-aware mobile multimedia applications on the Niccimon platform, 2nd Symposium on Informationssysteme fur Mobile Anwendungen IMA, 2004.

(Continued)

*Primary Examiner* — Diane Mizrahi
(74) *Attorney, Agent, or Firm* — Digimarc Corporation

(57) ABSTRACT

A smart phone senses audio, imagery, and/or other stimulus from a user's environment, and acts autonomously to fulfill inferred or anticipated user desires. In one aspect, the detailed technology concerns phone-based cognition of a scene viewed by the phone's camera. The image processing tasks applied to the scene can be selected from among various alternatives by reference to resource costs, resource constraints, other stimulus information (e.g., audio), task substitutability, etc. The phone can apply more or less resources to an image processing task depending on how successfully the task is proceeding, or based on the user's apparent interest in the task. In some arrangements, data may be referred to the cloud for analysis, or for gleaning. Cognition, and identification of appropriate device response(s), can be aided by collateral information, such as context. A great number of other features and arrangements are also detailed.

24 Claims, 18 Drawing Sheets

Related U.S. Application Data

12/712,176, filed on Feb. 24, 2010, now Pat. No. 8,121, 618, which is a continuation-in-part of application No. 12/640,386, filed on Dec. 17, 2009, now Pat. No. 8,175,617.

(60) Provisional application No. 61/255,817, filed on Oct. 28, 2009, provisional application No. 61/261,028, filed on Nov. 13, 2009, provisional application No. 61/263,318, filed on Nov. 20, 2009, provisional application No. 61/264,639, filed on Nov. 25, 2009, provisional application No. 61/266,965, filed on Dec. 4, 2009, provisional application No. 61/285,726, filed on Dec. 11, 2009.

(51) Int. Cl.
| | |
|---|---|
| *G01C 21/36* | (2006.01) |
| *G06F 3/01* | (2006.01) |
| *G06Q 10/10* | (2012.01) |
| *G01C 21/00* | (2006.01) |
| *G06F 3/00* | (2006.01) |
| *G09G 5/00* | (2006.01) |
| *H04N 5/225* | (2006.01) |
| *G06K 9/62* | (2006.01) |
| *H04W 4/02* | (2009.01) |
| *G06F 3/023* | (2006.01) |
| *G06F 3/0481* | (2013.01) |
| *G06F 3/0484* | (2013.01) |
| *G06F 3/0488* | (2013.01) |
| *G06T 19/00* | (2011.01) |
| *H04N 5/232* | (2006.01) |

(52) U.S. Cl.
CPC ........ *G06F 3/04847* (2013.01); *G06F 3/04886* (2013.01); *G06K 9/6267* (2013.01); *G06Q 10/10* (2013.01); *G06T 19/006* (2013.01); *G09G 5/00* (2013.01); *H04N 5/225* (2013.01); *H04N 5/23229* (2013.01); *H04N 5/23245* (2013.01); *H04W 4/02* (2013.01); *G06T 2200/24* (2013.01)

(56) References Cited

U.S. PATENT DOCUMENTS

| | | | |
|---|---|---|---|
| 7,787,697 | B2 | 8/2010 | Ritzau et al. |
| 8,090,579 | B2 | 1/2012 | Debusk et al. |
| 8,165,409 | B2 | 4/2012 | Ritzau et al. |
| 8,229,160 | B2 | 7/2012 | Rosenblatt |
| 8,422,994 | B2 * | 4/2013 | Rhoads et al. ............... 455/411 |
| 8,886,222 | B1 | 11/2014 | Rodriguez et al. |
| 2005/0283379 | A1 | 12/2005 | Reber |
| 2007/0070069 | A1 | 3/2007 | Samarasekera et al. |
| 2008/0242317 | A1 | 10/2008 | Abhyanker |
| 2009/0002497 | A1 | 1/2009 | Davis |
| 2009/0327272 | A1 | 12/2009 | Koivunen |
| 2010/0260426 | A1 | 10/2010 | Huang et al. |

OTHER PUBLICATIONS

Belimpasakis, et al, Experience explorer: a life-logging platform based on mobile context collection, Third IEEE Int'l Conf. on Next Generation Mobile Applications, Services and Technologies, 2009.
Bell, et al, A Digital Life, Scientific American, Mar. 2007.
Clarkson et al, Extracting Context from Environmental Audio, Second Intl Symp. on Wearable Computers, 1998.
Clarkson et al, Auditory Context Awareness via Wearable Computing, MIT Media Lab, 1998.
Godsmark, et al, A blackboard architecture for computational auditory scene analysis, Speech Communication 27.3, 1999.
Ismail, et al, A framework for sharing and storing serendipity moments in human life memory, First IEEE Int'l Conf. on Ubi-Media Computing, 2008.
Kubota, et al, 3D auditory scene visualizer with face tracking: Design and implementation for auditory awareness compensation, Second IEEE Int'l Symp. on Universal Communication, 2008.
Lim, et al, The development of an ubiquitous learning system based on audio augmented reality, IEEE Int'l Conf. on Control, Automation and Systems, 2007.
Lu, et al, SoundSense: scalable sound sensing for people-centric applications on mobile phones, Proc. 7th Int'l Conf. on Mobile Systems, Applications and Services, ACM, 2009.
McGookin, et al, Eyes-free overviews for mobile map applications, Proc. 11th Int'l Conf. on Human-Computer Interaction with Mobile Devices and Services, 2009.
Puangpakisiri, et al, High level activity annotation of daily experiences by a of a wearable device and Wi-Fi based positioning system, IEEE Int'l Conf on Multimedia and Expo, 2008.
Sage, Shazam Plays Nice with Twitter and, For Some Reason, Google Maps, Intomobile web site, Jun. 24, 2009.
Prosecution excerpts from U.S. Appl. No. 14/337,607, filed Jul. 22, 2014, including Preliminary Amendment dated Jul. 29, 2014, and USPTO Action dated Dec. 4, 2014.
Mike Schramm, Shazan update to 1.7, adds location awareness (Jun. 19, 2009), available to https://web.archive.org/web/*/http://ww.tuaw.com/2009/06/19/Shazam-update-to-1-7-adds-location-awareness/.
Press Release, Shazam Launches Enhanced Music Discovery Application on Apple App Store (Jun. 24, 2009), available https://web.archive.org/web20141115202009/http://news.shazam.com/pressreleases/shazam-launches-enhanced-music-discovery-application-on-apple-app-store-890476.
Announcing Google Maps API V3, http://googlegeodevelopers.blogspot.com/2009/05/announcing-google-maps-api-v3.html.

* cited by examiner

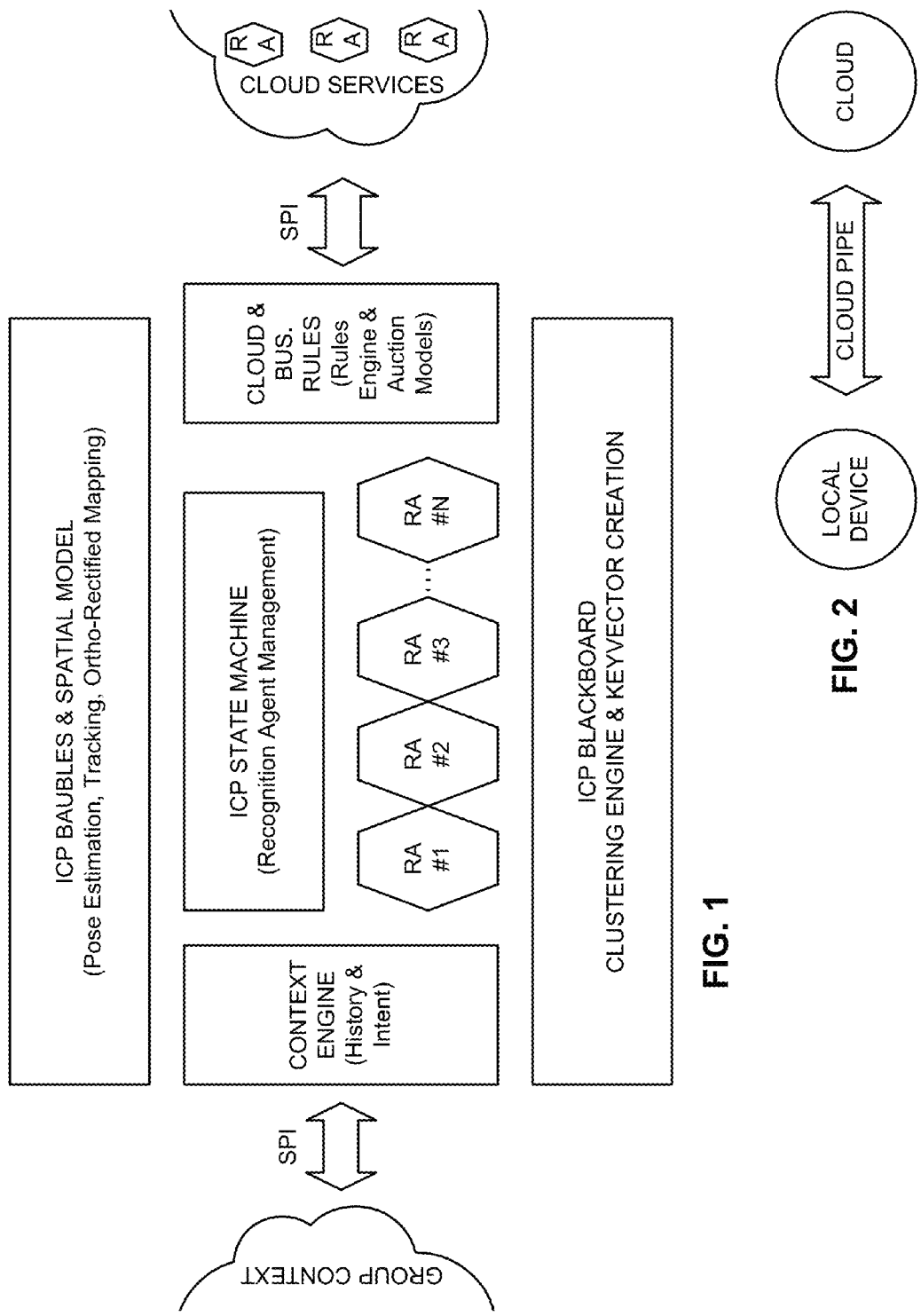

FIG. 3

| | REQUIREMENTS | COGNITIVE PROCESS | | | | | | | ECOSYSTEM |
|---|---|---|---|---|---|---|---|---|---|
| | | Perceive Features | Perceive Forms | Association | Problem Definition | Problem Solving Status | Determine Solutions | Initiate Actions & Responses | Mgt Tools (QOS, Billing, etc.) |
| Context | User identity, preferences, history, metadata | ICP CONTEXT ENGINE | | | | | | | |
| UI | Rendering & feedback | | | | ICP BAUBLES & SPATIAL MODEL | | | | |
| Orientation | Global sampling | ICP BLACKBOARD & KEY VECTORS | | | | | | | |
| | Data alignment & feature extraction | | | | | | | | |
| | Patchwork of features | | | | | | | | |
| | Interframe features | | | | | | | | |
| RA Mgt | Resource, detection and RA state | ICP STATE MACHINE & RECOGNITION AGENT MANAGEMENT | | | | | | | |
| | Composition of services from RAs | RECOGNITION AGENTS | | | | | | | |
| Ecosys. Mgt | Cloud registration, association & session operations with RA | CLOUD MANAGEMENT & BUSINESS RULES | | | | | | | |
| | RA develop and licensing platforms | ICP BUS | | | | | | | |

FIG. 5

| | Infinite Symmetric Exponential Filter (Gaussian) | Canny (Gaussian) | Marr-Hildreth (Laplacian of Gaussian) | Sobel (Gradient) | Kirch (Gradient) | Laplacian (Zero crossing) |
|---|---|---|---|---|---|---|
| Infinite Symmetric Exponential Filter | X | | | | | |
| Canny | 95 | X | 90 | 70 | 70 | 80 |
| Marr-Hildreth | | 90 | X | | | |
| Sobel | | | | X | | |
| Kirch | | | | | X | |
| Laplacian | | | | | | X |

FIG. 5A

| | Infinite Symmetric Exponential Filter | Laplacian |
|---|---|---|
| Canny | 95 | 80 |

FIG. 10

| STATE MACHINE CADENCE | QUERY/ CONTEXT | SENSOR (e.g., pixels) | COMMUNICATION | USER INTERFACE |
|---|---|---|---|---|
| REFLEXIVE 0 to 0.5 seconds Refresh every .05s | Context: * User ID * Camera Type * Resolution | Lens Cap On? Segmentation Flow Focus | Ping | 2D Mapping Analog Baubles Bauble Acknowl- edgement |
| CONDITIONED 0.5 to 1 seconds Refresh every .5s | Agent Inventory Device State Geolocation History User Feedback Cross-Association between Agents | Orientation Parsing Rudimentary Operations Common to Agents | Ping Agent Servers Announce Entry into Marketplace Quality of Service | Agent Baubles Initiate Agent Session Verbosity |
| INTUITED 1 to 10 seconds | Semantic Extraction | Enrich Keyvectors (KVs) Tuned for Agents Support Orthographic Mapping | Shipping KVs to intended Cloud Recipient (Agent Servers) Expect Early Turn- around from Cloud Rules Engine | Fully Interactive Bauble Session (Menus, Windows) 3$^{rd}$ Party Libraries |
| DEEP SOLUTION 5 + seconds | Competition for Services Social Context * History * Groups * Etc. Associations | Optimize KVs Based on Cloud Feedback Unification of KVs for Steady State of Cloud + Agents | Comm – per session Manage Quality of Service Rules Engine | Fully Realized & Monetized UI |

| | INTENT | HISTORY |
|---|---|---|
| Individual User | What does the user want to do? | What has the user done in the past? |
| Group | What does the group want to do under similar circumstances? | What has the group done in the past? |

QUEUE FOR RECOGNITION AGENT SERVICES

| SERVICE | RELEVANCE SCORE | COST SCORE | NET | CONDITIONS | BIAS |
|---|---|---|---|---|---|
| SERVICE 19F(KV415) | 46 | {37,64,15} | -70 | ... | {100,110,200} |
| SERVICE 2E7(KV755,KV745) | 14 | {3,99,4} | -92 |  | {150,110,100} |
| SERVICE 1E4(KV485) | 12 | {12,1,2} | -3 |  | {100,100,100} |
| SERVICE 19F(KV416) | 11 | {57,12,6} | -64 | ... | {100,110,120} |
| SERVICE 2D1(KV722) | 8 | {24,1,1} | -18 |  | {105,100,200} |
| SERVICE 191() | 6 | {8,1,2} | -5 |  | {100,100,110} |
| SERVICE 32F(KV815) | 4 | {4,3,1} | -4 | ...... | {100,110,105} |
| SERVICE 154(KV416) | 3 | {2,1,1} | -1 |  | {100,107,100} |
| ... | | | | | ... |

FIG. 15

RESOURCE TRACKING

|  | CPU | GPU | POWER | B'WIDTH | MEMORY |
|---|---|---|---|---|---|
| MAX | 100 | 200 | 50 | 250 | 300 |
| USED | 93 | 80 | 46 | 100 | 250 |
| AVAILABLE | 7 | 120 | 4 | 150 | 50 |

FIG. 16

INTUITIVE COMPUTING METHODS AND SYSTEMS

RELATED APPLICATION DATA

This application is a division of application Ser. No. 13/708,434, filed Dec. 7, 2012 (now published as 20130128060), which is a division of application Ser. No. 13/401,332, filed Feb. 21, 2012 (now U.S. Pat. No. 8,422, 994), which is a division of application Ser. No. 12/712,176, filed Feb. 24, 2010 (now U.S. Pat. No. 8,121,618), which is a continuation-in-part of application Ser. No. 12/640,386, filed Dec. 17, 2009 (now U.S. Pat. No. 8,175,617), which claims priority to provisional applications 61/255,817, filed Oct. 28, 2009; 61/261,028, filed Nov. 13, 2009; 61/263,318, filed Nov. 20, 2009; 61/264,639, filed Nov. 25, 2009; 61/266,965, filed Dec. 4, 2009; and 61/285,726, filed Dec. 11, 2009.

This specification details a variety of extensions and improvements to technology detailed in the assignee's previous patents and patent applications, including U.S. Pat. No. 6,947,571, and application Ser. No. 12/271,772, filed Nov. 14, 2008 (now published as 20100119208); Ser. No. 12/490, 980, filed Jun. 24, 2009 (now published as 20100205628); 61/234,542, filed Aug. 17, 2009; and PCT application PCT/US09/54358, filed Aug. 19, 2009 (now published as WO2010022185).

The principles and teachings from that earlier work are intended to be applied in the context of the presently-detailed arrangements, and vice versa. (The disclosures of these previous patents and applications are incorporated herein by reference.)

TECHNICAL FIELD

The present specification concerns a variety of technologies; most concern enabling smart phones and other mobile devices to respond to the user's environment, e.g., by serving as intuitive hearing and seeing devices.

INTRODUCTION

Cell phones have evolved from single purpose communication tools, to multi-function computer platforms. "There's an ap for that" is a familiar refrain.

Over a hundred thousand applications are available for smart phones—offering an overwhelming variety of services. However, each of these services must be expressly identified and launched by the user.

This is a far cry from the vision of ubiquitous computing, dating back over twenty years, in which computers demand less of our attention, rather than more. A truly "smart" phone would be one that takes actions—autonomously—to fulfill inferred or anticipated user desires.

A leap forward in this direction would be to equip cell phones with technology making them intelligent seeing/hearing devices—monitoring the user's environment and automatically selecting and undertaking operations responsive to visual and/or other stimulus.

There are many challenges to realizing such a device. These include technologies for understanding what input stimulus to the device represents, for inferring user desires based on that understanding, and for interacting with the user in satisfying those desires. Perhaps the greatest of these is the first, which is essentially the long-standing problem of machine cognition.

Consider a cell phone camera. For each captured frame, it outputs a million or so numbers (pixel values). Do those numbers represent a car, a barcode, the user's child, or one of a million other things?

Hypothetically, the problem has a straightforward solution. Forward the pixels to the "cloud" and have a vast army of anonymous computers apply every known image recognition algorithm to the data until one finally identifies the depicted subject. (One particular approach would be to compare the unknown image with each of the billions of images posted to web-based public photo repositories, such as Flickr and Facebook. After finding the most similar posted photo, the descriptive words, or "meta-data," associated with the matching picture could be noted, and used as descriptors to identify the subject of the unknown image.) After consuming a few days or months of cloud computing power (and megawatts of electrical power), an answer would be produced.

Such solutions, however, are not practical—neither in terms of time or resources.

A somewhat more practical approach is to post the image to a crowd-sourcing service, such as Amazon's Mechanical Turk. The service refers the image to one or more human reviewers, who provide descriptive terms back to the service, which are then forwarded back to the device. When other solutions prove unavailing, this is a possible alternative, although the time delay is excessive in many circumstances.

In one aspect, the present specification concerns technologies that can be employed to better address the cognition problem. In one embodiment, image processing arrangements are applied to successively gain more and better information about the input stimulus. A rough idea of an image's content may be available in one second. More information may be available after two seconds. With further processing, still more refined assessments may be available after three or four seconds, etc. This processing can be interrupted at any point by an indication—express, implied or inferred—that the user does not need such processing to continue.

If such processing does not yield prompt, satisfactory results, and the subject of the imagery continues to be of interest to the user (or if the user does not indicate otherwise), the imagery may be referred to the cloud for more exhaustive, and lengthy, analysis. A bookmark or the like may be stored on the smart phone, allowing the user to check back and learn the results of such further analysis. Or the user can be alerted if such further analysis reaches an actionable conclusion.

Cognition, and identification of appropriate device response(s), can be aided by collateral information, such as context. If the smart phone knows from stored profile information that the user is a 35 year old male, and knows from GPS data and associated map information that the user is located in a Starbucks in Portland, and knows from time and weather information that it is a dark and snowy morning on a workday, and recalls from device history that in several prior visits to this location the user employed the phone's electronic wallet to buy coffee and a newspaper, and used the phone's browser to view websites reporting football results, then the smart phone's tasks are simplified considerably. No longer is there an unbounded universe of possible input stimuli. Rather, the input sights and sounds are likely to be of types that normally would be encountered in a coffee shop on a dark and snowy morning (or, stated conversely, are not likely to be, e.g., the sights and sounds that would be found in a sunny park in Tokyo). Nor is there an unbounded universe of possible actions that are appropriate in response to such sights and sounds. Instead, candidate actions are likely those that would be relevant to a 35 year old, football-interested, coffee-drinking user on his way to work in Portland (or, stated conversely, are not likely to be the actions relevant, e.g., to an elderly woman sitting in a park in Tokyo).

Usually, the most important context information is location. Second-most relevant is typically history of action (informed by current day of week, season, etc). Also important is information about what other people in the user's social group, or the user's demographic group, have done in similar circumstances. (If the last nine teenage girls who paused at a particular location in Macys captured an image of a pair of boots on an aisle-end display, and all were interested in learning the price, and two of them were also interested in learning what sizes are in stock, then the image captured by the tenth teenage girl pausing at that location is also probably of the same pair of boots, and that user is likely interested in learning the price, and perhaps the sizes in stock.) Based on such collateral information, the smart phone can load recognition software appropriate for statistically likely stimuli, and can prepare to undertake actions that are statistically relevant in response.

In one particular embodiment, the smart phone may have available hundreds of alternative software agents—each of which may be able to perform multiple different functions, each with different "costs" in terms, e.g., of response time, CPU utilization, memory usage, and/or other relevant constraints. The phone can then undertake a planning exercise, e.g., defining an N-ary tree composed of the various available agents and functions, and navigating a path through the tree to discern how to perform the desired combination of operations at the lowest cost.

Sometimes the planning exercise may not find a suitable solution, or may find its cost to be prohibitive. In such case the phone may decide not to undertake certain operations—at least not at the present instant. The phone may do nothing further about such task, or it may try again a moment later, in case additional information has become available that makes a solution practical. Or it may simply refer to the data to the cloud—for processing by more capable cloud resources, or it may store the input stimulus to revisit and possibly process later.

Much of the system's processing (e.g., image processing) may be speculative in nature—tried in expectation that it might be useful in the current context. In accordance with another aspect of the present technology, such processes are throttled up or down in accordance with various factors. One factor is success. If a process seems to be producing positive results, it can be allocated more resources (e.g., memory, network bandwidth, etc.), and be permitted to continue into further stages of operation. If its results appear discouraging, it can be allocated less resources—or stopped altogether. Another factor is the user's interest in the outcome of a particular process, or lack thereof, which can similarly influence whether, and with what resources, a process is allowed to continue. (User interest may be express/explicit—e.g., by the user touching a location on the screen, or it may be inferred from the user's actions or context—e.g., by the user moving the camera to re-position a particular subject in the center of the image frame. Lack of user interest may be similar expressed by, or inferred from, the user's actions, or from the absence of such actions.) Still another factor is the importance of the process' result to another process that is being throttled up or down.

Once cognition has been achieved (e.g., once the subject of the image has been identified), the cell phone processor—or a cloud resource—may suggest an appropriate response that should be provided to the user. If the depicted subject is a barcode, one response may be indicated (e.g., look up product information). If the depicted subject is a family member, a different response may be indicated (e.g., post to an online photo album). Sometimes, however, an appropriate response is not immediately apparent. What if the depicted subject is a street scene, or a parking meter—what then? Again, collateral information sources, such as context, and information from natural language processing, can be applied to the problem to help determine appropriate responses.

The sensors of a smart phone are constantly presented with stimuli—sound to the microphone, light to the image sensor, motion to the accelerometers, magnetic fields to the magnetometer, ambient temperature to thermistors, etc., etc. Some of the stimulus may be important. Much is noise, and is best ignored. The phone, of course, has a variety of limited resources, e.g., CPU, battery, wireless bandwidth, dollar budget, etc.

Thus, in a further aspect, the present technology involves identifying what of the barrage of data to process, and balancing data processing arrangements for the visual search with the constraints of the platform, and other needs of the system.

In still another aspect, the present technology involves presentation of "baubles" on a mobile device screen, e.g., in correspondence with visual objects (or audible streams). User selection of a bauble (e.g., by a touch screen tap) leads to an experience related to the object. The baubles may evolve in clarity or size as the device progressively understands more, or obtains more information, about the object.

In early implementations, systems of the sort described will be relatively elementary, and not demonstrate much insight. However, by feeding a trickle (or torrent) of data back to the cloud for archiving and analysis (together with information about user action based on such data), those early systems can establish the data foundation from which templates and other training models can be built—enabling subsequent generations of such systems to be highly intuitive and responsive when presented with stimuli.

As will become evident, the present specification details a great number of other inventive features and combinations as well.

While described primarily in the context of visual search, it should be understood that principles detailed herein are applicable in other contexts, such as the processing of stimuli from other sensors, or from combinations of sensors. Many of the detailed principles have still much broader applicability.

Similarly, while the following description focuses on a few exemplary embodiments, it should be understood that the inventive principles are not limited to implementation in these particular forms. So, for example, while details such as blackboard data structures, state machine constructs, recognition agents, lazy execution, etc., etc., are specifically noted, none (except as may be particularly specified by issued claims) is required.

BRIEF DESCRIPTION OF THE DRAWINGS

FIG. 1 shows an embodiment employing certain aspects of the present technology, in an architectural view.

FIG. 2 is a diagram illustrating involvement of a local device with cloud processes.

FIG. 3 maps features of a cognitive process, with different aspects of functionality—in terms of system modules and data structures.

FIGS. 5, 5A and 6 show data structures that can be used in making composition of services decisions.

FIGS. 7 and 8 show aspects of planning models known from artificial intelligence, and employed in certain embodiments of the present technology.

FIG. 10 further details these four levels of processing for an illustrative implementation.

FIGS. 15 and 16 illustrate data relating to recognition agents and resource tracking, respectively.

DETAILED DESCRIPTION

Figure 4:
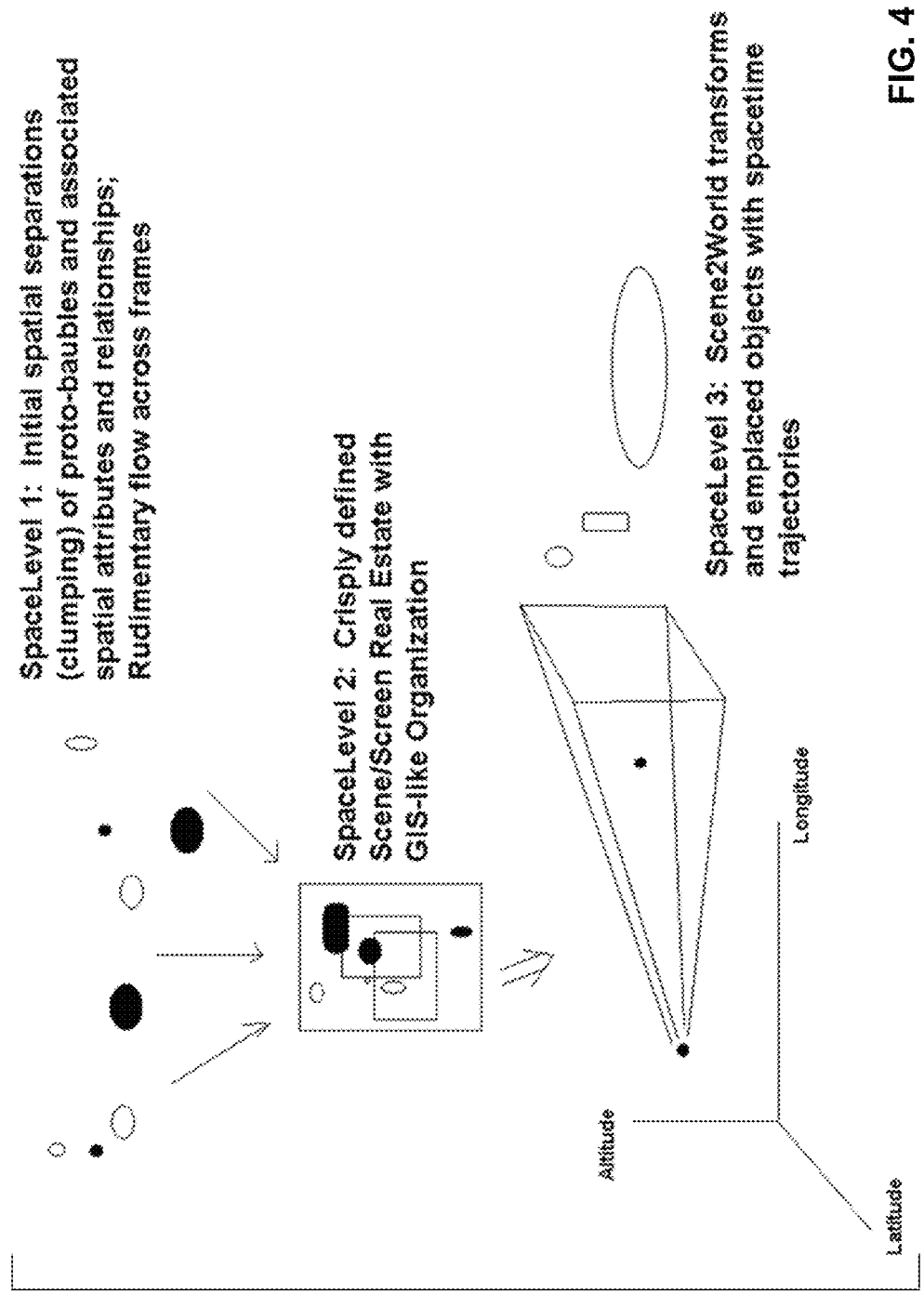
FIG. 4 illustrates different levels of spatial organization and understanding.

In many respects, the subject matter of this disclosure may be regarded as technologies useful in permitting users to interact with their environments, using computer devices. This broad scope makes the disclosed technology well suited for countless applications.

Due to the great range and variety of subject matter detailed in this disclosure, an orderly presentation is difficult to achieve. As will be evident, many of the topical sections presented below are both founded on, and foundational to, other sections. Necessarily, then, the various sections are presented in a somewhat arbitrary order. It should be recognized that both the general principles and the particular details from each section find application in other sections as well. To prevent the length of this disclosure from ballooning out of control (conciseness always being beneficial, especially in patent specifications), the various permutations and combinations of the features of the different sections are not exhaustively detailed. The inventors intend to explicitly teach such combinations/permutations, but practicality requires that the detailed synthesis be left to those who ultimately implement systems in accordance with such teachings.

It should also be noted that the presently-detailed technology builds on, and extends, technology disclosed in the earlier-cited patent applications. The reader is thus directed to those documents, which detail arrangements in which applicants intend the present technology to be applied, and that technically supplement the present disclosure.

Cognition, Disintermediated Search

Mobile devices, such as cell phones, are becoming cognition tools, rather than just communication tools. In one aspect, cognition may be regarded as activity that informs a person about the person's environment. Cognitive actions can include:

Perceiving features based on sensory input;
Perceiving forms (e.g., determining orchestrated structures);
Association, such as determining external structures and relations;
Defining problems;
Defining problem solving status (e.g., it's text: what can I do? A. Read it);
Determining solution options;
Initiating action and response;
Identification is generally the first, essential step in determining an appropriate response.

Seeing and hearing mobile devices are tools that assist those processes involved in informing a person about their environment.

Mobile devices are proliferating at an amazing rate. Many countries (including Finland, Sweden, Norway, Russia, Italy, and the United Kingdom) reportedly have more cell phones than people. Accordingly to the GSM Association, there are approximately 4 billion GSM and 3G phones currently in service. The upgrade cycle is so short that devices are replaced, on average, once every 24 months.

Accordingly, mobile devices have been the focus of tremendous investment. Industry giants such as Google, Microsoft, Apple and Nokia, have recognized that enormous markets hinge on extending the functionality of these devices, and have invested commensurately large sums in research and development. Given such widespread and intense efforts, the failure of industry giants to develop the technologies detailed herein is testament to such technologies' inventiveness.

"Disintermediated search," such as visual query, is believed to be one of the most compelling applications for upcoming generations of mobile devices.

In one aspect, disintermediated search may be regarded as search that reduces (or even eliminates) the human's role in initiating the search. For example, a smart phone may always be analyzing the visual surroundings, and offering interpretation and related information without being expressly queried.

In another aspect, disintermediated search may be regarded as the next step beyond Google. Google built a monolithic, massive system to organize all the textual information on the public web. But the visual world is too big, and too complex, for even Google to master. Myriad parties are bound to be involved—each playing a specialized role, some larger, some smaller. There will not be "one search engine to rule them all." (Given the potential involvement of countless parties, perhaps an alternative moniker would be "hyperintermediated search.")

Architectural View

FIG. 1 shows an embodiment employing certain principles of the present technology, in an architectural view. (It should be recognized that the division of functionality into blocks is somewhat arbitrary. Actual implementation may not follow the particular organization depicted and described.)

The ICP Baubles & Spatial Model component handles tasks involving the viewing space, the display, and their relationships. Some of the relevant functions include pose estimation, tracking, and ortho-rectified mapping in connection with overlaying baubles on a visual scene.

Baubles may be regarded, in one aspect, as augmented reality icons that are displayed on the screen in association with features of captured imagery. These can be interactive and user-tuned (i.e., different baubles may appear on the screens of different users, viewing the identical scene).

In some arrangements, baubles appear to indicate a first glimmer of recognition by the system. When the system begins to discern that there's something of potential interest—a visual feature—at a location on the display, it presents a bauble. As the system deduces more about the feature, the size, form, color or brightness of the bauble may change—making it more prominent, and/or more informative. If the user taps the bauble—signifying interest in the visual feature, the system's resource manager (e.g., the ICP State Machine) can devote disproportionately more processing resources to analysis of that feature of the image than other regions. (Information about the user's tap also is stored in a data store, in conjunction with information about the feature or the bauble, so that the user's interest in that feature may be recognized more quickly, or automatically, next time.)

When a bauble first appears, nothing may be known about the visual feature except that it seems to constitute a visually discrete entity, e.g., a brightish spot, or something with an edge contour. At this level of understanding, a generic bauble (perhaps termed a "proto-bauble") can be displayed, such as a small star or circle. As more information is deduced about the feature (it appears to be a face, or bar code, or leaf), then a bauble graphic that reflects that increased understanding can be displayed.

Baubles can be commercial in nature. In some environments the display screen could be overrun with different baubles, vying for the user's attention. To address this, there can be a user-settable control—a visual verbosity control—that throttles how much information is presented on the screen. In addition, or alternatively, a control can be provided that allows the user to establish a maximum ratio of commercial baubles vs. non-commercial baubles. (As with Google, collection of raw data from the system may prove more valuable in the long term than presenting advertisements to users.)

Desirably, the baubles selected for display are those that serve the highest value to the user, based on various dimensions of context. In some cases—both commercial and non-commercial—baubles may be selected based on auction processes conducted in the cloud.

Another GUI control can be provided to indicate the user's current interest (e.g., sightseeing, shopping, hiking, social, navigating, eating, etc.), and the presentation of baubles can be tuned accordingly.

The illustrated ICP Baubles & Spatial Model component may borrow from, or be built based on, existing software tools that serve related functions. One is the ARToolKit—a freely available set of software resulting from research at the Human Interface Technology Lab at the University of Washington (hitl<dot>Washington<dot>edu/artoolkit/), now being further developed by AR Toolworks, Inc., of Seattle (artoolworks<dot>com). Another related set of tools is MV Tools—a popular library of machine vision functions.

FIG. 1 shows just a few Recognition Agents (RA); there may be dozens or hundreds. These are the components that help recognize, and extract meaning from, pixels or other content. In one aspect, some RAs may be analogized to specialized search engines. One may search for bar codes; one may search for faces, etc.

As with baubles, there may be an aspect of competition involving RAs. That is, overlapping functionality may be offered by several different RAs from several different providers. The choice of which RA to use on a particular device in a particular context can be a function of user selection, third party reviews, cost, system constraints, re-usability of output data, and/or other criteria. Eventually, a Darwinian winnowing may occur, with those RAs that best meet users' needs becoming prevalent.

A smart phone vendor may initially provide the phone with a default set of RAs. Some vendors may maintain control of RA selection—a walled garden approach, while others may encourage user discovery of different RAs. Online marketplaces such as the Apple App Store may evolve to serve the RA market. Packages of RAs serving different customer groups and needs may emerge, e.g., some to aid people with limited vision (e.g., loaded with vision-aiding RAs, such as text-to-speech recognition), some catering to those who desire the simplest user interfaces (e.g., large button controls, non-jargon legends); some catering to outdoor enthusiasts (e.g., including a birdsong identification RA, a tree leaf identification RA); some catering to world travelers (e.g., including language translation functions, and location-based traveler services), etc. The system may provide a menu by which a user can cause the device to load different such sets of RAs at different times.

Some, or all, of the RAs may push functionality to the cloud, depending on circumstance. For example, if a fast data connection to the cloud is available, and the device battery is nearing exhaustion (or if the user is playing a game—consuming most of the device's CPU/GPU resources), then the local RA may just do a small fraction of the task locally (e.g., administration), and ship the rest to a cloud counterpart, for execution there.

As detailed elsewhere in this disclosure, the processor time and other resources available to RAs can be controlled in dynamic fashion—allocating more resources to those RAs that seem to merit it. A dispatcher component of the ICP state machine can attend to such oversight. The ICP state machine can also manage the division of RA operation between local RA components and cloud counterparts.

The ICP state machine can employ aspects modeled from the Android open source operating system (e.g., developer<dot>android<dot>com/guide/topics/fundamentals.html), as well as from the iPhone and Symbian SDKs.

To the right in FIG. 1 is the Cloud & Business Rules Component, which serves as an interface to cloud-relating processes. It can also perform administration for cloud auctions—determining which of plural cloud service providers performs certain tasks. It communicates to the cloud over a service provider interface (SPI), which can utilize essentially any communications channel and protocol.

Although the particular rules will be different, exemplary rules-based systems that can be used as models for this aspect of the architecture include the Movielabs Content Rules and Rights arrangement (e.g., movielabs<dot>com/CRR/), and the CNRI Handle System (e.g., handle<dot>net/).

To the left is a context engine which provides, and processes, context information used by the system (e.g., What is the current location? What actions has the user performed in the past minute? In the past hour? etc.). The context component can link to remote data across an interface. The remote data can comprise any external information, e.g., concerning activities, peers, social networks, consumed content, geography—anything that may relate the present user to others—such as a similar vacation destination. (If the device includes a music recognition agent, it may consult playlists of the user's Facebook friends. It may use this information to refine a model of music that the user listens to—also considering, e.g., knowledge about what online radio stations the user is subscribed to, etc.)

The context engine, and the cloud & business rules components, can have vestigial cloud-side counterparts. That is, this functionality can be distributed, with part local, and a counterpart in the cloud.

Cloud-based interactions can utilize many of the tools and software already published for related cloud computing by Google's App Engine (e.g., code<dot>Google<dot>com/appengine/) and Amazon's Elastic Compute Cloud (e.g., aws<dot>amazon<dot>com/ec2/).

At the bottom in FIG. 1 is the Blackboard and Clustering Engine.

The clustering engine groups items of content data (e.g., pixels) together in KeyVectors. KeyVectors can be roughly analogized as the audio-visual counterpart to text keywords—a grouping of elements that are input to a process to obtain related results.

Again, the earlier-referenced ARToolKit can provide a basis for certain of this functionality. Blackboard functionality can utilize the open source blackboard software GBBopen (gbbopen<dot>org).

Another open source implementation that runs on the Java Virtual Machine (and supports scripting in JavaScript) is the Blackboard Event Processor (code<dot>Google<dot>com/p/blackboardeventprocessor/).

Aspects of the foregoing are further detailed in the following and other sections of this specification.

Local Device & Cloud Processing

As conceptually represented by FIG. 2, disintermediated search should rely on strengths/attributes of the local device and of the cloud. (The cloud "pipe" also factors into the mix, e.g., by constraints including bandwidth and cost.)

The particular distribution of functionality between the local device and the cloud varies from implementation to implementation. In one particular implementation it is divided as follows:

Local Functionality:
  Context:
    User identity, preferences, history
    Context Metadata Processing (e.g., where am I? what direction am I pointing?)
  UI:
    On screen rendering & feedback (touch, buttons, audible, proximity, etc.)
  General Orientation:
    Global sampling; categorization without much parsing
    Data alignment and feature extraction
    Enumerated patchworks of features
    Interframe collections; sequence of temporal features
  Cloud Session Management:
    Registration, association & duplex session operations with Recognition Agent (RA)
  Recognition Agent (RA) Management:
    Akin to DLLs with specific functionality—recognizing specific identities and forms
    Resource state and detection state scalability
    Composition of services provided by Recognition Agents
    Development and licensing platform
Cloud Functionality:
  Business rules, session management, Recognition Agent control, etc.
  Lots of companies can contribute here, including Verisign, etc.

The presently-detailed technologies draw inspiration from diverse sources, including:
  Biological: Analogies to Human Visual System & higher level cognition models
  Signal Processing: Sensor Fusion
  Computer Vision: Image processing Operations (spatial & frequency domain)
  Computer Science: Composition of Services & Resource Management, Parallel Computing
  Robotics: Software models for autonomous interaction (PLAN, Gazebo, etc.)
  AI: Evaluate/Match/Execute Models, Blackboard, Planning Models, etc.
  Economics: Auction Models (Second Price Wins . . . )
  DRM: Rights Expression Languages & Business Rule engines
  Human Factors: UI, Augmented Reality,
  Mobile Value Chain Structure: Stakeholders, Business Models, Policy, etc.
  Behavioral Science: Social Networks, Crowdsourcing/Folksonomies,
  Sensor Design: Magnetometers, Proximity, GPS, Audio, Optical (Extended Depth of Field, etc.)

FIG. 3 maps the various features of an illustrative cognitive process, with different aspects of functionality—in terms of system modules and data structures. Thus, for example, an Intuitive Computing Platform (ICP) Context Engine applies cognitive processes of association, problem solving status, determining solutions, initiating actions/responses, and management, to the context aspect of the system. In other words, the ICP Context Engine attempts to determine the user's intent based on history, etc., and use such information to inform aspects of system operation. Likewise, the ICP Baubles & Spatial Model components serve many of the same processes, in connection with presenting information to the user, and receiving input from the user.

The ICP Blackboard and KeyVectors are data structures used, among other purposes, in association with orientation aspects of the system. Blackboard is a reference to a computer construct popularized by Daniel Corkill. See, e.g., Corkill, Collaborating Software—Blackboard and Multi-Agent Systems & the Future, Proceedings of the International Lisp Conference, 2003.

ICP State Machine & Recognition Agent Management, in conjunction with Recognition Agents, attend to recognition processes, and composition of services associated with recognition. The state machine is typically a real-time operating system. (Such processes also involve, e.g., the ICP Blackboard and KeyVectors.)

Cloud Management & Business Rules deals with cloud registration, association, and session operations—providing an interface between recognition agents and other system components, and the cloud.

Local Functionality to Support Baubles

Some of the functions provided by one or more of the software components relating to baubles can include the following:
  Understand the user's profile, their general interests, their current specific interests within their current context.
  Respond to user inputs.
  Spatially parse and "object-ify" overlapping scene regions of streaming frames using selected modules of a global image processing library
    Attach hierarchical layers of symbols (pixel analysis results, IDs, attributes, etc.) to proto-regions; package up as "key vectors" of proto-queries.
  Based on user-set visual verbosity levels and global scene understanding, set up bauble primitive display functions/orthography.
  Route key vectors to appropriate local/cloud addresses
    With attached "full context" metadata from top listed bullet.
    If local: process the key vectors and produce query results.
  Collect key vector query results and enliven/blit appropriate baubles to user screen
    Baubles can be either "complete and fully actionable," or illustrate "interim states" and hence expect user interaction for deeper query drilling or query refinement.

Intuitive Computing Platform (ICP) Baubles

Competition in the cloud for providing services and high value bauble results should drive excellence and business success for suppliers. Establishing a cloud auction place, with baseline quality non-commercial services, may help drive this market.

Users want (and should demand) the highest quality and most relevant baubles, with commercial intrusion tuned as a function of their intentions and actual queries.

On the other side, buyers of screen real estate may be split into two classes: those willing to provide non-commercial baubles and sessions (e.g., with the goal of gaining a customer for branding), and those wanting to "qualify" the screen real estate, and simply bid on the commercial opportunities it represents.

Google, of course, has built a huge business on monetizing its "key word, to auction process, to sponsored hyperlink presentation" arrangements. However, for visual search, it seems unlikely that a single entity will similarly dominate all aspects of the process. Rather, it seems probable that a middle layer of companies will assist in the user query/screen real estate buyer-matchmaking.

The user interface may include a control by which the user can dismiss baubles that are of no interest—removing them from the screen (and terminating any on-going recognition agent process devoted to developing further information relating to that visual feature). Information about baubles that are dismissed can be logged in a data store, and used to augment the user's profile information. If the user dismisses baubles for Starbucks coffee shops and independent coffee shops, the system may come to infer a lack of interest by the user in all coffee shops. If the user dismisses baubles only for Starbucks coffee shops, then a more narrow lack of user interest can be discerned. Future displays of baubles can consult the data store; baubles earlier dismissed (or repeatedly dismissed) may not normally be displayed again.

Similarly, if the user taps on a bauble—indicating interest—then that type or class of bauble (e.g., Starbucks, or coffee shops) can be given a higher score in the future, in evaluating which baubles (among many candidates) to display.

Historical information about user interaction with baubles can be used in conjunction with current context information. For example, if the user dismisses baubles relating to coffee shops in the afternoons, but not in the mornings, then the system may continue to present coffee-related baubles in the morning.

The innate complexity of the visual query problem implies that many baubles will be of an interim, or proto-bauble class—inviting and guiding the user to provide human-level filtering and navigation deeper into the query process. The progression of bauble displays on a scene can thus be a function of real-time human input, as well as other factors.

When a user taps, or otherwise expresses interest in, a bauble (as opposed to tapping a preliminary, proto-bauble), this action usually initiates a session relating to the subject matter of the bauble. The details of the session will depend on the particular bauble. Some sessions may be commercial in nature (e.g., tapping on a Starbucks bauble may yield an electronic coupon for a dollar off a Starbucks product). Others may be informational (e.g., tapping on a bauble associated with a statue may lead to presentation of a Wikipedia entry about the statue, or the sculptor). A bauble indicating recognition of a face in a captured image might lead to a variety of operations (e.g., presenting a profile of the person from a social network, such as LinkedIn; posting a face-annotated copy of the picture to the Facebook page of the recognized person or of the user, etc.). Sometimes tapping a bauble summons a menu of several operations, from which the user can select a desired action.

Tapping a bauble represents a victory of sorts for that bauble, over others. If the tapped bauble is commercial in nature, that bauble has won a competition for the user's attention, and for temporary usage of real estate on the viewer's screen. In some instances, an associated payment may be made—perhaps to the user, perhaps to another party (e.g., an entity that secured the "win" for a customer).

A tapped bauble also represents a vote of preference—a possible Darwinian nod to that bauble over others. In addition to influencing selection of baubles for display to the present user in the future, such affirmation can also influence the selection of baubles for display to other users. This, hopefully, will lead bauble providers into a virtuous circle toward user-serving excellence. (How many current television commercials would survive if only user favorites gained ongoing airtime?)

As indicated, a given image scene may provide opportunities for display of many baubles—often many more baubles that the screen can usefully contain. The process of narrowing this universe of possibilities down to a manageable set can begin with the user.

A variety of different user input can be employed, starting with a verbosity control as indicated earlier—simply setting a baseline for how busily the user wants the screen to be overlaid with baubles. Other controls may indicate topical preferences, and a specified mix of commercial to non-commercial.

Another dimension of control is the user's real-time expression of interest in particular areas of the screen, e.g., indicating features about which the user wants to learn more, or otherwise interact. This interest can be indicated by tapping on proto-baubles overlaid on such features, although proto-baubles are not required (e.g., a user may simply tap an undifferentiated area of the screen to focus processor attention to that portion of the image frame).

Additional user input is contextual—including the many varieties of information detailed elsewhere (e.g., computing context, physical context, user context, physical context, temporal context and historical context).

External data that feeds into the bauble selection process can include information relating to third party interactions—what baubles did others choose to interact with? The weight given this factor can depend on a distance measure between the other user(s) and the present user, and a distance between their context and the present context. For example, bauble preferences expressed by actions of social friends of the present user, in similar contextual circumstances, can be given much greater weight than actions of strangers in different circumstances.

Another external factor can be commercial considerations, e.g., how much (and possibly to whom) a third party is willing to pay in order to briefly lease a bit of the user's screen real estate. As noted, such issues can factor into a cloud-based auction arrangement. The auction can also take into account the popularity of particular baubles with other users. In implementing this aspect of the process, reference may be made to the Google technology for auctioning online advertising real estate (see, e.g., Levy, Secret of Googlenomics: Data-Fueled Recipe Brews Profitability, Wired Magazine, May 22, 2009)—a variant of a generalized second-price auction. Applicants detailed cloud-based auction arrangements in PCT patent application PCT/US09/54358.

In one particular implementation, a few baubles (e.g., 1-8) may be allocated to commercial promotions (e.g., as determined by a Google-like auction procedure, and subject to user tuning of commercial vs. non-commercial baubles), and others may be selected based on non-commercial factors, such as noted earlier. These latter baubles may be chosen in rule-based fashion, e.g., applying an algorithm that weights different factors noted earlier to obtain a score for each bauble. The competing scores are then ranked, and the highest-scoring N baubles (where N may be user-set using the verbosity control) are presented on the screen.

In another implementation, there is no a priori allocation for commercial baubles. Instead, these are scored in a manner akin to the non-commercial baubles (typically using different criteria, but scaled to a similar range of scores). The top-scoring N baubles are then presented—which may be all commercial, all non-commercial, or a mix.

In still another implementation, the mix of commercial to non-commercial baubles is a function of the user's subscription service. Users at an entry level, paying an introductory rate, are presented commercial baubles that are large in size and/or number. Users paying a service provider for premium services are presented smaller and/or fewer commercial baubles, or are given latitude to set their own parameters about display of commercial baubles.

The graphical indicia representing a bauble can be visually tailored to indicate its feature association, and may include animated elements to attract the user's attention. The bauble provider may provide the system with indicia in a range of sizes, allowing the system to increase the bauble size—and resolution—if the user zooms into that area of the displayed imagery, or otherwise expresses potential interest in such bauble. In some instances the system must act as cop—deciding not to present a proffered bauble, e.g., because its size exceeds dimensions established by stored rules, its appearance is deemed salacious, etc. (The system may automatically scale baubles down to a suitable size, and substitute generic indicia—such as a star—for indicia that are unsuitable or otherwise unavailable.)

Baubles can be presented other than in connection with visual features discerned from the imagery. For example, a bauble may be presented to indicate that the device knows its geolocation, or that the device knows the identity of its user. Various operational feedback can thus be provided to the user—regardless of image content. Some image feedback may also be provided via baubles—apart from particular feature identification, e.g., that the captured imagery meets baseline quality standards such as focus or contrast.

Each bauble can comprise a bit mapped representation, or it can be defined in terms of a collection of graphical primitives. Typically, the bauble indicia is defined in plan view. The spatial model component of the software can attend to mapping its projection onto the screen in accordance with discerned surfaces within the captured imagery, e.g., seemingly inclining and perhaps perspectively warping a bauble associated with an obliquely-viewed storefront. Such issues are discussed further in the following section.

Spatial Model/Engine

Satisfactory projection and display of the 3D world onto a 2D screen can be important in establishing a pleasing user experience. Accordingly, the preferred system includes software components (variously termed, e.g., spatial model or a spatial engine) to serve such purposes.

Rendering of the 3D world in 2D starts by understanding something about the 3D world. From a bare frame of pixels—lacking any geolocation data or other spatial understanding—where to begin? How to discern objects, and categorize? How to track movement of the image scene, so that baubles can be repositioned accordingly? Fortunately, such issues have been confronted many times in many situations. Machine vision and video motion encoding are two fields, among many, that provide useful prior art with which the artisan is presumed to be familiar, and from which the artisan can draw in connection with the present application.

By way of first principles:

The camera and the displayed screen are classic 2D spatial structures

The camera functions through spatial projections of the 3D world onto a 2D plane Baubles and proto-baubles are "objectified" within a spatial framework.

Below follows a proposal to codify spatial understanding as an orthogonal process stream, as well as a context item and an attribute item. It utilizes the construct of three "spacelevels"—stages of spatial understanding.

Spacelevel 1 comprises basic scene analysis and parsing. Pixels are clumped into initial groupings. There is some basic understanding of the captured scene real estate, as well as display screen real estate. There is also some rudimentary knowledge about the flow of scene real estate across frames.

Geometrically, Spacelevel 1 lives in the context of a simple 2D plane. Spacelevel 1 operations include generating lists of 2D objects discerned from pixel data. The elemental operations performed by the OpenCV vision library (discussed below) fall in this realm of analysis. The smart phone's local software may be fluent in dealing with Spacelevel 1 operations, and rich lists of 2D objects may be locally produced.

Spacelevel 2 is transitional—making some sense of the Spacelevel 1 2D primitives, but not yet to the full 3D understanding of Spacelevel 3. This level of analysis includes tasks seeking to relate different Spacelevel 1 primitives—discerning how objects relate in a 2D context, and looking for clues to 3D understanding. Included are operations such as identifying groups of objects (e.g., different edges forming an outline defining a shape), noting patterns—such as objects along a line, and discerning "world spatial clues" such as vanishing points, horizons, and notions of "up/down." Notions of "closer/further" may also be uncovered. (E.g., a face has generally known dimensions. If a set of elemental features seems to likely represent a face, and the set is only 40 pixels tall in a scene that is 480 pixels tall, then a "further" attribute may be gathered—in contrast to a facial collection of pixels that is 400 pixels tall.)

The cacophony of Spacelevel 1 primitives is distilled/composited into shorter, more meaningful lists of object-related entities.

Spacelevel 2 may impose a GIS-like organization onto scene and scene sequences, e.g., assigning each identified clump, object, or region of interest, its own logical data layer—possibly with overlapping areas. Each layer may have an associated store of metadata. In this level, object continuity—frame-to-frame, can be discerned.

Geometrically, Spacelevel 2 acknowledges that the captured pixel data is a camera's projection of a 3D world onto a 2D image frame. The primitives and objects earlier discerned are not taken to be a full characterization of reality, but rather one view. Objects are regarded in the context of the camera lens from which they are viewed. The lens position establishes a perspective from which the pixel data should be understood.

Spacelevel 2 operations typically tend to rely more on cloud processing than Spacelevel 1 operations.

In the exemplary embodiment, the Spatial Model components of the software are general purpose—distilling pixel data into more useful form. The different recognition agents can then draw from this common pool of distilled data in performing their respective tasks, rather than each doing their own version of such processing. A line must be drawn, however, in deciding which operations are of such general utility that they are performed in this common fashion as a matter of course, and which operations should be relegated to individual recognition agents—performed only as needed. (Their results may nonetheless be shared, e.g., by the blackboard.) The line can be drawn arbitrarily; the designer has freedom to decide which operations fall on which side of the line. Sometimes the line may shift dynamically during a phone's operation, e.g., if a recognition agent makes a request for further common services support.

Spacelevel 3 operations are based in 3D. Whether or not the data reveals the full 3D relationships (it generally will not), the analyses are based on the premise that the pixels represent a 3D world. Such understanding is useful—even integral—to certain object recognition processes.

Spacelevel 3 thus builds on the previous levels of understanding, extending out to world correlation. The user is understood to be an observer within a world model with a given projection and spacetime trajectory. Transformation equations mapping scene-to-world, and world-to-scene, can be applied so that the system understands both where it is in space, and where objects are in space, and has some framework for how things relate. These phases of analysis draw from work in the gaming industry, and augmented reality engines.

Unlike operations associated with Spacelevel 1 (and some with Spacelevel 2), operations associated with Spacelevel 3 are generally so specialized that they are not routinely performed on incoming data (at least not with current technology). Rather, these tasks are left to particular recognition tasks that may require particular 3D information.

Some recognition agents may construct a virtual model of the user's environment—and populate the model with sensed objects in their 3D context. A vehicle driving monitor, for example, may look out the windshield of the user's car—noting items and actions relevant to traffic safety. It may maintain a 3D model of the traffic environment, and actions within it. It may take note of the user's wife (identified by another software agent, which posted the identification to the blackboard) driving her red Subaru through a red light—in view of the user. 3D modeling to support such functionality is certainly possible, but is not the sort of operation that would be performed routinely by the phone's general services.

Some of these aspects are shown in FIG. 4, which conceptually illustrates the increasing sophistication of spatial understanding from Spacelevel 1, to 2, to 3.

In an illustrative application, different software components are responsible for discerning the different types of information associated with the different Spacelevels. A clumping engine, for example, is used in generating the Spacelevel 1 understanding.

Clumping refers to the process for identifying a group of (generally contiguous) pixels as related. This relation can be, e.g., similarity in color or texture. Or it can be similarity in flow (e.g., a similar pattern of facial pixels shifting across a static background from frame to frame).

In one arrangement, after the system has identified a clump of pixels, it assigns symbology (e.g., as simple as an ID number) to be associated with the clump. This is useful in connection with further management and analysis of the clump (and otherwise as well, e.g., in connection with linked data arrangements). A proto-bauble may be assigned to the clump, and tracked by reference to the identifying symbol. Information resulting from parsing and orientation operations performed by the system, relating the clump's position to that of the camera in 2D and 3D, may be organized by reference to the clump's symbol. Similarly, data resulting from image processing operations associated with a clump can be identified by reference to the clump's symbol. Likewise, user taps may be logged in association with the symbol. This use of the symbol as a handle by which clump-related information can be stored and managed can extend to cloud-based processes relating to the clump, the evolution of the bauble associated with a clump, all the way through full recognition of the clump-object and responses based thereon. (More detailed naming constructs, e.g., including session IDs, are introduced below.)

These spatial understanding components can operate in parallel with other system software components, e.g., maintaining common/global spatial understanding, and setting up a spatial framework that agents and objects can utilize. Such operation can include posting current information about the spatial environment to a sharable data structure (e.g., blackboard) to which recognition agents can refer to help understand what they are looking at, and which the graphics system can consult in deciding how to paint baubles on the current scenery. Different objects and agents can set up spacelevel fields and attribute items associated with the three levels.

Through successive generations of these systems, the spatial understanding components are expected to become an almost reflexive, rote capability of the devices.

Intuitive Computing Platform (ICP) State Machine—Composition of Services; Service Oriented Computing As noted earlier, the ICP state machine can comprise, in essence, a real time operating system. It can attend to traditional tasks such as scheduling, multitasking, error recovery, resource management, messaging and security, and some others that are more particular to the current applications. These additional tasks may include providing audit trail functionality, attending to secure session management, and determining composition of services.

The audit trail functionality provides assurance to commercial entities that the baubles they paid to sponsor were, in fact, presented to the user.

Secure session management involves establishing and maintaining connections with cloud services and other devices that are robust from eavesdropping, etc. (e.g., by encryption).

Composition of services refers to the selection of operations for performing certain functions (and related orchestration/choreography of these component operations). A dispatch process can be involved in these aspects of the state machine's operation, e.g., matching up resources with applications.

Certain high level functions may be implemented using data from different combinations of various lower level operations. The selection of which functions to utilize, and when, can be based on a number of factors. One is what other operations are already underway or completed—the results of which may also serve the present need.

To illustrate, barcode localization may normally rely on calculation of localized horizontal contrast, and calculation of localized vertical contrast, and comparison of such contrast data. However, if 2D FFT data for 16×16 pixel tiles across the image is already available from another process, then this information might be used to locate candidate barcode areas instead.

Similarly, a function may need information about locations of long edges in an image, and an operation dedicated to producing long edge data could be launched. However, another process may have already identified edges of various lengths in the frame, and these existing results may simply be filtered to identify the long edges, and re-used.

Another example is Hough transform-based feature recognition. The OpenCV vision library indicates that this function desirably uses thinned-edge image data as input data. It further recommends generating the thinned-edge image data by applying a Canny operation to edge data. The edge data, in turn, is commonly generated by applying a Sobel filter to the image data. So, a "by the book" implementation of a Hough procedure would start with a Sobel filter, followed by a Canny operation, and then invoke the Hough method.

But edges can be determined by methods other than a Sobel filter. And thinned edges can be determined by methods other than Canny. If the system already has edge data—albeit generated by a method other than a Sobel filter, this edge data may be used. Similarly, if another process has already produced reformed edge data—even if not by a Canny operation, this reformed edge data may be used.

In one particular implementation, the system (e.g., a dispatch process) can refer to a data structure having information that establishes rough degrees of functional correspondence between different types of keyvectors. Keyvector edge data produced by Canny may be indicated to have a high degree of functional correspondence with edge data produced by the Infinite Symmetric Exponential Filter technique, and a somewhat lesser correspondence with edge data discerned by the Marr-Hildreth procedure. Corners detected by a Harris operator may be interchangeable with corners detected by the Shi and Tomasi method. Etc.

This data structure can comprise one large table, or it can be broken down into several tables—each specialized to a particular type of operation. FIG. 5, for example, schematically shows part of a table associated with edge finding—indicating a degree of correspondence (scaled to 100).

A particular high level function (e.g., barcode decoding) may call for data generated by a particular process, such as a Canny edge filter. A Canny filter function may be available in a library of software processing algorithms available to the system, but before invoking that operation the system may consult the data structure of FIG. 5 to see if suitable alternative data is already available, or in-process (assuming the preferred Canny data is not already available).

The check begins by finding the row having the nominally desired function in the left-most column. The procedure then scans across that row for the highest value. In the case of Canny, the highest value is 95, for Infinite Symmetric Exponential Filter. The system can check the shared data structure (e.g., blackboard) to determine whether such data is available for the subject image frame (or a suitable substitute). If found, it may be used in lieu of the nominally-specified Canny data, and the barcode decoding operation can continue on that basis. If none is found, the state machine process continues—looking for next-highest value(s) (e.g., 90 for Marr-Hildreth). Again, the system checks whether any data of this type is available. The process proceeds until all of the alternatives in the table are exhausted.

In a presently preferred embodiment, this checking is undertaken by the dispatch process. In such embodiment, most recognition processes are performed as cascaded sequences of operations—each with specified inputs. Use of a dispatch process allows the attendant composition of services decision-making to be centralized. This also allows the operational software components to be focused on image processing, rather than also being involved, e.g., with checking tables for suitable input resources and maintaining awareness of operations of other processes—burdens that would make such components more complex and difficult to maintain.

In some arrangements, a threshold is specified—by the barcode decoding function, or by the system globally, indicating a minimum correspondence value that is acceptable for data substitution, e.g., 75. In such case, the just-described process would not consider data from Sobel and Kirch filters—since their degree of correspondence with the Canny filter is only 70.

Although other implementations may be different, note that the table of FIG. 5 is not symmetrical. For example, if Canny is desired, Sobel has an indicated correspondence of only 70. But if Sobel is desired, Canny has an indicated correspondence of 90. Thus, Canny may be substituted for Sobel, but not vice versa, if a threshold of 75 is set.

The table of FIG. 5 is general purpose. For some particular applications, however, it may not be suitable. A function, for example, may require edges be found with Canny (preferred), or Kirch or Laplacian. Due to the nature of the function, no other edge finder may be satisfactory.

The system can allow particular functions to provide their own correspondence tables for one or more operations—pre-empting application of the general purpose table(s). The existence of specialized correspondence tables for a function can be indicated by a flag bit associated with the function, or otherwise. In the example just given, a flag bit may indicate that the table of FIG. 5A should be used instead. This table comprises just a single row—for the Canny operation that is nominally specified for use in the function. And it has just two columns—for Infinite Symmetric Exponential Filter and Laplacian. (No other data is suitable.) The correspondence values (i.e., 95, 80) may be omitted—so that the table can comprise a simple list of alternative processes.

To facilitate finding substitutable data in the shared data structure, a naming convention can be used indicating what information a particular keyvector contains. Such a naming convention can indicate a class of function (e.g., edge finding), a particular species of function (e.g., Canny), the image frame(s) on which the data is based, and any other parameters particular to the data (e.g., the size of a kernel for the Canny filter). This information can be represented in various ways, such as literally, by abbreviation, by one or more index values that can be resolved through another data structure to obtain the full details, etc. For example, a keyvector containing Canny edge data for frame 1357, produced with a 5×5 blurring kernel may be named "KV_Edge_Canny_1357_5×5."

To alert other processes of data that is in-process, a null entry can be written to the shared data structure when a function is initialized—named in accordance with the function's final results. Thus, if the system starts to perform a Canny operation on frame 1357, with a 5×5 blurring kernel, a null file may be written to the shared data structure with the name noted above. (This can be performed by the function, or by the state machine—e.g., the dispatch process.) If another process needs that information, and finds the appropriately-named file with a null entry, it knows such a process has been launched. It can then monitor, or check back with, the shared data structure and obtain the needed information when it becomes available.

More particularly, a process stage that needs that information would include among its input parameters a specification of a desired edge image—including descriptors giving its required qualities. The system (e.g., the dispatch process) would examine the types of data currently in memory (e.g., on the blackboard), and description tables, as noted, to determine whether appropriate data is presently available or in process.

The possible actions could then include starting the stage with acceptable, available data; delay starting until a later time, when the data is expected to be available; delay starting and schedule starting of a process that would generate the required data (e.g., Canny); or delay or terminate the stage, due to lack of needed data and of the resources that would be required to generate them.

In considering whether alternate data is appropriate for use with a particular operation, consideration may be given to data from other frames. If the camera is in a free-running mode, it may be capturing many (e.g., 30) frames every second. While an analysis process may particularly consider frame 1357 (in the example given above), it may be able to utilize information derived from frame 1356, or even frame 1200 or 1500.

In this regard it is helpful to identify groups of frames encompassing imagery that is comparable in content. Whether two image frames are comparable will naturally depend on the particular circumstances, e.g., image content and operation(s) being performed.

In one exemplary arrangement, frame A may be regarded as comparable with frame B, if (1) a relevant region of interest appears in both frames (e.g., the same face subject, or barcode subject), and (2) if each of the frames between A and B also includes that same region of interest (this provides some measure of protection against the subject changing between when the camera originally viewed the subject, and when it returned to the subject).

In another arrangement, two frames are deemed comparable if their color histograms are similar, to within a specified threshold (e.g., they have a correlation greater than 0.95, or 0.98).

In yet another arrangement, MPEG-like techniques can be applied to an image stream to determine difference information between two frames. If the difference exceeds a threshold, the two frames are deemed non-comparable.

A further test, which can be imposed in addition to those criteria noted above, is that a feature- or region-of-interest in the frame is relatively fixed in position ("relatively" allowing a threshold of permitted movement, e.g., 10 pixels, 10% of the frame width, etc.).

A great variety of other techniques can alternatively be used; these are just illustrative.

In one particular embodiment, the mobile device maintains a data structure that identifies comparable image frames. This can be as simple as a table identifying the beginning and ending frame of each group, e.g.:

| Start Frame | End Frame |
|---|---|
| ... | ... |
| 1200 | 1500 |
| 1501 | 1535 |
| 1536 | 1664 |
| ... | ... |

In some arrangements, a third field may be provided—indicating frames within the indicated range that are not, for some reason, comparable (e.g., out of focus).

Returning to the earlier-noted example, if a function desires input data "KV_Edge_Canny_1357_5×5" and none is found, it can expand the search to look for "KV_Edge_Canny_1200_5×5" through "KV_Edge_Canny_1500_5×5," based on the comparability (rough equivalence) indicated by the foregoing table. And, as indicated, it may also be able to utilize edge data produced by other methods, again, from any of frames 1200-1500.

Thus, for example, a barcode may be located by finding a region of high horizontal contrast in frame 1250, and a region of low vertical contrast in frame 1300. After location, this barcode may be decoded by reference to bounding line structures (edges) found in frame 1350, and correlation of symbol patterns found in frames 1360, 1362 and 1364. Because all these frames are within a common group, the device regards data derived from each of them to be usable with data derived from each of the others.

In more sophisticated embodiments, feature tracking (flow) between frames can be discerned, and used to identify motion between frames. Thus, for example, the device can understand that a line beginning at pixel (100,100) in frame A corresponds to the same line beginning at pixel (101, 107) in frame B. (Again, MPEG techniques can be used, e.g., for frame-to-frame object tracking.) Appropriate adjustments can be made to re-register the data, or the adjustment can be introduced otherwise.

In simpler embodiments, equivalence between image frames is based simply on temporal proximity. Frames within a given time-span (or frame-span) of the subject frame are regarded to be comparable. So in looking for Canny edge information for frame 1357, the system may accept edge information from any of frames 1352-1362 (i.e., plus and minus five frames) to be equivalent. While this approach will sometimes lead to failure, its simplicity may make it desirable in certain circumstances.

Sometimes an operation using substituted input data fails (e.g., it fails to find a barcode, or recognize a face) because the input data from the alternate process wasn't of the precise character of the operation's nominal, desired input data. For example, although rare, a Hough transform-based feature recognition might fail because the input data was not produced by the Canny operator, but by an alternate process. In the event an operation fails, it may be re-attempted—this time with a different source of input data. For example, the Canny operator may be utilized, instead of the alternate. However, due to the costs of repeating the operation, and the generally low expectation of success on the second try, such re-attempts are generally not undertaken routinely. One case in which a re-attempt may be tried is if the operation was initiated in top-down fashion, such as in response to user action.)

In some arrangements, the initial composition of services decisions depend, in some measure, on whether an operation was initiated top-down or bottom-up (these concepts are discussed below). In the bottom-up case, for example, more latitude may be allowed to substitute different sources of input data (e.g., sources with less indicated correspondence to the nominal data source) than in the top-down case.

Other factors that can be considered in deciding composition of service may include power and computational constraints, financial costs for certain cloud-based operations, auction outcomes, user satisfaction rankings, etc.

Again, tables giving relative information for each of alternate operations may be consulted to help the composition of services decision. One example is shown in FIG. 6.

Figures 6, 7:
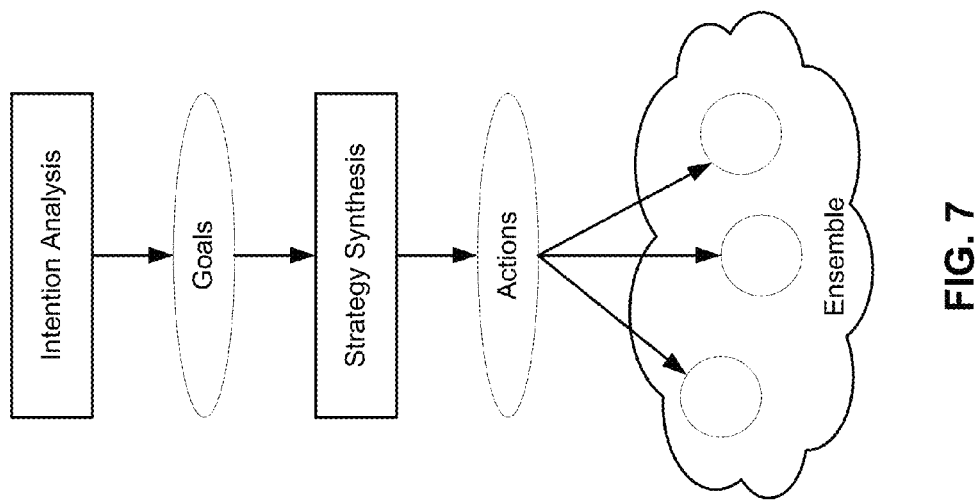

The FIG. 6 table gives metrics for CPU and memory required to execute different edge finding functions. The metrics may be actual values of some sort (e.g., CPU cycles to perform the stated operation on an image of a given size, e.g., 1024×1024, and KB of RAM needed to execute such an operation), or they may be arbitrarily scaled, e.g., on a scale of 0-100.

If a function requires edge data—preferably from a Canny operation, and no suitable data is already available, the state machine must decide whether to invoke the requested Canny operation, or another. If system memory is in scarce supply, the table of FIG. 6 (in conjunction with the table of FIG. 5) suggests that an Infinite Symmetric Exponential filter may be used instead: it is only slightly greater in CPU burden, but takes 25% less memory. (FIG. 5 indicates the Infinite Symmetric Exponential filter has a correspondence of 95 with Canny, so it should be functionally substitutable.) Sobel and Kirch require much smaller memory footprints, but FIG. 5 indicates that these may not be suitable (scores of 70).

The real time state machine can consider a variety of parameters—such as the scores of FIGS. 5 and 6, plus other scores for costs, user satisfaction, current system constraints (e.g., CPU and memory utilization), and other criteria, for each of the alternative edge finding operations. These may be input to a process that weights and sums different combinations of the parameters in accordance with a polynomial equation. The output of this process yields a score for each of the different operations that might be invoked. The operation with the highest score (or the lowest, depending on the equation) is deemed the best in the present circumstances, and is then launched by the system.

While the tables of FIGS. 5 and 6 considered just local device execution of such functions, cloud-based execution may also be considered. In this case, the processor and memory costs of the function are essentially nil, but other costs may be incurred, e.g., in increased time to receive results, in consumption of network bandwidth, and possibly in financial micropayment. Each of these costs may be different for alternative service providers and functions. To assess these factors, additional scores can be computed, e.g., for each service provider and alternate function. These scores can include, as inputs, an indication of urgency to get results back, and the increased turnaround time expected from the cloud-based function; the current usage of network bandwidth, and the additional bandwidth that would be consumed by delegation of the function to a cloud-based service; the substitutability of the contemplated function (e.g., Infinite Symmetric Exponential filter) versus the function nominally desired (e.g., Canny); and an indication of the user's sensitivity to price, and what charge (if any) would be assessed for remote execution of the function. A variety of other factors can also be involved, including user preferences, auction results, etc. The scores resulting from such calculations can be used to identify a preferred option among the different remote providers/functions considered. The system can then compare the winning score from this exercise with the winning score from those associated with performance of a function by the local device. (Desirably, the scoring scales are comparable.) Action can then be taken based on such assessment.

The selection of services can be based other factors as well. From context, indications of user intention, etc., a set of recognition agents relevant to the present circumstances can be identified. From these recognition agents the system can identify a set consisting of their desired inputs. These inputs may involve other processes which have other, different, inputs. After identifying all the relevant inputs, the system can define a solution tree that includes the indicated inputs, as well as alternatives. The system then identifies different paths through the tree, and selects one that is deemed (e.g., based on relevant constraints) to be optimal. Again, both local and cloud-based processing can be considered.

In this respect, the technology can draw from "planning models" known in the field of artificial intelligence (AI), e.g., in connection with "smart environments."

(The following discussion of planning models draws, in part, from Marquardt, "Evaluating AI Planning for Service Composition in Smart Environments," ACM Conf. on Mobile and Ubiquitous Media 2008, pp. 48-55.)

A smart environment, as conceived by Mark Weiser at Xerox PARC, is one that is "richly and invisibly interwoven with sensors, actuators, displays, and computational elements, embedded seamlessly in the everyday objects of our lives, and connected through a continuous network." Such environments are characterized by dynamic ensembles of devices that offer individualized services (e.g., lighting, heating, cooling, humidifying, image projecting, alerting, image recording, etc.) to the user in an unobtrusive manner.

FIG. 7 is illustrative. The intentions of a user are identified, e.g., by observation, and by reference to context. From this information, the system derives the user's presumed goals. The step of strategy synthesis attempts to find a sequence of actions that meets these goals. Finally, these actions are executed using the devices available in the environment.

Because the environment is changeable, the strategy synthesis—which attends to composition of services—must be adaptable, e.g., as goals and available devices change. The composition of services task is regarded as an AI "planning" problem.

AI planning concerns the problem of identifying action sequences that an autonomous agent must execute in order to achieve a particular goal. Each function (service) that an agent can perform is represented as an operator. (Pre- and post-conditions can be associated with these operators. Preconditions describe prerequisites that must be present to execute the operator (function). Post-conditions describe the changes in the environment triggered by execution of the operator—a change to which the smart environment may need to be responsive.) In planning terms, the "strategy synthesis" of FIG. 7 corresponds to plan generation, and the "actions" correspond to plan execution. The plan generation involves service composition for the smart environment.

A large number of planners is known from the AI field. See, e.g., Howe, "A Critical Assessment of Benchmark Comparison in Planning," Journal of Artificial Intelligence Research, 17:1-33, 2002. Indeed, there is an annual conference devoted to competitions between AI planners (see ipc<dot>icaps-conference<dot>org). A few planners for composing services in smart environments have been evaluated, in Amigoni, "What Planner for Ambient Intelligence Applications?" IEEE Systems, Man and Cybernetics, 35(1):7-21, 2005. Other planners for service composition in smart environments are particularly considered in the Marquardt paper noted earlier, including UCPOP, SGP, and Blackbox. All generally use a variant of PDDL (Planning Domain Definition Language)—a popular description language for planning domains and problems.

Figure 8:
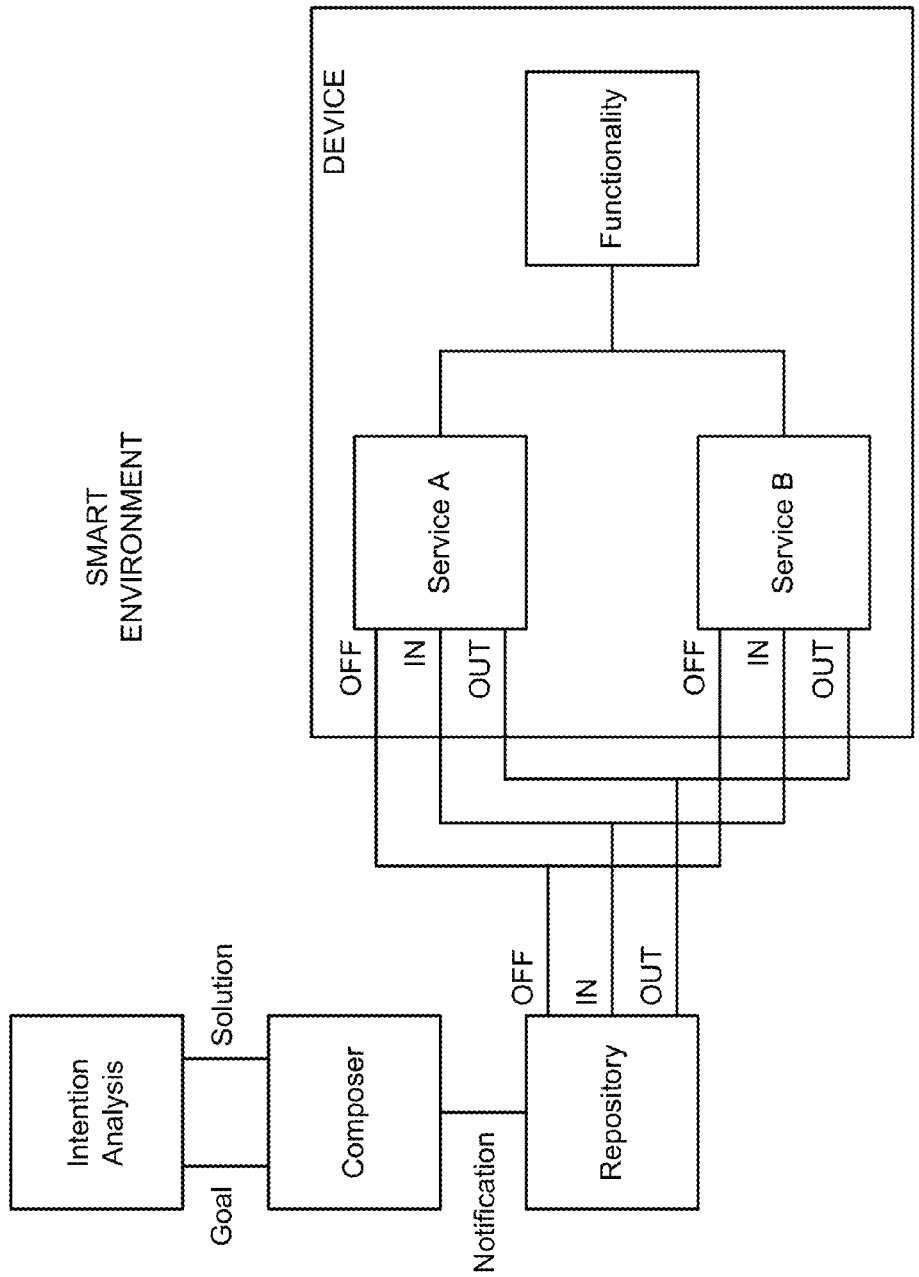

Marquardt evaluated different planners in a simple smart environment simulation—a portion of which is represented by FIG. 8, employing between five and twenty devices—each with two randomly selected services, and randomly selected goals. Data are exchanged between the model components in the form of messages along the indicated lines. The services in the simulation each have up to 12 pre-conditions (e.g., "light_on," "have_document_A," etc.). Each service also has various post-conditions.

The study concluded that all three planners are satisfactory, but that Blackbox (Kautz, "Blackbox: A New Approach to the Application of Theorem Proving to Problem Solving," ATPS 1998) performed best. Marquardt noted that where the goal is not solvable, the planners generally took an undue amount of time trying unsuccessfully to devise a plan to meet the goal. The authors concluded that it is better to terminate a planning process (or initiate a different planner) if the process does not yield a solution within one second, in order to avoid wasting resources.

Although from a different field of endeavor, applicants believe this latter insight should likewise be applied when attempting composition of services to achieve a particular goal in the field of visual query: if a satisfactory path through a solution tree (or other planning procedure) cannot be devised quickly, the state machine should probably regard the function as insoluble with available data, and not expend more resources trying to find a solution. A threshold interval may be established in software (e.g., 0.1 seconds, 0.5 seconds, etc.), and a timer can be compared against this threshold and interrupt attempts at a solution if no suitable strategy is found before the threshold is reached.

Embodiments of the present technology can also draw from work in the field of web services, which increasingly are being included as functional components of complex web sites. For example, a travel web site may use one web service to make an airline reservation, another to select a seat on the airplane, and another to charge a user's credit card. The travel web site needn't author these functional components; it uses a mesh of web services authored and provided by others. This modular approach—drawing on work earlier done by others—speeds system design and delivery.

This particular form of system design goes by various names, including Service Oriented Architecture (SOA) and Service Oriented Computing. Although this style of design saves the developer from writing software to perform the individual component operations, there is still the task of deciding which web services to use, and orchestrating the submission of data to—and collection of results from—such services. A variety of approaches to these issues are known. See, e.g., Papazoglou, "Service-Oriented Computing Research Roadmap," Dagstuhl Seminar Proceedings 05462, 2006; and Bichler, "Service Oriented Computing," IEEE Computer, 39:3, March, 2006, pp. 88-90.

Service providers naturally have a finite capacity for providing services, and must sometimes deal with the problem of triaging requests that exceed their capacity. Work in this field includes algorithms for choosing among the competing requests, and adapting charges for services in accordance with demand. See, e.g., Esmaeilsabzali et al, "Online Pricing for Web Service Providers," ACM Proc. of the 2006 Int'l Workshop on Economics Driven Software Engineering Research.

The state machine of the present technology can employ Service Oriented Computing arrangements to expand the functionality of mobile devices (for visual search and otherwise) by deploying part of the processing burden to remote servers and agents. Relevant web services may be registered with one or more cloud-based broker processes, e.g., specifying their services, inputs, and outputs in a standardized, e.g., XML, form. The state machine can consult with such broker(s) in identifying services to fulfill the system's needs. (The state machine can consult with a broker of brokers, to identify brokers dealing with particular types of services. For example, cloud-based service providers associated with a first class of services, e.g., facial recognition, may be cataloged by a first broker, while cloud-based service providers associated with a different class of services, e.g., OCR, may be cataloged by a second broker.)

The Universal Description Discovery and Integration (UDDI) specification defines one way for web services to publish, and for the state machine to discover, information about web services. Other suitable standards include Electronic Business using eXtensible Markup Language (ebXML) and those based on the ISO/IEC 11179 Metadata Registry (MDR). Semantic-based standards, such as WSDL-S and OWL-S (noted below), allow the state machine to describe desired services using terms from a semantic model. Reasoning techniques, such as description logic inferences, can then be used to find semantic similarities between the description offered by the state machine, and service capabilities of different web services, allowing the state machine to automatically select a suitable web service. (As noted elsewhere, reverse auction models can be used, e.g., to select from among several suitable web services.)

Intuitive Computing Platform (ICP) State Machine—Concurrent Processes

Figure 9:
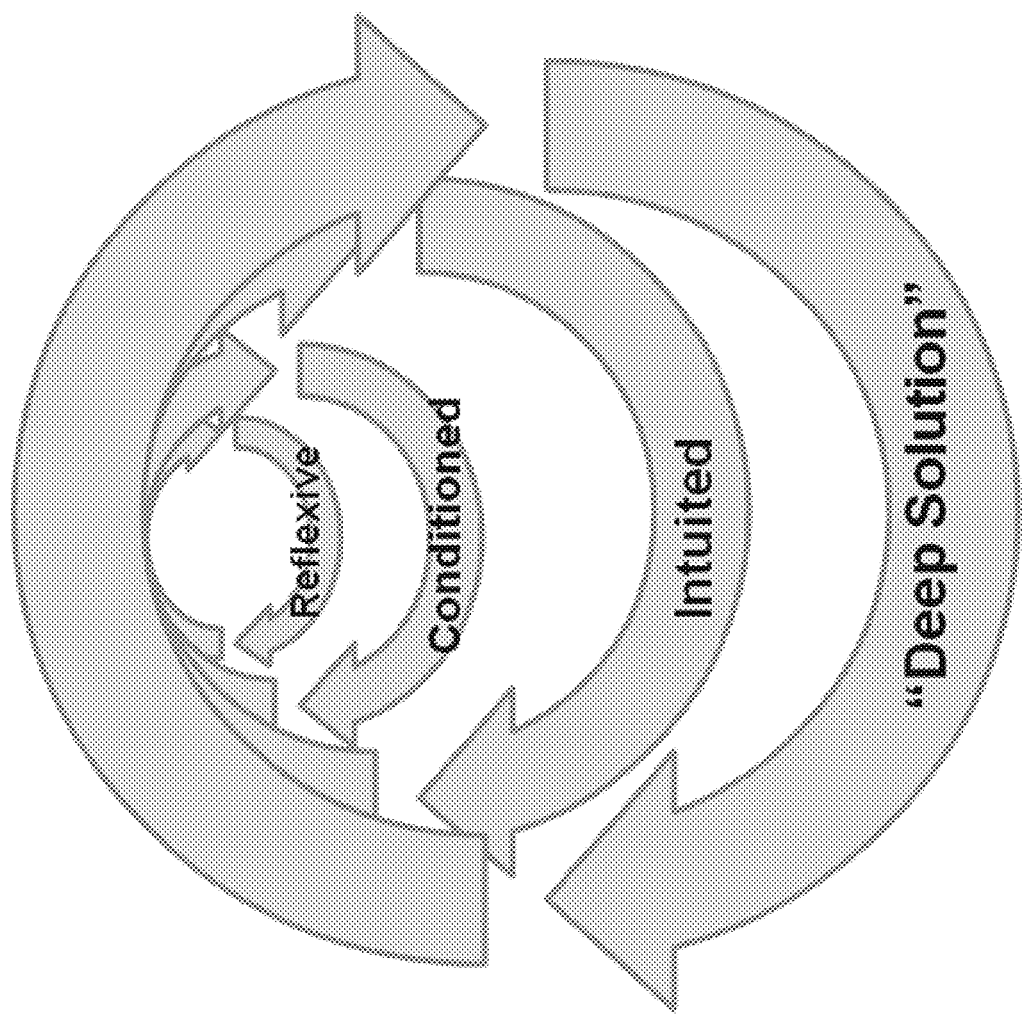
FIG. 9 identifies four levels of concurrent processing that may be performed by the operating system.

To maintain the system in a responsive state, the ICP state machine may oversee various levels of concurrent processing (analogous to cognition), conceptually illustrated in FIG. 9. Four such levels, and a rough abridgement of their respective scopes, are:

Reflexive—no user or cloud interaction

Conditioned—based on intent; minimal user interaction; engaging cloud

Intuited, or "Shallow solution"—based on solutions arrived at on device, aided by user interaction and informed by interpretation of intent and history "Deep Solution"—full solution arrived at through session with user and cloud.

FIG. 10 further details these four levels of processing associated with performing visual queries, organized by different aspects of the system, and identifying elements associated with each.

Reflexive processes typically take just a fraction of a second to perform. Some may be refreshed rarely (e.g., what is the camera resolution). Others—such as assessing camera focus—may recur several times a second (e.g., once or twice, up through tens of times—such as every frame capture). The communications component may simply check for the presence of a network connection. Proto-baubles (analog baubles) may be placed based on gross assessments of image segmentation (e.g., is there a bright spot?). Temporal aspects of basic image segmentation may be noticed, such as flow—from one frame to the next, e.g., of a red blob 3 pixels to the right. The captured 2D image is presented on the screen. The user typically is not involved at this level except, e.g., that user inputs—like tapped baubles—are acknowledged.

Conditioned processes take longer to perform (although typically less than a second), and may be refreshed, e.g., on the order of every half second. Many of these processes relate to context data and acting on user input. These include recalling what actions the user undertook the last time in similar contextual circumstances (e.g., the user often goes into Starbucks on the walk to work), responding to user instructions about desired verbosity, configuring operation based on the current device state (e.g., airplane mode, power save mode), performing elementary orientation operations, determining geolocation, etc. Recognition agents that appear relevant to the current imagery and other context are activated, or prepared for activation (e.g., the image looks a bit like text, so prepare processes for possible OCR recognition). Recognition agents can take note of other agents that are also running, and can post results to the blackboard for their use. Baubles indicating outputs from certain operations appear on the screen. Hand-shaking with cloud-based resources is performed, to ready data channels for use, and quality of the channels is checked. For processes involving cloud-based auctions, such auctions may be announced, together with relevant background information (e.g., about the user) so that different cloud-based agents can decide whether to participate, and make any needed preparations.

Intuited processes take still longer to perform, albeit mostly on the device itself. These processes generally involve supporting the recognition agents in their work—composing needed keyvectors, presenting associated UIs, invoking related functions, responding to and balancing competing requests for resources, etc. The system discerns what semantic information is desired, or may likely be desired, by the user. (If the user, in Starbucks, typically images the front page of the New York Times, then operations associated with OCR may be initiated—without user request. Likewise, if presentation of text-like imagery has historically prompted the user to request OCR'ing and translation into Spanish, these operations can be initiated—including readying a cloud-based translation engine.) Relevant ontologies may be identified and employed. Output baubles posted by recognition agents can be geometrically remapped in accordance with the device's understanding of the captured scene, and other aspects of 3D understanding can be applied. A rules engine can monitor traffic on the external data channels, and respond accordingly. Quick cloud-based responses may be returned and presented to the user—often with menus, windows, and other interactive graphical controls. Third party libraries of functions may also be involved at this level.

The final Deep Solutions are open-ended in timing—they may extend from seconds, to minutes, or longer, and typically involve the cloud and/or the user. Whereas Intuited processes typically involve individual recognition agents, Deep Solutions may be based on outputs from several such agents, interacting, e.g., by association. Social network input may also be involved in the process, e.g., using information about peer groups, tastemakers the user respects, their histories, etc. Out in the cloud, elaborate processes may be unfolding, e.g., as remote agents compete to provide service to the device. Some data earlier submitted to the cloud may prompt requests for more, or better, data. Recognition agents that earlier suffered for lack of resources may now be allowed all the resources they want because other circumstances have made clear the need for their output. A coveted 10×20 pixel patch adjacent to the Statue of Liberty is awarded to a happy bauble provider, who has arranged a pleasing interactive experience to the user who taps there. Regular flows of data to the cloud may be established, to provide on-going cloud-based satisfaction of user desires. Other processes—many interactive—may be launched in this phase of operation as a consequence of the visual search, e.g., establishing a Skype session, viewing a YouTube demonstration video, translating an OCR'd French menu into English, etc.

At device startup (or at other phases of its operation), the device may display baubles corresponding to some or all of the recognition agents that it has available and ready to apply. This is akin to all the warning lights illuminating on the dashboard of a car when first started, demonstrating the capability of the warning lights to work if needed (or akin to a player's display of collected treasure and weapons in a multi-player online game—tools and resources from which the user may draw in fighting dragons, etc.).

It will be recognized that this arrangement is illustrative only. In other implementations, other arrangements can naturally be used.

Top-Down and Bottom-Up; Lazy Activation Structure

Applications may be initiated in various ways. One is by user instruction ("top-down").

Most applications require a certain set of input data (e.g., keyvectors), and produce a set of output data (e.g., keyvectors). If a user instructs the system to launch an application (e.g., by tapping a bauble, interacting with a menu, gesturing, or what not), the system can start by identifying what inputs are required, such as by building a "keyvectors needed" list, or tree. If all the needed keyvectors are present (e.g., on the blackboard, or in a "keyvectors present" list or tree), then the application can execute (perhaps presenting a bright bauble) and generate the corresponding output data.

If all of the needed keyvectors are not present, a bauble corresponding to the application may be displayed, but only dimly. A reverse directory of keyvector outputs can be consulted to identify other applications that may be run in order to provide the keyvectors needed as input for the user-initiated application. All of the keyvectors required by those other applications can be added to "keyvectors needed." The process continues until all the keyvectors required by these other applications are in "keyvectors present." These other applications are then run. All of their resulting output keyvectors are entered into the "keyvectors present" list. Each time another keyvector needed for the top-level application becomes available, the application's bauble may be brightened. Eventually, all the necessary input data is available, and the application initiated by the user is run (and a bright bauble may announce that fact).

Another way an application can be run is "bottom up"—triggered by the availability of its input data. Rather than a user invoking an application, and then waiting for necessary data, the process is reversed. The availability of data drives the activation (and often then selection) of applications. Related work is known under the "lazy evaluation" moniker.

One particular implementation of a lazy activation structure draws from the field of artificial intelligence, namely production system architectures using match/deliberate (or evaluate)/execute arrangements. (The "match" step may be met by a user pressing a button, or by the system being in the bottom-up modality, or may be omitted.)

A conditional rule can start the process—a criterion that must be evaluated. In the present circumstances, the conditional rule may relate to the availability of a certain input data. For example, the "bottom up" process can be activated on a regular basis by comparing the current "keyvectors present" tree with the full list of top-level applications installed on the system. If any of an application's input requirements are already present, it can launch into execution.

If some (but not all) of an application's input requirements are already present, a corresponding bauble may be displayed, in an appropriate display region, at a brightness indicating how nearly all its inputs are satisfied. The application may launch without user input once all its inputs are satisfied. However, many applications may have a "user activation" input. If the bauble is tapped by the user (or if another UI device receives a user action), the application is switched into the top-down launch mode—initiating other applications—as described above—to gather the remaining predicate input data, so that top level application can then run.

In similar fashion, an application for which some (not all) inputs are available, may be tipped into top-down activation by circumstances, such as context. For example, a user's historical pattern of activating a feature in certain conditions can serve as inferred user intent, signaling that the feature should be activated when those conditions recur. (Such activation may occur even with no requisite inputs available, if the inferred user intent is compelling enough.)

In such arrangement, resources are only applied to functions that are ready to run—or nearly so. Functions are launched into action opportunistically—when merited by the availability of appropriate input data.

Regularly-Performed Image Processing

Some user-desired operations will always be too complex to be performed by the portable system, alone; cloud resources must be involved. Conversely, there are some image-related operations that the portable system should be able to perform without any use of cloud resources.

To enable the latter, and facilitate the former, the system designer may specify a set of baseline image processing operations that are routinely performed on captured imagery, without being requested by a function or by a user. Such regularly-performed background functions may provide fodder (output data, expressed as keyvectors) that other applications can use as input. Some of these background functions can also serve another purpose: standardization/distillation of image-related information for efficient transfer to, and utilization by, other devices and cloud resources.

A first class of such regularly-performed operations generally takes one or more image frames (or parts thereof) as input, and produces an image frame (or partial frame) keyvector as output. Exemplary operations include:
  Image-wide (or region of interest-wide) sampling or interpolation: the output image may not have the same dimensions as the source, nor is the pixel depth necessarily the same
  Pixel remapping: the output image has the same dimensions as the source, though the pixel depth need not be the same. Each source pixel is mapped independently
    examples: thresholding, 'false color', replacing pixel values by examplar values
  Local operations: the output image has the same dimensions as the source, or is augmented in a standard way (e.g., adding a black image border). Each destination pixel is defined by a fixed-size local neighborhood around the corresponding source pixel
    examples: 6×6 Sobel vertical edge, 5×5 line-edge magnitude, 3×3 local max, etc.
  Spatial remapping: e.g., correcting perspective or curvature 'distortion'
  FFT or other mapping into an "image" in a new space
  Image arithmetic: output image is the sum, maximum, etc of input images
    Sequence averaging: each output image averages k-successive input images
    Sequence (op)ing: each output image is a function of k-successive input images A second class of such background operations processes one or more input images (or parts thereof) to yield an output keyvector consisting of a list of 1D or 2D regions or structures. Exemplary operations in this second class include:
  Long-line extraction: returns a list of extracted straight line segments (e.g., expressed in a slope-intercept format, with an endpoint and length)
  A list of points where long lines intersect (e.g., expressed in row/column format)
  Oval finder: returns a list of extracted ovals (in this, and other cases, location and parameters of the noted features are included in the listing)
  Cylinder finder: returns a list of possible 3D cylinders (uses Long-line)
  Histogram-based blob extraction: returns a list of image regions which are distinguished by their local histograms
  Boundary-based blob extraction: returns a list of image regions which are distinguished by their boundary characteristics
  Blob 'tree' in which each component blob (including the full image) has disjoint sub-blobs which are fully contained in it. Can carry useful scale-invariant (or at least scale-resistant) information
    example: the result of thresholding an image at multiple thresholds
  Exact boundaries, e.g., those of thresholded blob regions
  Indistinct boundaries, e.g., a list of edges or points which provide a reasonably dense region boundary, but may have small gaps or inconsistencies, unlike the boundaries of thresholded blobs A third class of such routine, on-going processes produces a table or histogram as output keyvector data. Exemplary operations in this third class include:
  Histogram of hue, intensity, color, brightness, edge value, texture, etc.
  2D histogram or table indicating feature co-occurrence, e.g., of 1D values: (hue, intensity), (x-intensity, y-intensity), or some other pairing A fourth class of such default image processing operations consists of operations on common non-image objects. Exemplary operations in this fourth class include:
  Split/merge: input blob list yields a new, different blob list
  Boundary repair: input blob list yields a list of blobs with smoother boundaries
  Blob tracking: a sequence of input blob lists yields a list of blob sequences
  Normalization: image histogram and list of histogram-based blobs returns a table for remapping the image (perhaps to "region type" values and "background" value(s))

The foregoing operations, naturally, are only exemplary. There are many, many other low-level operations that can be routinely performed. A fairly large set of the types above, however, are generally useful, demand a reasonably small library, and can be implemented within commonly-available CPU/GPU requirements.

Contextually-Triggered Image Processing; Barcode Decoding

The preceding discussion noted various operations that the system may perform routinely, to provide keyvector data that can serve as input for a variety of more specialized functions. Those more specialized functions can be initiated in a top-down manner (e.g., by user instruction), or in bottom-up fashion (e.g., by the availability of all data predicates).

In addition to the operations just-detailed, the system may also launch processes to generate other keyvectors based on context.

To illustrate, consider location. By reference to geolocation data, a device may determine that a user is in a grocery store. In this case the system may automatically start performing additional image processing operations that generate keyvector data which may be useful for applications commonly relevant in grocery stores. (These automatically triggered applications may, in turn, invoke other applications that are needed to provide inputs for the triggered applications.)

For example, in a grocery store the user may be expected to encounter barcodes. Barcode decoding includes two different aspects. The first is to find a barcode region within the field of view. The second is to decode the line symbology in the identified region. Operations associated with the former aspect can be undertaken routinely when the user is determined to be in a grocery store (or other retail establishment). That is, the routinely-performed set of image processing operations earlier detailed is temporarily enlarged by addition of a further set of contextually-triggered operations—triggered by the user's location in the grocery store.

Finding a barcode can be done by analyzing a greyscale version of imagery to identify a region with high image contrast in the horizontal direction, and low image contrast in the vertical direction. Thus, when in a grocery store, the system may enlarge the catalog of image processing operations that are routinely performed, to also include computation of a measure of localized horizontal greyscale image contrast, e.g., 2-8 pixels to either side of a subject pixel. (One such measure is summing the absolute values of differences in values of adjacent pixels.) This frame of contrast information (or a downsampled frame) can comprise a keyvector—labeled as to its content, and posted for other processes to see and use. Similarly, the system can compute localized vertical greyscale image contrast, and post those results as another keyvector.

The system may further process these two keyvectors by, for each point in the image, subtracting the computed measure of local vertical image contrast from the computed measure of local horizontal image contrast. Normally, this operation yields a chaotic frame of data—at points strongly positive, and at points strongly negative. However, in barcode regions it is much less chaotic—having a strongly positive value across the barcode region. This data, too, can be posted for other processes to see, as yet another (third) keyvector that is routinely produced while the user is in the grocery store.

A fourth keyvector may be produced from the third, by applying a thresholding operation—identifying only those points having a value over a target value. This operation thus identifies the points in the image that seem potentially barcode-like in character, i.e., strong in horizontal contrast and weak in vertical contrast.

A fifth keyvector may be produced from the fourth, by applying a connected component analysis—defining regions (blobs) of points that seem potentially barcode-like in character.

A sixth keyvector may be produced by the fifth—consisting of three values: the number of points in the largest blob; and the locations of the upper left and lower right corners of that blob (defined in row and column offsets from the pixel at the upper left-most corner of the image frame).

These six keyvectors are produced prospectively—without a user expressly requesting them, just because the user is in a location associated with a grocery store. In other contexts, these keyvectors would not normally be produced.

These six operations may comprise a single recognition agent (i.e., a barcode locating agent). Or they may be part of a larger recognition agent (e.g., a barcode locating/reading agent), or they may be sub-functions that individually, or in combinations, are their own recognition agents.

(Fewer or further operations in the barcode reading process may be similarly performed, but these six illustrate the point.)

A barcode reader application may be among those loaded on the device. When in the grocery store, it may hum along at a very low level of operation—doing nothing more than examining the first parameter in the above-noted sixth keyvector for a value in excess of, e.g., 15,000. If this test is met, the barcode reader may instruct the system to present a dim barcode-indicating bauble at the location in the frame midway between the blob corner point locations identified by the second and third parameters of this sixth keyvector. This bauble tells the user that the device has sensed something that might be a barcode, and the location in the frame where it appears.

If the user taps that dim bauble, this launches (top-down) other operations needed to decode a barcode. For example, the region of the image between the two corner points identified in the sixth keyvector is extracted—forming a seventh keyvector.

A series of further operations then ensues. These can include filtering the extracted region with a low frequency edge detector, and using a Hough transform to search for nearly vertical lines.

Then, for each row in the filtered image, the position of the start, middle and end barcode patterns are identified through correlation, with the estimated right and left edges of the barcode used as guides. Then for each barcode digit, the digit's position in the row is determined, and the pixels in that position of the row are correlated with possible digit codes to determine the best match. This is repeated for each barcode digit, yielding a candidate barcode payload. Parity and check digit tests are then executed on the results from that row, and an occurrence count for that payload is incremented. These operations are then repeated for several more rows in the filtered image. The payload with the highest occurrence count is then deemed the correct barcode payload.

At this point, the system can illuminate the barcode's bauble brightly—indicating that data has been satisfactorily extracted. If the user taps the bright bauble, the device can present a menu of actions, or can launch a default action associated with a decoded barcode.

While in the arrangement just-described, the system stops its routine operation after generating the sixth keyvector, it could have proceeded further. However, due to resource constraints, it may not be practical to proceed further at every opportunity, e.g., when the first parameter in the sixth keyvector exceeds 15,000.

In one alternative arrangement, the system may proceed further once every, e.g., three seconds. During each three second interval, the system monitors the first parameter of the sixth keyvector—looking for (1) a value over 15,000, and (2) a value that exceeds all previous values in that three second interval. When these conditions are met, the system can buffer the frame, perhaps overwriting any previously-buffered frame. At the end of the three second interval, if a frame is buffered, it is the frame having the largest value of first parameter of any in that three second interval. From that frame the system can then extract the region of interest, apply the low frequency edge detector, find lines using a Hough procedure, etc., etc.—all the way through brightly illuminating the bauble if a valid barcode payload is successfully decoded.

Instead of rotely trying to complete a barcode reading operation every three seconds, the system can do so opportunistically—when the intermediate results are especially promising.

For example, while the barcode reading process may proceed whenever the number of points in the region of interest exceeds 15,000, that value is a minimum threshold at which a barcode reading attempt might be fruitful. The chance of reading a barcode successfully increases as this region of points becomes larger. So instead of proceeding further through the decoding process once every three seconds, further processing may be triggered by the occurrence of a value in excess of 50,000 (or 100,000, or 500,000, etc.) in the first parameter of the sixth keyvector.

Such a large value indicates that an apparent barcode occupies a substantial part of the camera's viewing frame. This suggests a deliberate action by the user—capturing a good view of a barcode. In this case, the remainder of the barcode reading operations can be launched. This affords an intuitive feel to the device's behavior: the user apparently intended to image a barcode, and the system—without any other instruction—launched the further operations required to complete a barcode reading operation.

In like fashion, the system can infer—from the availability of image information particularly suited to a certain type of operation—that the user intends, or would benefit from, that certain type of operation. It can then undertake processing needed for that operation, yielding an intuitive response. (Text-like imagery can trigger operations associated with an OCR process; face-like features can trigger operations associated with facial recognition, etc.)

This can be done regardless of context. For example, a device can periodically check for certain clues about the present environment, e.g., occasionally checking horizontal vs. vertical greyscale contrast in an image frame—in case barcodes might be in view. Although such operations may not be among those routinely loaded or loaded due to context, they can be undertaken, e.g., once every five seconds or so anyway, since the computational cost is small, and the discovery of visually useful information may be valued by the user.

Back to context, just as the system automatically undertook a different set of background image processing operations because the user's location was in a grocery, the system can similarly adapt its set of routinely-occurring processing operations based on other circumstances, or context.

One is history (i.e., of the user, or of social peers of the user). Normally we may not use barcode readers in our homes. However, a book collector may catalog new books in a household library by reading their ISBN barcodes. The first time a user employs the device for this functionality in the home, the operations generating the first-sixth keyvectors noted above may need to be launched in top-down fashion—launched because the user indicates interest in reading barcodes through the device's UI. Likewise the second time. Desirably, however, the system notes the repeated co-occurrence of (1) the user at a particular location, i.e., home, and (2) activation of barcode reading functionality. After such historical pattern has been established, the system may routinely enable generation of the first-sixth keyvectors noted above whenever the user is at the home location.

The system may further discern that the user activates barcode reading functionality at home only in the evenings. Thus, time can also be another contextual factor triggering auto-launching of certain image processing operations, i.e., these keyvectors are generated when the user is at home, in the evening.

Social information can also provide triggering data. The user may catalog books only as a solitary pursuit. When a spouse is in the house, the user may not catalog books. The presence of the spouse in the house may be sensed in various manners. One is by Bluetooth radio signals broadcast from the spouse's cell phone. Thus, the barcode-locating keyvectors may be automatically generated when (1) the user is at home, (2) in the evenings, (3) without proximity to the user's spouse. If the spouse is present, or if it is daytime, or if the user is away from home (and the grocery), the system may not routinely generate the keyvectors associated with barcode-locating.

Bayesian or other statistical models of user behavior can be compiled and utilized to detect such co-occurrence of repeated circumstances, and then be used to trigger actions based thereon.

(In this connection, the science of branch prediction in microprocessor design can be informative. Contemporary processors include pipelines that may comprise dozens of stages—requiring logic that fetches instructions to be used 15 or 20 steps ahead. A wrong guess can require flushing the pipeline—incurring a significant performance penalty. Microprocessors thus include branch prediction registers, which track how conditional branches were resolved, e.g., the last 255 times. Based on such historical information, performance of processors is greatly enhanced. In similar fashion, tracking historical patterns of device usage—both by the user and proxies (e.g., the user's social peers, or demographic peers), and tailoring system behavior based on such information, can provide important performance improvements.)

Audio clues (discussed further below) may also be involved in the auto-triggering of certain image processing operations. If auditory clues suggest that the user is outdoors, one set of additional background processing operations can be launched; if the clues suggest the user is driving, a different set of operations can be launched. Likewise if the audio has hallmarks of a television soundtrack, or if the audio suggests the user is in an office environment. The software components loaded and running in the system can thus adapt automatically in anticipation of stimuli that may be encountered—or operations the user may request—in that particular environment. (Similarly, in a hearing device that applies different audio processing operations to generate keyvectors needed by different audio functions, information sensed from the visual environment can indicate a context that dictates enablement of certain audio processing operations that may not normally be run.)

Environmental clues can also cause certain functions to be selected, launched, or tailored. If the device senses the ambient temperature is negative ten degrees Celsius, the user is presumably outdoors, in winter. If facial recognition is indicated (e.g., by user instruction, or by other clue), any faces depicted in imagery may be bundled in hats and/or scarves. A different set of facial recognition operations may thus be employed—taking into account the masking of certain parts of the face—than if, e.g., the context is a hot summer day, when people's hair and ears are expected to be exposed.

Other user interactions with the system can be noted, and lead to initiation of certain image processing operations that are not normally run—even if the noted user interactions do not involve such operations. Consider a user who queries a web browser on the device (e.g., by text or spoken input) to identify nearby restaurants. The query doesn't involve the camera or imagery. However, from such interaction, the system may infer that the user will soon (1) change location, and (2) be in a restaurant environment. Thus, it may launch image processing operations that may be helpful in, e.g., (1) navigating to a new location, and (2) dealing with a restaurant menu.

Navigation may be aided by pattern-matching imagery from the camera with curbside imagery along the user's expected route (e.g., from Google Streetview or other image repository, using SIFT). In addition to acquiring relevant imagery from Google, the device can initiate image processing operations associated with scale-invariant feature transform operations.

For example, the device can resample image frames captured by the camera at different scale states, producing a keyvector for each. To each of these, a Difference of Gaussians function may be applied, yielding further keyvectors. If processing constraints allow, these keyvectors can be convolved with blur filters, producing still further keyvectors, etc.—all in anticipation of possible use of SIFT pattern matching.

In anticipation of viewing a restaurant menu, operations incident to OCR functionality can be launched.

For example, while the default set of background image processing operations includes a detector for long edges, OCR requires identifying short edges. Thus, an algorithm that identifies short edges may be launched; this output can be expressed in a keyvector.

Edges that define closed contours can be used to identify character-candidate blobs. Lines of characters can be derived from the positions of these blobs, and skew correction can be applied. From the skew-corrected lines of character blobs, candidate word regions can be discerned. Pattern matching can then be applied to identify candidate texts for those word regions. Etc., Etc.

As before, not all of these operations may be performed on every processed image frame. Certain early operations may be routinely performed, and further operations can be undertaken based on (1) timing triggers, (2) promising attributes of the data processed so far, (3) user direction, or (4) other criteria.

Back to the grocery store example, not only can context influence the types of image processing operations that are undertaken, but also the meaning to be attributed to different types of information (both image information as well as other information, e.g., geolocation).

Consider a user's phone that captures a frame of imagery in a grocery. The phone may immediately respond—suggesting that the user is facing cans of soup. It can do this by referring to geolocation data and magnetometer (compass) data, together with stored information about the layout of that particular store—indicating the camera is facing shelves of soups. A bauble, in its initial stages, may convey this first guess to the user, e.g., by an icon representing a grocery item, or by text, or by linked information.

An instant later, during initial processing of the pixels in the captured frame, the device may discern a blob of red pixels next to a blob of white pixels. By reference to a reference data source associated with the grocery store context (and, again, perhaps also relying on the geolocation and compass data), the device may quickly guess (e.g., in less than a second) that the item is (most likely) a can of Campbell's soup, or (less likely) a bottle of ketchup. A rectangle may be superimposed on the screen display—outlining the object(s) being considered by the device.

A second later, the device may have completed an OCR operation on large characters on the white background, stating TOMATO SOUP—lending further credence to the Campbell's soup hypothesis. After a short further interval, the phone may have managed to recognize the stylized script "Campbell's" in the red area of the imagery—confirming that the object is not a store brand soup that is imitating the Campbell's color scheme. In a further second, the phone may have decoded a barcode visible on a nearby can, detailing the size, lot number, manufacture date, and/or other information relating to the Campbell's Tomato Soup. At each stage, the bauble—or linked information—evolves in accordance with the device's refined understanding of the object towards which the camera is pointing. (At any point the user can instruct the device to stop its recognition work—perhaps by a quick shake—preserving battery and other resources for other tasks.)

In contrast, if the user is outdoors (sensed, e.g., by GPS, and/or bright sunshine), the phone's initial guess concerning a blob of red pixels next to a blob of white pixels will likely not be a Campbell's soup can. Rather, it may more likely guess it to be a U.S. flag, or a flower, or an article of clothing, or a gingham tablecloth—again by reference to a data store of information corresponding to the outdoors context.

Intuitive Computing Platform (ICP) Context Engine, Identifiers

Arthur C. Clarke is quoted as having said "Any sufficiently advanced technology is indistinguishable from magic." "Advanced" can have many meanings, but to imbue mobile devices with something akin to magic, the present specification interprets the term as "intuitive" or "smart."

Figures 11, 13:
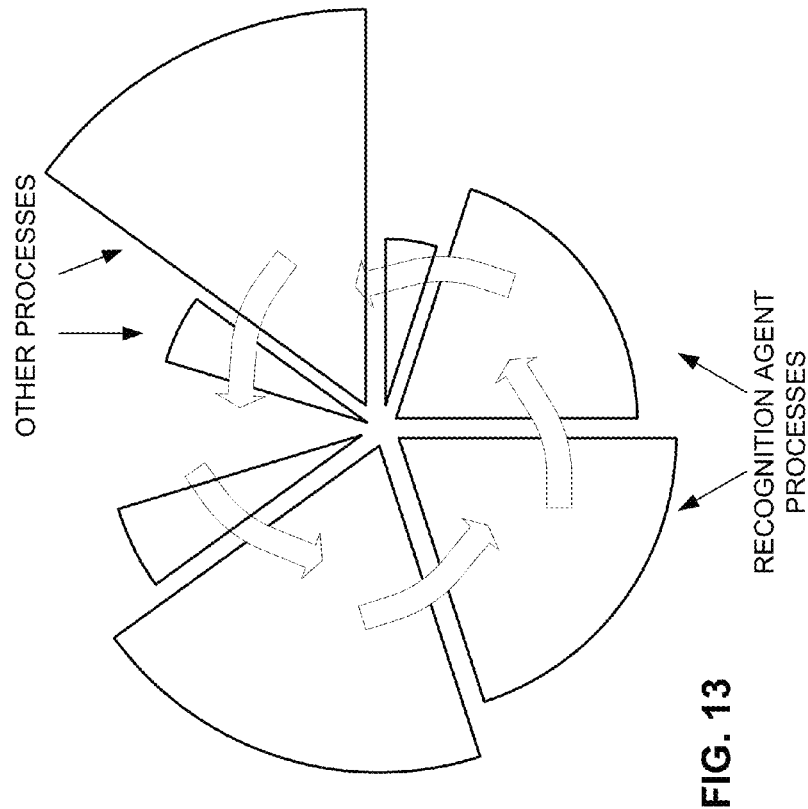
FIG. 11 shows certain aspects involved in discerning user intent.
FIG. 13 is another view of the FIG. 12 arrangement.

An important part of intuitive behavior is the ability to sense—and then respond to—the user's probable intent. As shown in FIG. 11, intent is a function not only of the user, but also of the user's past. Additionally, intent can also be regarded as a function of activities of the user's peers, and their pasts.

In determining intent, context is a key. That is, context informs the deduction of intent, in the sense that knowing, e.g., where the user is, what activities the user and others have engaged in the last time at this location, etc., is valuable in discerning the user's likely activities, needs and desires at the present moment. Such automated reasoning about a user's behavior is a core goal of artificial intelligence, and much has been written on the subject. (See, e.g., Choudhury et al, "Towards Activity Databases: Using Sensors and Statistical Models to Summarize People's Lives," IEEE Data Eng. Bull, 29(1): 49-58, March, 2006.)

Sensor data, such as imagery, audio, motion information, location, and Bluetooth signals, are useful in inferring a user's likely activity (or in excluding improbable activities). As noted in Choudhury, such data can be provided to a software module that processes the sensor information into features that can help discriminate between activities. Features can include high level information (such as identification of objects in the surroundings, or the number of people nearby, etc.), or low level information (such as audio frequency content or amplitude, image shapes, correlation coefficients, etc.). From such features, a computational model can deduce probable activity (e.g., walking, talking, getting coffee, etc.).

In addition to the wealth of data provided by mobile device sensors, other features useful in understanding context (and thus intent) can be derived from nearby objects. A tree suggests an outdoor context; a television suggests an indoor context. Some objects have associated metadata—greatly advancing contextual understanding. For example, some objects within the user's environment may have RFIDs or the like. The RFIDs convey unique object IDs. Associated with these unique object IDs, typically in a remote data store, are fixed metadata about the object to which the RFID5 are attached (e.g., color, weight, ownership, provenance, etc). So rather than trying to deduce relevant information from pixels alone, sensors in the mobile device—or in the environment, to which the mobile device links—can sense these carriers of information, obtain related metadata, and use this information in understanding the present context.

(RFID5 are exemplary only; other arrangements can also be employed, e.g., digital watermarking, fingerprinting, etc.)

Because user activities are complex, and neither object data nor sensor data lends itself to unambiguous conclusions, computational models for inferring the user's likely activity, and intent, are commonly probabilistic. Generative techniques can be used (e.g., Bayesian, hidden Markov, etc.). Discriminative techniques for class boundaries (e.g., posterior probability) can also be employed. So too with relational probabilistic and Markov network models. In these approaches, probabilities can also depend on properties of others in the user's social group(s).

In one particular arrangement, the determination of intent is based on local device observations, mapped against templates that may be stored in the cloud.

By discerning intent, the present technology reduces the search-space of possible responses to stimuli, and can be used to segment input data to discern activities, objects and produce identifiers. Identifiers can be constructed with explicit and derived metadata.

To back up a bit, it is desirable for every content object to be identified. Ideally, an object's identifier would be globally unique and persistent. However, in mobile device visual query, this ideal is often unattainable (except in the case, e.g., of objects bearing digitally watermarked indicia). Nonetheless, within a visual query session, it is desirable for each discerned object to have an identifier that is unique within the session.

One possible construct of a unique identifier (UID) includes two or three (or more) components. One is a transaction ID, which may be a session ID. (One suitable session ID is a pseudo-random number, e.g., produced by a PRN generator seeded with a device identifier, such as a MAC identifier. In other arrangements, the session ID can convey semantic information, such as the UNIX time at which the sensor most recently was activated from an off, or sleep, state). Such a transaction ID serves to reduce the scope needed for the other identification components, and helps make the identifier unique. It also places the object identification within the context of a particular session, or action.

Another component of the identifier can be an explicit object ID, which may be the clump ID referenced earlier. This is typically an assigned identifier. (If a clump is determined to include several distinctly identifiable features or objects, further bits can be appended to the clump ID to distinguish same.)

Yet another component can be derived from the object, or circumstances, in some fashion. One simple example is a "fingerprint"—statistically unique identification information (e.g., SIFT, image signature, etc.) derived from features of the object itself. Additionally or alternatively, this component may consist of information relating to context, intent, deduced features—essentially anything that can be used by a subsequent process to assist in the determination of identity. This third component may be regarded as derived metadata, or "aura" associated with the object.

The object identifier can be a concatenation, or other combination, of such components.

Pie Slices, etc.

The different recognition processes invoked by the system can operate in parallel, or in cyclical serial fashion. In the latter case a clock signal or the like may provide a cadence by which different of the pie slices are activated.

Figure 12:
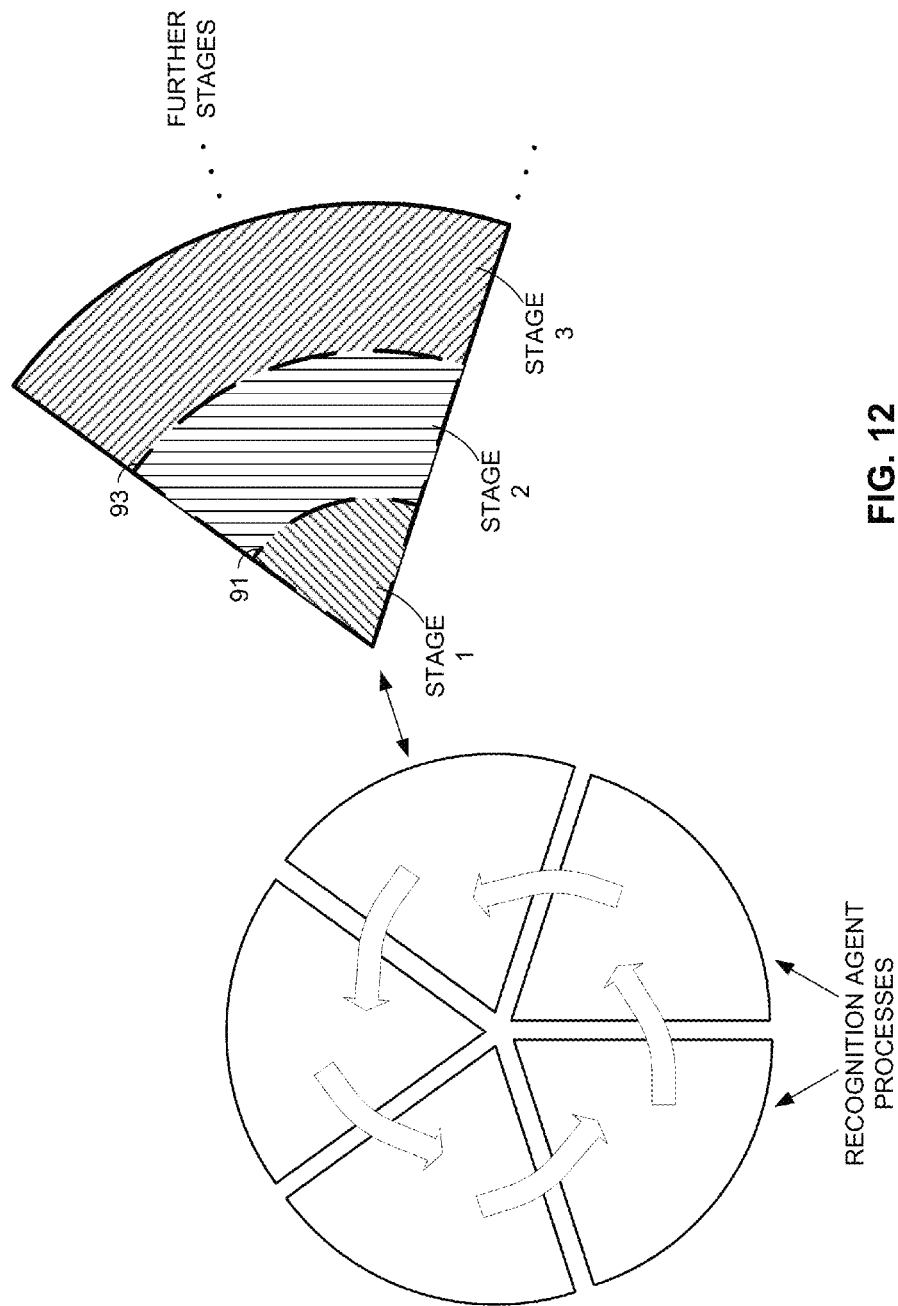
FIG. 12 depicts a cyclical processing arrangement that can be used in certain implementations.

FIG. 12 shows such a cyclical processing arrangement as a circle of pie slices. Each slice represents a recognition agent process, or another process. The arrows indicate the progression from one to the next. As shown by the expanded slice to the right, each slice can include several distinct stages, or states.

An issue confronted by the present technology is resource constraints. If there were no constraints, a seeing/hearing device could apply myriad resource-intensive recognition algorithms to each frame and sequence of incoming data, constantly—checking each for every item of potential interest to the user.

In the real world, processing has costs. The problem can be phrased as one of dynamically identifying processes that should be applied to the incoming data, and dynamically deciding the type and quantity of resources to devote to each.

In FIG. 12, different stages of the pie slice (recognition agent process) correspond to further levels of resource consumption. The innermost (pointed) stage generally uses the least resources. The cumulative resource burden increases with processing by successive stages of the slice. (Although each stage will often be more resource-intensive than those that preceded it, this is not required.)

One way this type of behavior can be achieved is by implementing recognition and other operations as "cascaded sequences of operations," rather than as monolithic operations. Such sequences frequently involve initial operations with relatively low overheads, which—when successful—can be continued by operations which may require more resources, but are now only initiated after an initial indicator of likely success. The technique can also facilitate opportunistic substitution of already available keyvectors for related features normally used by an operation, again decreasing resource overhead as noted earlier.

Consider, for discussion purposes, a facial recognition agent. To identify faces, a sequence of tests is applied. If any fails, then it is unlikely a face is present.

An initial test (common to many processes) is to check whether the imagery produced by the camera has features of any sort (vs., e.g., the camera output when in a dark purse or pocket). This may be done by a simple histogram analysis of grey-scale pixel values for a sparse sampling of pixel locations across the image. If the histogram analysis shows all of the sampled pixels have substantially the same grey-scale output, then further processing can be skipped.

If the histogram shows some diversity in pixel grey-scale values, then the image can next be checked for edges. An image without discernible edges is likely an unusable image, e.g., one that is highly blurred or out-of-focus. A variety of edge detection filters are familiar to the artisan, as indicated above.

If edges are found, the facial detection procedure may next check whether any edge is curved and defines a closed region. (The oval finder, which runs as a routine background operation in certain implementations, may allow the process to begin at this step.)

If so, a color histogram may be performed to determine whether a significant percentage of pixels within the closed region are similar in hue to each other (skin comprises most of the face). "Significant" may mean greater than 30%, 50%, 70%, etc. "Similar" may mean within a distance threshold or angular rotation in a CIELAB sense. Tests for color within predefined skin tone ranges may optionally be applied.

Next, a thresholding operation may be applied to identify the darkest 5% of the pixels within the closed region. These pixels can be analyzed to determine if they form groupings consistent with two eyes.

Such steps continue, in similar fashion, through the generation of eigenvectors for the candidate face(s). (Facial eigenvectors are computed from the covariance matrix of the probability distribution of the high-dimensional vector space representation of the face.) If so, the eigenvectors may be searched for a match in a reference data structure—either local or remote.

If any of the operations yields a negative result, the system can conclude that no discernible face is present, and terminate further face-finding efforts for that frame.

All of these steps can form stages in a single pie slice process. Alternatively, one or more steps may be regarded as elemental, and useful to several different processes. In such case, such step(s) may not form part of a special purpose pie slice process, but instead can be separate. Such step(s) can be implemented in one or more pie slice processes—cyclically executing with other agent processes and posting their results to the blackboard (whether other agents can find them). Or they can be otherwise implemented.

In applying the system's limited resources to the different on-going processes, detection state can be a useful concept. At each instant, the goal sought by each agent (e.g., recognizing a face) may seem more or less likely to be reached. That is, each agent may have an instantaneous detection state on a continuum, from very promising, through neutral, down to very discouraging. If the detection state is promising, more resources may be allocated to the effort. If its detection state tends towards discouraging, less resources can be allocated. (At some point, a threshold of discouragement may be reached that causes the system to terminate that agent's effort.) Detection state can be quantified periodically by a software routine (separate, or included in the agent process) that is tailored to the particular parameters with which the agent process is concerned.

Some increased allocation of resources tends to occur when successive stages of agent processing are invoked (e.g., an FFT operation—which might occur in a $7^{th}$ stage, is inherently more complex than a histogram operation—which might occur in a $4^{th}$ stage). But the system can also meter allocation of resources apart from base operational complexity. For example, a given image processing operation might be performed on either the system's CPU, or the GPU. An FFT might be executed with 1 MB of scratchpad memory for calculation, or 10 MB. A process might be permitted to use (faster-responding) cache data storage in some circumstances, but only (slower-responding) system memory in others. One stage may be granted access to a 4G network connection in one instance, but a slower 3G or WiFi network connection in another. Processes that yield most promising results can be granted privileged status in consumption of system resources.

In a further arrangement, not only does allocation of resources depend on the agent's state in achieving its goal, but also its speed or acceleration to that end. For example, if promising results are appearing quickly in response to an initial resource effort level, then not only can additional resources be applied, but more additional resources can be applied than if the promising results appeared less quickly. Allocation of resources can thus depend not only on detection state (or other metric of performance or result), but also on a first- or higher-order derivative of such a measure.

Relatedly, data produced by one stage of a detection agent process may be so promising that the process can jump ahead one or more stages—skipping intervening stages. This may be the case, e.g., where the skipped stage(s) doesn't produce results essential to the process, but is undertaken simply to gain greater confidence that processing by still further stages is merited. For example, a recognition agent may perform stages 1, 2 and 3 and then—based a confidence metric from the output of stage 3—skip stage 4 and execute stage 5 (or skip stages 4 and 5 and execute stage 6, etc.).

Just as resource allocation and stage-skipping can be prompted by detection state, they can also be prompted by user input. If the user provides encouragement for a particular process, that process can be allocated extra resources, and/or may continue beyond a point at which its operation might otherwise have been automatically curtailed for lack of promising results. (E.g., if the detection state continuum earlier noted runs from scores of 0<wholly discouraging> to 100<wholly encouraging>, and the process normally terminates operation if its score drops below a threshold of 35, then that threshold may be dropped to 25, or 15, if the user provides encouragement for that process. The amount of threshold change can be related to an amount of encouragement received.)

The user encouragement can be express or implied. An example of express encouragement is where the user provides input signals (e.g., screen taps, etc.), instructing that a particular operation be performed (e.g., a UI command instructing the system to process an image to identify the depicted person).

In some embodiments the camera is continuously capturing images—monitoring the visual environment without particular user instruction. In such case, if the user activates a shutter button or the like, then that action can be interpreted as evidence of express user encouragement to process the imagery framed at that instant.

One example of implied encouragement is where the user taps on a person depicted in an image. This may be intended as a signal to learn more about the person, or it may be a random act. Regardless, it is sufficient to cause the system to increase resource allocation to processes relating to that part of the image, e.g., facial recognition. (Other processes may also be prioritized, e.g., identifying a handbag, or shoes, worn by the person, and researching facts about the person after identification by facial recognition—such as through use of a social network, e.g., LinkedIn or Facebook; through use of Google, pipl<dot>com, or other resource.)

The location of the tap can be used in deciding how much increase in resources should be applied to different tasks (e.g., the amount of encouragement). If the person taps the face in the image, then more extra resources may be applied to a facial recognition process than if the user taps the person's shoes in the image. In this latter case, a shoe identification process may be allocated a greater increase in resources than the facial recognition process. (Tapping the shoes can also start a shoe recognition process, if not already underway.)

Another example of implied user encouragement is where the user positions the camera so that a particular subject is at the center point of the image frame. This is especially encouraging if the system notes a temporal sequence of frames, in which the camera is re-oriented—moving a particular subject to the center point.

As before, the subject may be comprised of several parts (shoes, handbag, face, etc.). The distance between each such part, and the center of the frame, can be taken as inversely related to the amount of encouragement. That is, the part at the center frame is impliedly encouraged the most, with other parts encouraged successively less with distance. (A mathematical function can relate distance to encouragement. For example, the part on which the frame is centered can have an encouragement value of 100, on a scale of 0 to 100. Any part at the far periphery of the image frame can have an encouragement value of 0. Intermediate positions may correspond to encouragement values by a linear relationship, a power relationship, a trigonometric function, or otherwise.)

If the camera is equipped with a zoom lens (or digital zoom function), and the camera notes a temporal sequence of frames in which the camera is zoomed into a particular subject (or part), then such action can be taken as implied user encouragement for that particular subject/part. Even without a temporal sequence of frames, data indicating the degree of zoom can be taken as a measure of the user's interest in the framed subject, and can be mathematically transformed into an encouragement measure.

For example, if the camera has a zoom range of 1× to 5×, a zoom of 5× may correspond to an encouragement factor of 100, and a zoom of 1× may correspond to an encouragement factor of 1. Intermediate zoom values may correspond to encouragement factors by a linear relationship, a power relationship, a trigonometric function, etc.

Inference of intent may also be based on the orientation of features within the image frame. Users are believed to generally hold imaging devices in an orientation that frames intended subjects vertically. By reference to accelerometer data, or otherwise, the device can discern whether the user is holding the imager in position to capture a "landscape" or "portrait" mode image, from which "vertical" can be determined. An object within the image frame that has a principal axis (e.g., an axis of rough symmetry) oriented vertically is more likely to be a subject of the user's intention than an object that is inclined from vertical.

(Other clues for inferring the subject of a user's intent in an image frame are discussed in U.S. Pat. No. 6,947,571.)

While the preceding discussion contemplated non-negative encouragement values, in other embodiments negative values can be utilized, e.g., in connection with express or implied user disinterest in particular stimuli, remoteness of an image feature from the center of the frame, etc.

Encouragement—of both positive and negative varieties—can be provided by other processes. If a bar code detector starts sensing that the object at the center of the frame is a bar code, its detection state metric increases. Such a conclusion, however, tends to refute the possibility that the subject at the center of the frame is a face. Thus, an increase in detection state metric by a first recognition agent can serve as negative encouragement for other recognition agents that are likely mutually exclusive with that first agent.

The encouragement and detection state metrics for plural recognition agents can be combined by various mathematical algorithms to yield a hybrid control metric. One is their sum—yielding an output ranging from 0-200 in the case of two agents (absent negative values for encouragement). Another is their product, yielding an output ranging from 0-10,000. Resources can be re-allocated to different recognition agents as their respective hybrid control metrics change.

The recognition agents can be of different granularity and function, depending on application. For example, the facial recognition process just-discussed may be a single pie slice of many stages. Or it can be implemented as several, or dozens, of related, simpler processes—each its own slice.

It will be recognized that the pie slice recognition agents in FIG. 12 are akin to DLLs—code that is selectively loaded/invoked to provide a desired class of services. (Indeed, in some implementations, software constructs associated with DLLs can be used, e.g., in the operating system to administer loading/unloading of agent code, to publish the availability of such functionality to other software, etc. DLL-based services can also be used in conjunction with recognition agents.) However, the preferred recognition agents have behavior different than DLLs. In one aspect, this different behavior may be described as throttling, or state-hopping. That is, their execution—and supporting resources—vary based on one or more factors, e.g., detection state, encouragement, etc.

FIG. 13 shows another view of the FIG. 12 arrangement. This view clarifies that different processes may consume differing amounts of processor time and/or other resources. (Implementation, of course, can be on a single processor system, or a multi-processor system. In the future, different processors or "cores" of a multi-processor system may be assigned to perform different of the tasks.)

Sometimes a recognition agent fails to achieve its goal(s) for lack of satisfactory resources, whether processing resources, input data, or otherwise. With additional or better resources, the goal might be achieved.

For example, a facial recognition agent may fail to recognize the face of a person depicted in imagery because the camera was inclined 45 degrees when the image was captured. At that angle, the nose is not above the mouth—a criterion the agent may have applied in discerning whether a face is present. With more processing resources, that criterion might be relaxed or eliminated. Alternatively, the face might have been detected if results from another agent—e.g., an orientation agent—had been available, e.g., identifying the inclination of the true horizon in the imagery. Knowing the inclination of the horizon could have allowed the facial recognition agent to understand "above" in a different way—one that would have allowed it to identify a face. (Similarly, if a previously- or later-captured frame was analyzed, a face might have been discerned.)

In some arrangements the system does further analysis on input stimuli (e.g., imagery) when other resources become available. To cite a simple case, when the user puts the phone into a purse, and the camera sensor goes dark or hopelessly out of focus (or when the user puts the phone on a table so it stares at a fixed scene—perhaps the table or the ceiling), the software may reactivate agent processes that failed to achieve their aim earlier, and reconsider the data. Without the distraction of processing a barrage of incoming moving imagery, and associated resource burdens, these agents may now be able to achieve their original aim, e.g., recognizing a face that was earlier missed. In doing this, the system may recall output data from other agent processes—both those available at the time the subject agent was originally running, and also those results that were not available until after the subject agent terminated. This other data may aid the earlier-unsuccessful process in achieving its aim. (Collected "trash" collected during the phone's earlier operation may be reviewed for clues and helpful information that was overlooked—or not yet available—in the original processing environment in which the agent was run.) To reduce battery drain during such an "after-the-fact mulling" operation, the phone may switch to a power-saving state, e.g., disabling certain processing circuits, reducing the processor clock speed, etc.

In a related arrangement, some or all of the processes that concluded on the phone without achieving their aim may be continued in the cloud. The phone may send state data for the unsuccessful agent process to the cloud, allowing the cloud processor to resume the analysis (e.g., algorithm step and data) where the phone left off. The phone can also provide the cloud with results from other agent processes—including those not available when the unsuccessful agent process was concluded. Again, data "trash" can also be provided to the cloud as a possible resource, in case information earlier discarded takes on new relevance in the cloud's processing. The cloud can perform a gleaning operation on all such data—trying to find useful nuggets of information, or meaning, that the phone system may have overlooked. These results, when returned to the phone, may in turn cause the phone to re-assess information it was or is processing, perhaps allowing it to discern useful information that would otherwise have been missed. (E.g., in its data gleaning process, the cloud may discover that the horizon seems to be inclined 45 degrees, allowing the phone's facial recognition agent to identify a face that would otherwise have been missed.)

While the foregoing discussion focused on recognition agents, the same techniques can also be applied to other processes, e.g., those ancillary to recognition, such as establishing orientation, or context, etc.

More on Constraints

Figure 14:
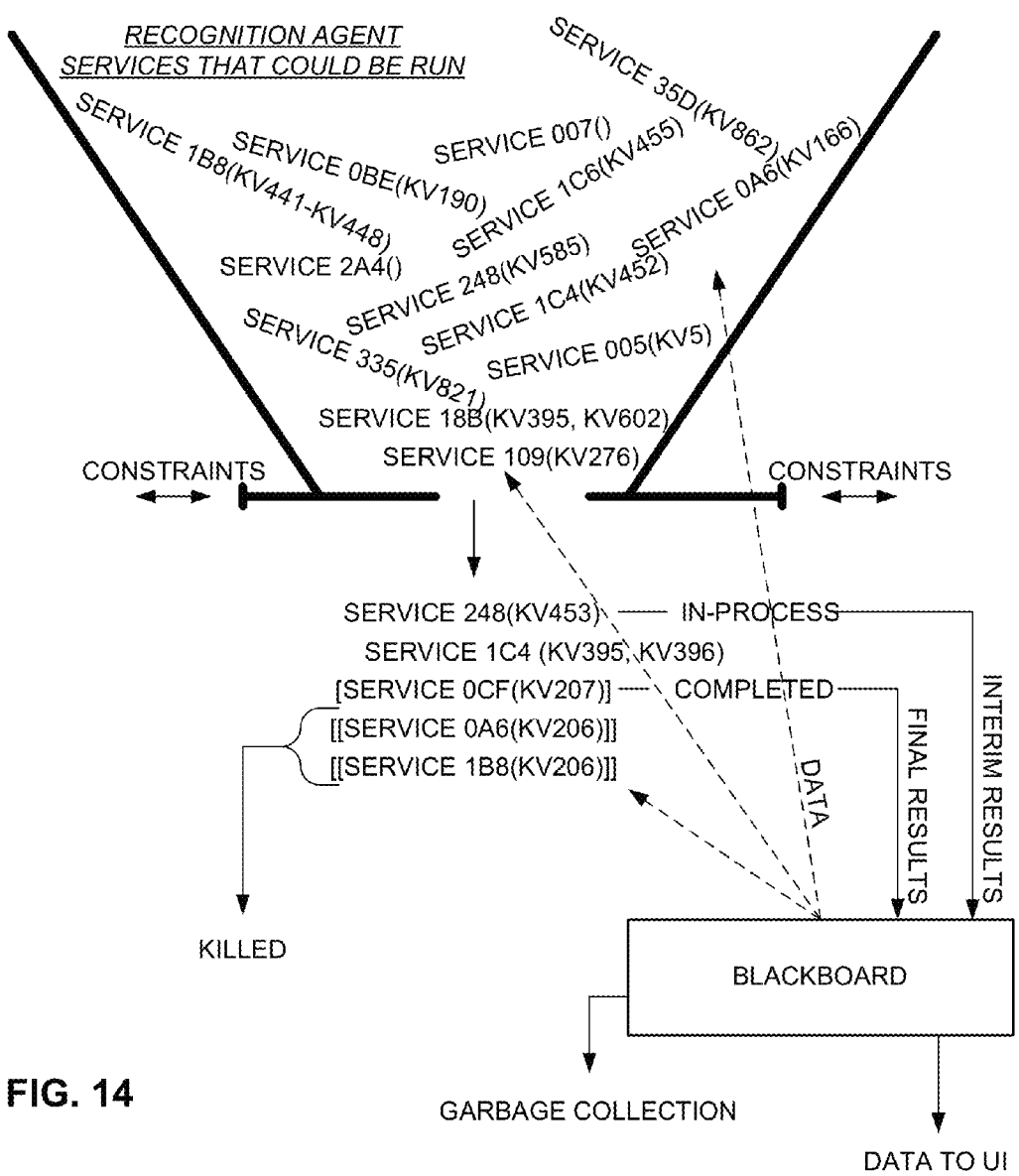
FIG. 14 is a conceptual view depicting certain aspects of system operation.

FIG. 14 is a conceptual view depicting certain aspects of technology that can be employed in certain embodiments. The top of the drawing show a hopper full of Recognition Agent (RA) services that could be run—most associated with one or more keyvectors to be used as input for that service.

However, system constraints do not permit execution of all these services. Thus, the bottom of the hopper is shown graphically as gated by constraints—allowing more or less services to be initiated depending on battery state, other demands on CPU, etc.

Those services that are allowed to run are shown under the hopper. As they execute they may post interim or final results to the blackboard. (In some embodiments they may provide outputs to other processes or data structures, such as to a UI manager, to another Recognition Agent, to an audit trail or other data store, to signal to the operating system—e.g., for advancing a state machine, etc.)

Known garbage collection techniques are employed in the blackboard to remove data that is no longer relevant. Removed data may be transferred to a long term store, such as a disk file, to serve as a resource in other analyses. (It may also be transferred, or copied, to the cloud—as noted below.)

Some services run to completion and terminate (shown in the drawing by single brackets)—freeing resources that allow other services to be run. Other services are killed prior to completion (shown by double brackets). This can occur for various reasons. For example, interim results from the service may not be promising (e.g., an oval now seems more likely a car tire than a face). Or system constraints may change—e.g., requiring termination of certain services for lack of resources. Or other, more promising, services may become ready to run, requiring reallocation of resources. Although not depicted in the FIG. 14 illustration, interim results from processes that are killed may be posted to the blackboard—either during their operation, or at the point they are killed. (E.g., although a facial recognition application may terminate if an oval looks more like a car tire than a face, a vehicle recognition agent can use such information.)

Data posted to the blackboard is used in various ways. One is to trigger screen display of baubles, or to serve other user interface requirements.

Data from the blackboard may also be made available as input to Recognition Agent services, e.g., as an input keyvector. Additionally, blackboard data may signal a reason for a new service to run. For example, detection of an oval—as reported on the blackboard—may signal that a facial recognition service should be run. Blackboard data may also increase the relevance score of a service already waiting in the (conceptual) hopper—making it more likely that the service will be run. (E.g., an indication that the oval is actually a car tire may increase the relevance score of a vehicle recognition process to the point that the agent process is run.)

The relevance score concept is shown in FIG. 15. A data structure maintains a list of possible services to be run (akin to the hopper of FIG. 14). A relevance score is shown for each. This is a relative indication of the importance of executing that service (e.g., on a scale of 1-100). The score can be a function of multiple variables—depending on the particular service and application, including data found on the blackboard, context, expressed user intent, user history, etc. The relevance score typically changes with time as more data becomes available, the context changes, etc. An on-going process can update the relevance scores based on current conditions.

Some services may score as highly relevant, yet require more system resources than can be provided, and so do not run. Other services may score as only weakly relevant, yet may be so modest in resource consumption that they can be run regardless of their low relevance score. (In this class may be the regularly performed image processing operations detailed earlier.)

Data indicating the cost to run the service—in terms of resource requirements, is provided in the illustrated data structure (under the heading Cost Score in FIG. 15). This data allows a relevance-to-cost analysis to be performed.

The illustrated cost score is an array of plural numbers—each corresponding to a particular resource requirement, e.g., memory usage, CPU usage, GPU usage, bandwidth, other cost (such as for those services associated with a financial charge), etc. Again, an arbitrary 0-100 score is shown in the illustrative arrangement. Only three numbers are shown (memory usage, CPU usage, and cloud bandwidth), but more or less could of course be used.

The relevance-to-cost analysis can be as simple or complex as the system warrants. A simple analysis is to subtract the combined cost components from the relevance score, e.g., yielding a result of −70 for the first entry in the data structure. Another simple analysis is to divide the relevance by the aggregate cost components, e.g., yielding a result of 0.396 for the first entry.

Similar calculations can be performed for all services in the queue, to yield net scores by which an ordering of services can be determined. A net score column is provided in FIG. 15, based on the first analysis above.

In a simple embodiment, services are initiated until a resource budget granted to the Intuitive Computing Platform is reached. The Platform may, for example, be granted 300 MB of RAM memory, a data channel of 256 Kbits/second to the cloud, a power consumption of 50 milliwatts, and similarly defined budgets for CPU, GPU, and/or other constrained resources. (These allocations may be set by the device operating system, and change as other system functions are invoked or terminate.) When any of these thresholds is reached, no more Recognition Agent services are started until circumstances change.

While simple, this arrangement caps all services when a first of the defined resource budgets is reached. Generally preferable are arrangements that seek to optimize the invoked services in view of several or all of the relevant constraints. Thus, if the 256 Kbit/second cloud bandwidth constraint is reached, then the system may still initiate further services that have no need for cloud bandwidth.

In more sophisticated arrangements, each candidate service is assigned a figure of merit score for each of the different cost components associated with that service. This can be done by the subtraction or division approaches noted above for calculation of the net score, or otherwise. Using the subtraction approach, the cost score of 37 for memory usage of the first-listed service in FIG. 15 yields a memory figure of merit of 9 (i.e., 46−37). The service's figures of merit for CPU usage and cloud bandwidth are −18 and 31, respectively. By scoring the candidate services in terms of their different resource requirements, a selection of services can be made that more efficiently utilizes system resources.

As new Recognition Agents are launched and others terminate, and other system processes vary, the resource headroom (constraints) will change. These dynamic constraints are tracked (FIG. 16), and influence the process of launching (or terminating) Recognition Agents. If a memory-intensive RA completes its operation and frees 40 MB of memory, the Platform may launch one or more other memory-intensive applications to take advantage of the recently-freed resource.

(The artisan will recognize that the task of optimizing consumption of different resources by selection of different services is an exercise in linear programming, to which there are many well known approaches. The arrangements detailed here are simpler than those that may be employed in practice, but help illustrate the concepts.)

Returning to FIG. 15, the illustrated data structure also includes "Conditions" data. A service may be highly relevant, and resources may be adequate to run it. However, conditions precedent to the execution may not yet be met. For example, another Registration Agent service that provides necessary data may not yet have completed. Or the user (or agent software) may not yet have approved an expenditure required by the service, or agreed to a service's click-wrap legal agreement, etc.

Once a service begins execution, there can be a programmed bias to allow it to run to completion, even if resource constraints change to put the aggregate Intuitive Computing Platform above its maximum budget. Different biases can be associated with different services, and with different resources for a given service. FIG. 15 shows biases for different constraints, e.g., memory, CPU and cloud bandwidth. In some cases, the bias may be less than 100%, in which case the service would not be launched if availability of that resource is below the bias figure.

For example, one service may continue to run until the aggregate ICP bandwidth is at 110% of its maximum value, whereas another service may terminate immediately when the 100% threshold is crossed.

If a service is a low user of a particular resource, a higher bias may be permitted. Or if a service has a high relevance score, a higher bias may be permitted. (The bias may be mathematically derived from the relevance score, such as Bias=90+Relevance Score, or 100, whichever is greater.)

Such arrangement allows curtailment of services in a programmable manner when resource demands dictate, depending on biases assigned to the different services and different constraints.

In some arrangements, services may be allowed to run, but with throttled-back resources. For example, a service may normally have a bandwidth requirement of 50 Kbit/sec. However, in a particular circumstance, its execution may be limited to use of 40 Kbit/sec. Again, this is an exercise in optimization, the details of which will vary with application.

Local Software

In one particular embodiment, the local software on the mobile device may be conceptualized as performing six different classes of functions (not including installation and registering itself with the operating system).

A first class of functions relates to communicating with the user. This allows the user to provide input, specifying, e.g., who the user is, what the user is interested in, what recognition operations are relevant to the user (tree leaves: yes; vehicle types: no), etc. (The user may subscribe to different recognition engines, depending on interests.) The user interface functionality also provides the needed support for the hardware UI devices—sensing input on a touchscreen and keyboard, outputting information on the display screen etc.

To communicate effectively with the user, the software desirably has some 3D understanding of the user's environment, e.g., how to organize the 2D information presented on the screen, informed by knowledge that there's a 3D universe that is being represented; and how to understand the 2D information captured by the camera, knowing that it represents a 3D world. This can include a library of orthographic blitting primitives. This gets into the second class.

A second class of functions relates to general orientation, orthography and object scene parsing. These capabilities provide contextual common denominators that can help inform object recognition operations (e.g., the sky is up, the horizon in this image is inclined 20 degrees to the right, etc.)

A third class gets into actual pixel processing, and may be termed KeyVector Processing and Packaging. This is the universe of known pixel processing operations—transformations, template matching, etc., etc. Take pixels and crunch.

While 8×8 blocks of pixels are familiar in many image processing operations (e.g., JPEG), that grouping is less dominant in the present context (although it may be used in certain situations). Instead, five types of pixel groupings prevail.

The first grouping is not a grouping at all, but global. E.g., is the lens cap on? What is the general state of focus? This is a category without much—if any—parsing.

The second grouping is rectangular areas. A rectangular block of pixels may be requested for any number of operations.

The third grouping is non-rectangular contiguous areas.

Fourth is an enumerated patchworks of pixels. While still within a single frame, this is a combination of the second and third groupings—often with some notion of coherence (e.g., some metric or some heuristic that indicates a relationship between the included pixels, such as relevance to a particular recognition task).

Fifth is an interframe collections of pixels. These comprise a temporal sequence of pixel data (often not frames). As with the others, the particular form will vary widely depending on application.

Another aspect of this pixel processing class of functions acknowledges that resources are finite, and should be allocated in increasing amounts to processes that appear to be progressing towards achieving their aim, e.g., of recognizing a face, and vice versa.

A fourth class of functions to be performed by the local software is Context Metadata Processing. This includes gathering a great variety of information, e.g., input by the user, provided by a sensor, or recalled from a memory.

One formal definition of "context" is "any information that can be used to characterize the situation of an entity (a person, place or object that is considered relevant to the interaction between a user and an application, including the user and applications themselves."

Context information can be of many sorts, including the computing context (network connectivity, memory availability, CPU contention, etc.), user context (user profile, location, actions, preferences, nearby friends, social network(s) and situation, etc.), physical context (e.g., lighting, noise level, traffic, etc.), temporal context (time of day, day, month, season, etc.), history of the above, etc.

A fifth class of functions for the local software is Cloud Session Management. The software needs to register different cloud-based service providers as the resources for executing particular tasks, instantiate duplex sessions with the cloud (establishing IP connections, managing traffic flow), ping remote service providers (e.g., alerting that their services may be required shortly), etc.

A sixth and final class of functions for the local software is Recognition Agent Management. These include arrangements for recognition agents and service providers to publish—to cell phones—their input requirements, the common library functions on which they rely that must be loaded (or unloaded) at run-time, their data and other dependencies with other system components/processes, their abilities to perform common denominator processes (possibly replacing other service providers), information about their maximum usages of system resources, details about their respective stages of operations (c.f., discussion of FIG. 12) and the resource demands posed by each, data about their performance/behavior with throttled-down resources, etc. This sixth class of functions then manages the recognition agents, given these parameters, based on current circumstances, e.g., throttling respective services up or down in intensity, depending on results and current system parameters. That is, the Recognition Agent Management software serves as the means by which operation of the agents is mediated in accordance with system resource constraints.

Sample Vision Applications

One illustrative application serves to view coins on a surface, and compute their total value. The system applies an oval-finding process (e.g., a Hough algorithm) to locate coins. The coins may over-lie each other and some may be only partially visible; the algorithm can determine the center of each section of an oval it detects—each corresponding to a different coin. The axes of the ovals should generally be parallel (assuming an oblique view, i.e., that not all the coins are depicted as circles in the imagery)—this can serve as a check on the procedure.

After ovals are located, the diameters of the coins are assessed to identify their respective values. (The assessed diameters can be histogrammed to ensure that they cluster at expected diameters, or at expected diameter ratios.)

If a variety of several coins is present, the coins may be identified by the ratio of diameters alone—without reference to color or indicia. The diameter of a dime is 17.91 mm, the diameter of a penny is 19.05 mm; the diameter of a nickel is 21.21 mm; the diameter of a quarter is 24.26 mm. Relative to the dime, the penny, nickel and quarter have diameter ratios of 1.06, 1.18 and 1.35. Relative to the penny, the nickel and quarter have diameter ratios of 1.11 and 1.27. Relative to the nickel, the quarter has a diameter ratio of 1.14.

These ratios are all unique, and are spaced widely enough to permit ready discernment. If two coins have a diameter ratio of 1.14, the smaller must be a nickel, the other must be a quarter. If two coins have a diameter ratio of 1.06, the smallest must be a dime, and the other a penny, etc. If other ratios are found, then something is amiss. (Note that the ratio of diameters can be determined even if the coins are depicted as ovals, since the dimensions of ovals viewed from the same perspective are similarly proportional.)

If all of the coins are of the same type, they may be identified by exposed indicia.

In some embodiments, color can also be used (e.g., to aid in distinguishing pennies from dimes).

By summing the values of the identified quarters, with the values of the identified dimes, with the values of the identified nickels, with the values of the identified pennies, the total value of coins on the surface is determined. This value can be presented, or annunciated, to the user through a suitable user interface arrangement.

A related application views a pile of coins and determines their country of origin. The different coins of each country have a unique set of inter-coin dimensional ratios. Thus, determination of diameter ratios—as above—can indicate whether a collection of coins is from the US or Canada, etc. (The penny, nickel, dime, quarter, and half dollar of Canada, for example, have diameters of 19.05 mm, 21.2 mm, 18.03 mm, 23.88 mm, and 27.13 mm, so there is some ambiguity if the pile contains only nickels and pennies, but this is resolved if other coins are included).

Augmented Environments

In some arrangements, machine vision understanding of a scene is aided by positioning one or more features or objects in the field of view, for which reference information is known (e.g., size, position, angle, color), and by which the system can understand other features—by relation. In one particular arrangement, target patterns are included in the scene from which, e.g., the distance to, and orientation of, surfaces within the viewing space can be discerned. Such targets thus serve as beacons, signaling distance and orientation information to a camera system. One such target is the TRIPcode, detailed, e.g., in de Ipiña, TRIP: a Low-Cost Vision-Based Location System for Ubiquitous Computing, Personal and Ubiquitous Computing, Vol. 6, No. 3, May, 2002, pp. 206-219.

Figure 17:
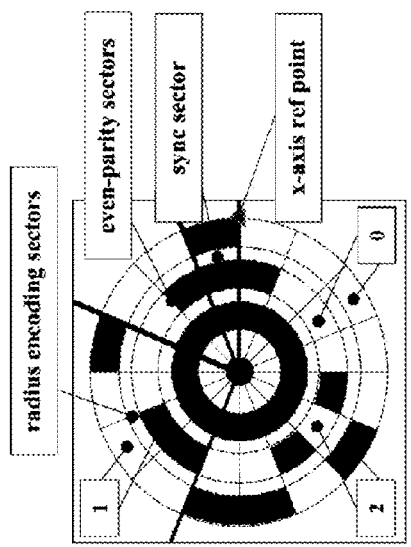
FIG. 17 shows a graphical target, which can be used to aid machine understanding of a viewing space.

As detailed in the Ipiña paper, the target (shown in FIG. 17) encodes information including the target's radius, allowing a camera-equipped system to determine both the distance from the camera to the target, and the target's 3D pose. If the target is positioned on a surface in the viewing space (e.g., on a wall), the Ipiña arrangement allows a camera-equipped system to understand both the distance to the wall, and the wall's spatial orientation relative to the camera.

The TRIPcode has undergone various implementations, being successively known as SpotCode, and then ShotCode (and sometimes Bango). It is now understood to be commercialized by OP3 B.V.

The aesthetics of the TRIPcode target are not suited for some applications, but are well suited for others. For example, carpet or rugs may be fashioned incorporating the TRIPcode target as a recurrent design feature, e.g., positioned at regular or irregular positions across a carpet's width. A camera viewing a scene that includes a person standing on such a carpet can refer to the target in determining the distance to the person (and also to define the plane encompassing the floor). In like fashion, the target can be incorporated into designs for other materials, such as wallpaper, fabric coverings for furniture, clothing, etc.

In other arrangements, the TRIPcode target is made less conspicuous by printing it with an ink that is not visible to the human visual system, but is visible, e.g., in the infrared spectrum. Many image sensors used in mobile phones are sensitive well into the infrared spectrum. Such targets may thus be discerned from captured image data, even though the targets escape human attention.

In still further arrangements, the presence of a TRIPcode can be camouflaged among other scene features, in manners that nonetheless permit its detection by a mobile phone.

One camouflage method relies on the periodic sampling of the image scene by the camera sensor. Such sampling can introduce visual artifacts in camera-captured imagery (e.g., aliasing, Moiré effects) that are not apparent when an item is inspected directly by a human. An object can be printed with a pattern designed to induce a TRIPcode target to appear through such artifact effects when imaged by the regularly-spaced photosensor cells of an image sensor, but is not otherwise apparent to human viewers. (This same principle is advantageously used in making checks resistant to photocopy-based counterfeiting. A latent image, such as the word VOID, is incorporated into the graphical elements of the original document design. This latent image isn't apparent to human viewers. However, when sampled by the imaging system of a photocopier, the periodic sampling causes the word VOID to emerge and appear in photocopies.) A variety of such techniques are detailed in van Renesse, Hidden and Scrambled Images—a Review, Conference on Optical Security and Counterfeit Deterrence Techniques IV, SPIE Vol. 4677, pp. 333-348, 2002.

Another camouflage method relies on the fact that color printing is commonly performed with four inks: cyan, magenta, yellow and black (CMYK). Normally, black material is printed with black ink. However, black can also be imitated by overprinting cyan and magenta and yellow. To humans, these two techniques are essentially indistinguishable. To a digital camera, however, they may readily be discerned. This is because black inks typically absorb a relatively high amount of infrared light, whereas cyan, magenta and yellow channels do not.

In a region that is to appear black, the printing process can apply (e.g., on a white substrate) an area of overlapping cyan, magenta and yellow inks. This area can then be further overprinted (or pre-printed) with a TRIPcode, using black ink. To human viewers, it all appears black. However, the camera can tell the difference, from the infrared behavior. That is, at a point in the black-inked region of the TRIPcode, there is black ink obscuring the white substrate, which absorbs any incident infrared illumination that might otherwise be reflected from the white substrate. At another point, e.g., outside the TRIPcode target, or inside its periphery—but where white normally appears—the infrared illumination passes through the cyan, magenta and yellow inks, and is reflected back to the sensor from the white substrate.

The red sensors in the camera are most responsive to infrared illumination, so it is in the red channel that the TRIPcode target is distinguished. The camera may provide infrared illumination (e.g., by one or more IR LEDs), or ambient lighting may provide sufficient IR illumination. (In future mobile devices, a second image sensor may be provided, e.g., with sensors especially adapted for infrared detection.)

The arrangement just described can be adapted for use with any color printed imagery—not just black regions. Details for doing so are provided in patent application 20060008112. By such arrangement, TRIPcode targets can be concealed wherever printing may appear in a visual scene, allowing accurate mensuration of certain features and objects within the scene by reference to such targets.

While a round target, such as the TRIPcode, is desirable for computational ease, e.g., in recognizing such shape in its different elliptical poses, markers of other shapes can be used. A square marker suitable for determining the 3D position of a surface is Sony's CyberCode and is detailed, e.g., in Rekimoto, CyberCode: Designing Augmented Reality Environments with Visual Tags, Proc. of Designing Augmented Reality Environments 2000, pp. 1-10. A variety of other reference markers can alternatively be used—depending on the requirements of a particular application.

In some arrangements, a TRIPcode (or CyberCode) can be further processed to convey digital watermark data. This can be done by the CMYK arrangement discussed above and detailed in the noted patent application. Other arrangements for marking such machine-readable data carriers with steganographic digital watermark data, and applications for such arrangements, are detailed in U.S. Pat. No. 7,152,786 and patent application 20010037455.

Multi-Touch Input, Image Re-Mapping, and Other Image Processing

As noted elsewhere, users may tap proto-baubles to express interest in the feature or information that the system is processing. The user's input raises the priority of the process, e.g., by indicating that the system should apply additional resources to that effort. Such a tap can lead to faster maturation of the proto-bauble into a bauble.

Tapping baubles can also serve other purposes. For example, baubles may be targets of touches for user interface purposes in a manner akin to that popularized by the Apple iPhone (i.e., its multi-touch UI).

Previous image multi-touch interfaces dealt with an image as an undifferentiated whole. Zooming, etc., was accomplished without regard to features depicted in the image.

In accordance with a further aspect of the present technology, multi-touch and other touch screen user interfaces perform operations that are dependent, in part, on some knowledge about what one or more parts of the displayed imagery represent.

To take a simple example, consider an oblique-angle view of several items scattered across the surface of a desk. One may be a coin—depicted as an oval in the image frame.

The mobile device applies various object recognition steps as detailed earlier, including identifying edges and regions of the image corresponding to potentially different objects. Baubles may appear. Tapping the location of the coin in the image (or a bauble associated with the coin), the user can signal to the device that the image is to be re-mapped so that the coin is presented as a circle—as if in a plan view looking down on the desk. (This is sometimes termed ortho-rectification.)

To do this, the system desirably first knows that the shape is a circle. Such knowledge can derive from several alternative sources. For example, the user may expressly indicate this information (e.g., through the UI—such as by tapping the coin and then tapping a circle control presented at a margin of the image, indicating the tapped object is circular in true shape). Or such a coin may be locally recognized by the device—e.g., by reference to its color and indicia (or cloud processing may provide such recognition). Or the device may assume that any segmented image feature having the shape of an oval is actually a circle viewed from an oblique perspective. (Some objects may include machine readable encoding that can be sensed—even obliquely—and indicate the native shape of the object. For example, QR bar code data may be discerned from a rectangular object, indicating the object's true shape is a square.) Etc.

Tapping on the coin's depiction in the image (or a corresponding bauble) may—without more—cause the image to be remapped. In other embodiments, however, such instruction requires one or more further directions from the user. For example, the user's tap may cause the device to present a menu (e.g., graphical or auditory) detailing several alternative operations that can be performed. One can be plan re-mapping.

In response to such instruction, the system enlarges the scale of the captured image along the dimension of the oval's minor axis, so that the length of that minor axis equals that of the oval's major axis. (Alternatively, the image can be shrunk along the major axis, with similar effect.) In so doing, the system has re-mapped the depicted object to be closer to its plan view shape, with the rest of the image remapped as well.

In another arrangement, instead of applying a scaling factor to just one direction, the image may be scaled along two different directions. In some embodiments, shearing can be used, or differential scaling (e.g., to address perspective effect).

A memory can store a set of rules by which inferences about an object's plan shape from oblique views can be determined. For example, if an object has four approximately straight sides, it may be assumed to be a rectangle—even if opposing sides are not parallel in the camera's view. If the object has no apparent extent in a third dimension, is largely uniform in a light color—perhaps with some high frequency dark markings amid the light color, the object may be assumed to be a piece of paper—probably with an 8.5:11 aspect ratio if GPS indicates a location in the US (or 1:SQRT (2) if GPS indicates a location in Europe). The re-mapping can employ such information—in the lack of other knowledge—to effect a view transformation of the depicted object to something approximating a plan view.

In some arrangements, knowledge about one segmented object in the image frame can be used to inform or refine a conclusion about another object in the same frame. Consider an image frame depicting a round object that is 30 pixels in its largest dimension, and another object that is 150 pixels in its largest dimension. The latter object may be identified—by some processing—to be a coffee cup. A data store of reference information indicates that coffee cups are typically 3-6" in their longest dimension. Then the former object can be deduced to have a dimension on the order of an inch (not, e.g., a foot or a meter, as might be the case of round objects depicted in other images).

More than just size classification can be inferred in this manner. For example, a data store can include information that groups associated items together. Tire and car. Sky and tree. Keyboard and mouse. Shaving cream and razor. Salt and pepper shakers (sometimes with ketchup and mustard dispensers). Coins and keys and cell phone and wallet. Etc.

Such associations can be gleaned from a variety of sources. One is textual metadata from image archives such as Flickr or Google Images (e.g., identify all images with razor in the descriptive metadata, collect all other terms from such images' metadata, and rank in terms of occurrence, e.g., keeping the top 25%). Another is by natural language processing, e.g., by conducting a forward-linking analysis of one or more texts (e.g., a dictionary and an encyclopedia), augmented by discerning inverse semantic relationships, as detailed in U.S. Pat. No. 7,383,169.

Dimensional knowledge can be deduced in similar ways. For example, a seed collection of reference data can be input to the data store (e.g., a keyboard is about 12-20" in its longest dimension, a telephone is about 8-12," a car is about 200," etc.). Images can then be collected from Flickr including the known items, together with others. For example, Flickr presently has nearly 200,000 images tagged with the term "keyboard." Of those, over 300 also are tagged with the term "coffee cup." Analysis of similar non-keyboard shapes in these 300+ images reveals that the added object has a longest dimension roughly a third that of the longest dimension of the keyboard. (By similar analysis, a machine learning process can deduce that the shape of a coffee cup is generally cylindrical, and such information can also be added to the knowledge base—local or remote—consulted by the device.)

Inferences like those discussed above typically do not render a final object identification. However, they make certain identifications more likely (or less likely) than others, and are thus useful, e.g., in probabilistic classifiers.

Sometimes re-mapping of an image can be based on more than the image itself. For example, the image may be one of a sequence of images, e.g., from a video. The other images may be from other perspectives, allowing a 3D model of the scene to be created. Likewise if the device has stereo imagers, a 3D model can be formed. Re-mapping can proceed by reference to such a 3D model.

Similarly, by reference to geolocation data, other imagery from the same general location may be identified (e.g., from Flickr, etc.), and used to create a 3D model, or to otherwise inform the re-mapping operation. (Likewise, if Photosynths continue to gain in popularity and availability, they provide rich data from which remapping can proceed.)

Such remapping is a helpful step that can be applied to captured imagery before recognition algorithms, such as OCR, are applied. Consider, for example, the desk photo of the earlier example, also depicting a telephone inclined up from the desk, with an LCD screen displaying a phone number. Due to the phone's inclination and the viewing angle, the display does not appear as a rectangle but as a rhomboid. Recognizing the quadrilateral shape, the device may re-map it into a rectangle (e.g., by applying a shear transformation).

OCR can then proceed on the re-mapped image—recognizing the characters displayed+on the telephone screen.

Returning to multi-touch user interfaces, additional operations can be initiated by touching two or more features displayed on the device screen.

Some effect other remapping operations. Consider the earlier desk example, depicting both a telephone/LCD display inclined up from the desk surface, and also a business card lying flat. Due to the inclination of the phone display relative to the desk, these two text-bearing features lie in different planes. OCRing both from a single image requires a compromise.

If the user touches both segmented features (or baubles corresponding to both), the device assesses the geometry of the selected features. It then computes, for the phone, the direction of a vector extending normal to the apparent plane of the LCD display, and likewise for a vector extending normal from the surface of the business card. These two vectors can then be averaged to yield an intermediate vector direction. The image frame can then be remapped so that the computed intermediate vector extends straight up. In this case, the image has been transformed to yield a plan view onto a plane that is angled midway between the plane of the LCD display and the plane of the business card. Such a remapped image presentation is believed to be the optimum compromise for OCRing text from two subjects lying in different planes (assuming the text on each is of similar size in the remapped image depiction).

Similar image transformations can be based on three or more features selected from an image using a multi-touch interface.

Consider a user at a historical site, with interpretative signage all around. The signs are in different planes. The user's device captures a frame of imagery depicting three signs, and identifies the signs as discrete objects of potential interest from their edges and/or other features. The user touches all three signs on the display (or corresponding baubles, together or sequentially). Using a procedure like that just-described, the planes of the three signs are determined, and a compromise viewing perspective is then created to which the image is remapped—viewing the scene from a direction perpendicular to an average signage plane.

Instead of presenting the three signs from the compromise viewing perspective, an alternative approach is to remap each sign separately, so that it appears in plan view. This can be done by converting the single image to three different images—each with a different remapping. Or the pixels comprising the different signs can be differently-remapped within the same image frame (warping nearby imagery to accommodate the reshaped, probably enlarged, sign depictions).

In still another arrangement, touching the three signs (at the same time, or sequentially) initiates an operation that involves obtaining other images of the designated objects from an image archive, such as Flickr or Photosynth. (The user may interact with a UI on the device to make the user's intentions clear, e.g., "Augment with other pixel data from Flickr.") These other images may be identified by pose similarity with the captured image (e.g., lat/long, plus orientation), or otherwise (e.g., other metadata correspondence, pattern matching, etc.). Higher resolution, or sharper-focused, images of the signs may be processed from these other sources. These sign excerpts can be scaled and level-shifted as appropriate, and then blended and pasted into the image frame captured by the user—perhaps processed as detailed above (e.g., remapped to a compromise image plane, remapped separately—perhaps in 3 different images, or in a composite photo warped to accommodate the reshaped sign excerpts, etc.).

In the arrangements just detailed, analysis of shadows visible in the captured image allows the device to gain certain 3D knowledge about the scene (e.g., depth and pose of objects) from a single frame. This knowledge can help inform any of the operations detailed above.

Just as remapping an image (or excerpt) can aid in OCRing, it can also aid in deciding what other recognition agent(s) should be launched.

Tapping on two features (or baubles) in an image can initiate a process to determine a spatial relationship between depicted objects. In a camera view of a NASCAR race, baubles may overlay different race cars, and track their movement. By tapping baubles for adjoining cars (or tapping the depicted cars themselves), the device may obtain location data for each of the cars. This can be determined in relative terms from the viewer's perspective, e.g., by deducing locations of the cars from their scale and position in the image frame (knowing details of the camera optics and true sizes of the cars). Or the device can link to one or more web resources that track the cars' real time geolocations, e.g., from which the user device can report that the gap between the cars is eight inches and closing.

(As in earlier examples, this particular operation may be selected from a menu of several possible operations when the user taps the screen.)

Instead of simply tapping baubles, a further innovation concerns dragging one or more baubles on the screen. They can be dragged onto each other, or onto a region of the screen, by which the user signals a desired action or query.

In an image with several faces, the user may drag two of the corresponding baubles onto a third. This may indicate a grouping operation, e.g., that the indicated people have some social relationship. (Further details about the relationship may be input by the user using text input, or by spoken text—through speech recognition.) In a network graph sense, a link is established between data objects representing the two individuals. This relationship can influence how other device processing operations deal with the indicated individuals.

Alternatively, all three baubles may be dragged to a new location in the image frame. This new location can denote an operation, or attribute, to be associated with the grouping—either inferentially (e.g., context), or expressed by user input.

Another interactive use of feature-proxy baubles is in editing an image. Consider an image with three faces: two friends and a stranger. The user may want to post the image to an online repository (Facebook) but may want to remove the stranger first. Baubles can be manipulated to this end.

Adobe Photoshop CS4 introduced a feature termed Smart Scaling, which was previously known from online sites such as rsizr<dot>com. Areas of imagery that are to be saved are denoted (e.g., with a mouse-drawn bounding box), and other areas (e.g., with superfluous features) are then shrunk or deleted. Image processing algorithms preserve the saved areas unaltered, and blend them with edited regions that formerly had the superfluous features.

In the present system, after processing a frame of imagery to generate baubles corresponding to discerned features, the user can execute a series of gestures indicating that one feature (e.g., the stranger) is to be deleted, and that two other features (e.g., the two friends) are to be preserved. For example, the user may touch the unwanted bauble, and sweep the finger to the bottom edge of the display screen to indicate that the corresponding visual feature should be removed from the image. (The bauble may follow the finger, or not). The user may then double-tap each of the friend baubles to indicate that they are to be preserved. Another gesture calls up a menu from which the user indicates that all the editing gestures have been entered. The processor then edits the image according to the user's instructions. An "undo" gesture (e.g., a counterclockwise half-circle finger trace on the screen) can reverse the edit if it proved unsatisfactory, and the user may try another edit. (The system may be placed in a mode to receive editing bauble gestures by an on-screen gesture, e.g., finger-tracing the letter 'e,' or by selection from a menu, or otherwise.)

The order of a sequence of bauble-taps can convey information about the user's intention to the system, and elicit corresponding processing.

Consider a tourist in a new town, viewing a sign introducing various points of interest, with a photo of each attraction (e.g., Eiffel Tower, Arc de Triomphe, Louvre, etc). The user's device may recognize some or all of the photos, and present a bauble corresponding to each depicted attraction. Touching the baubles in a particular order may instruct the device to obtain walking directions to the tapped attractions, in the order tapped. Or it may cause the device to fetch Wikipedia entries for each of the attractions, and present them in the denoted order.

Since feature-proxy baubles are associated with particular objects, or image features, they can have a response—when tapped or included in a gesture—dependent on the object/feature to which they correspond. That is, the response to a gesture can be a function of metadata associated with the baubles involved.

For example, tapping on a bauble corresponding to a person can signify something different (or summon a different menu of available operations) than tapping on a bauble corresponding to a statue, or a restaurant. (E.g., a tap on the former may elicit display or annunciation of the person's name and social profile, e.g., from Facebook; a tap on the second may summon Wikipedia information about the statue or its sculptor; a tap on the latter may yield the restaurant's menu, and information about any current promotions.) Likewise, a gesture that involves taps on two or more baubles can also have a meaning that depends on what the tapped baubles represent.

Over time, a gesture vocabulary that is generally consistent across different baubles may become standardized. Tapping once, for example, may summon introductory information of a particular type corresponding to the type of bauble (e.g., name and profile, if a bauble associated with a person is tapped; address and directory of offices, if a bauble associated with a building is tapped; a Wikipedia page, if a bauble for a historical site is tapped; product information, if a bauble for a retail product is tapped, etc.). Tapping twice may summon a highlights menu of, e.g., the four most frequently invoked operations, again tailored to the corresponding object/feature. A touch to a bauble, and a wiggle of the finger at that location, may initiate another response—such as display of an unabridged menu of choices, with a scroll bar. Another wiggle may cause the menu to retract.

Notes on Architecture

This specification details a number of features. Although implementations can be realized with a subset of features, they are somewhat less preferred. Reasons for implementing a richer, rather than sparser, set of features, are set forth in the following discussion.

An exemplary software framework supports visual utility applications that run on a smartphone, using a variety of components:

1. The screen is a real-time modified camera image, overlaid by dynamic icons (baubles) that can attach to portions of the image and act simultaneously as value displays and control points for (possible) multiple actions occurring at once.

The screen is also a valuable, monetizable advertising space (in a manner similar to Google's search pages)—right at the focus of the user's attention.

2. Many applications for the device process live sequences of camera images, not mere "snapshots." In many cases, complex image judgments are required, although responsiveness remains a priority.

3. The actual applications will ordinarily be associated with displayed baubles and the currently visible "scene" shown by the display—allowing user interaction to be a normal part of all levels of these applications.

4. A basic set of image-feature extraction functions can run in the background, allowing features of the visible scene to be available to applications at all times.

5. Individual applications desirably are not permitted to "hog" system resources, since the usefulness of many will wax and wane with changes in the visible scene, so more than one application will often be active at once. (This generally requires multitasking, with suitable dispatch capabilities, to keep applications lively enough to be useful.)

6. Applications can be designed in layers, with relatively low-load functions which can monitor the scene data or the user desires, with more intensive functions invoked when appropriate. The dispatch arrangements can support this code structure.

7. Many applications may include cloud-based portions to perform operations beyond the practical capabilities of the device itself. Again, the dispatch arrangements can support this capability.

8. Applications often require a method (e.g., the blackboard) to post and access data which is mutually useful.

In a loose, unordered way, below are some of the interrelationships that can make the above aspects parts of a whole—not just individually desirable.

1. Applications that refer to live scenes will commonly rely on efficient extraction of basic image features, from all (or at least many) frames—so making real-time features available is an important consideration (even though, for certain applications, it may not be required).

2. In order to allow efficient application development and testing, as well as to support applications on devices with varying capabilities, an ability to optionally place significant portions of any application "in the cloud" will become nearly mandatory. Many benefits accrue from such capability.

3. Many applications will benefit from recognition capabilities that are beyond the current capabilities of unaided software. These applications will demand interaction with a user to be effective. Further, mobile devices generally invite user interactions—and only if the GUI supports this requirement will consistent, friendly interaction be possible.

4. Supporting complex applications on devices with limited, inflexible resources requires full support from the software architecture. Shoehorning PC-style applications onto these devices is not generally satisfactory without careful redesign. Multitasking of layered software can be an important component of providing an inviting user experience in this device-constrained environment.

5. Providing image information to multiple applications in an efficient manner is best done by producing information only once, and allowing its use by every application that needs it—in a way that minimizes information access and caching inefficiencies. The "blackboard" data structure is one way of achieving this efficiency.

Thus, while aspects of the detailed technology are useful individually, it is in combination that their highest utility may be realized.

More on Processing, Usage Models, Compass, and Sessions

As noted, some implementations capture imagery on a free-running basis. If limited battery power is a constraint (as is presently the usual case), the system may process this continuing flow of imagery in a highly selective mode in certain embodiments—rarely applying a significant part (e.g., 10% or 50%) of the device's computational capabilities to analysis of the data. Instead, it operates in a low power consumption state, e.g., performing operations without significant power cost, and/or examining only a few frames each second or minute (of the, e.g., 15, 24 or 30 frames that may be captured every second). Only if (A) initial, low level processing indicates a high probability that an object depicted in the imagery can be accurately recognized, and (B) context indicates a high probability that recognition of such object would be relevant to the user, does the system throttle up into a second mode in which power consumption is increased. In this second mode, the power consumption may be more than two-times, or 10-, 100-, 1000- or more-times the power consumption in the first mode. (The noted probabilities can be based on calculated numeric scores dependent on the particular implementation. Only if these scores—for successful object recognition, and for relevance to the user—exceed respective threshold values (or combine per a formula to exceed a single threshold value), does the system switch into the second mode.) Of course, if the user signals interest or encouragement, expressly or impliedly, or if context dictates, then the system can also switch out of the first mode into the second mode.

The emerging usage model for certain augmented reality (AR) applications, e.g., in which a user is expected to walk the streets of a city while holding out a smart phone and concentrating on its changing display (e.g., to navigate to a desired coffee shop or subway station), is ill-advised. Numerous alternatives seem preferable.

One is to provide guidance audibly, through an earpiece or a speaker. Rather than providing spoken guidance, more subtle auditory clues can be utilized—allowing the user to better attend to other auditory input, such as car horns or speech of a companion. One auditory clue can be occasional tones or clicks that change in repetition rate or frequency to signal whether the user is walking in the correct direction, and getting closer to the intended destination. If the user tries to make a wrong turn at an intersection, or moves away-from rather than towards the destination, the pattern can change in a distinctive fashion. One particular arrangement employs a Geiger counter-like sound effect, with a sparse pattern of clicks that grows more frequent as the user progresses towards the intended destination, and falls off if the user turns away from the correct direction. (In one particular embodiment, the volume of the auditory feedback changes in accordance with user motion. If the user is paused, e.g., at a traffic light, the volume may be increased—allowing the user to face different directions and identify, by audio feedback, in which direction to proceed. Once the user resumes walking, the audio volume can diminish, until the user once again pauses. Volume, or other user feedback intensity level, can thus decrease when the user is making progress per the navigation directions, and increase when the user pauses or diverts from the expected path.)

Motion can be detected in various ways, such as by accelerometer output, by changing GPS coordinates, by changing scenery sensed by the camera, etc.

Instead of auditory feedback, the above arrangements can employ vibratory feedback instead.

The magnetometer in the mobile device can be used in these implementations to sense direction. However, the mobile device may be oriented in an arbitrary fashion relative to the user, and the user's direction of forward travel. If it is clipped to the belt of a north-facing user, the magnetometer may indicate the device is pointing to the north, or south, or any other direction—dependent on the how the device is oriented on the belt.

To address this issue, the device can discern a correction factor to be applied to the magnetometer output, so as to correctly indicate the direction the user is facing. For example, the device can sense a directional vector along which the user is moving, by reference to occasional GPS measurements. If, in ten seconds, the user's GPS coordinates have increased in latitude, but stayed constant in longitude, then the user has moved north—presumably while facing in a northerly direction. The device can note the magnetometer output during this period. If the device is oriented in such a fashion that its magnetometer has been indicating "east," while the user has apparently been facing north, then a correction factor of 90 degrees can be discerned. Thereafter, the device knows to subtract ninety degrees from the magnetometer-indicated direction to determine the direction the user is facing—until such an analysis indicates a different correction should be applied. (Such technique is broadly applicable—and is not limited to the particular arrangement detailed here.)

Of course, such methods are applicable not just to walking, but also to bicycling and other modes of transportation.

While the detailed arrangements assumed that imagery is analyzed as it is captured, and that the capturing is performed by the user device, neither is required. The same processing may be performed on imagery (or audio) captured earlier and/or elsewhere. For example, a user's device may process imagery captured an hour or week ago, e.g., by a public camera in a city parking lot. Other sources of imagery include Flickr and other such public image repositories, YouTube and other video sites, imagery collected by crawling the public web, etc.

(It is advantageous to design the processing software so that it can interchangeably handle both live and canned image data, e.g., live image stills or streams, and previously recorded data files. This allows seemingly different user applications to employ the same inner core. To software designers, this is also useful as it allows live-image applications to be repeatedly tested with known images or sequences.)

Many people prefer to review voice mails in transcribed text form—skimming for relevant content, rather than listening to every utterance of a rambling talker. In like fashion, results based on a sequence of visual imagery can be reviewed and comprehended by many users more quickly than the time it took to capture the sequence.

Consider a next generation mobile device, incorporating a headwear-mounted camera, worn by a user walking down a city block. During the span of the block, the camera system may collect 20 or more seconds of video. Instead of distractedly (while walking) viewing an overlaid AR presentation giving results based on the imagery, the user can focus on the immediate tasks of dodging pedestrians and obstacles. Meanwhile, the system can analyze the captured imagery and store the result information for later review. (Or, instead of capturing imagery while walking, the user may pause, sweep a camera-equipped smart phone to capture a panorama of imagery, and then put the phone back in a pocket or purse.)

(The result information can be of any form, e.g., identification of objects in the imagery, audio/video/text information obtained relating to such objects, data about other action taken in response to visual stimuli, etc.)

At a convenient moment, the user can glance at a smart phone screen (or activate a heads-up display on eyewear) to review results produced based on the captured sequence of frames. Such review can involve presentation of response information alone, and/or can include the captured images on which the respective responses were based. (In cases where responses are based on objects, an object may appear in several frames of the sequence. However, the response need only be presented for one of these frames.) Review of the results can be directed by the device, in a standardized presentation, or can be directed by the user. In the latter case, the user can employ a UI control to navigate through the results data (which may be presented in association with image data, or not). One UI is the familiar touch interface popularized by the Apple iPhone family. For example, the user can sweep through a sequence of scenes (e.g., frames captured 1 or 5 seconds, or minutes, apart), each with overlaid baubles that can be tapped to present additional information. Another navigation control is a graphical or physical shuttle control—familiar from video editing products such as Adobe Premier—allowing the user to speed forward, pause, or reverse the sequence of images and/or responses. Some or all of the result information may be presented in auditory form, rather than visual. The user interface can be voice-responsive, rather than responsive, e.g., to touch.

While the visual information was collected in a video fashion, the user may find it most informative to review the information in static scene fashion. These static frames are commonly selected by the user, but may be pre-filtered by the device, e.g., omitting frames that are of low quality (e.g., blurry, or occluded by an obstacle in the foreground, or not having much information content).

The navigation of device-obtained responses need not traverse the entire sequence (e.g., displaying each image frame, or each response). Some modalities may skip ahead through the information, e.g., presenting only responses (and/or images) corresponded to every second frame, or every tenth, or some other interval of frame count or time. Or the review can skip ahead based on saliency, or content. For example, parts of a sequence without any identified feature or corresponding response may be skipped entirely. Images with one or a few identified features (or other response data) may be presented for a short interval. Images with many identified features (or other response data) may be presented for a longer interval. The user interface may present a control by which the user can set the overall pace of the review, e.g., so that a sequence that took 30 seconds to capture may be reviewed in ten seconds, or 20, or 30 or 60, etc. The user interface can also provide a control by which the user can pause any review, to allow further study or interaction, or to request the device to further analyze and report on a particular depicted feature. The response information may be reviewed in an order corresponding to the order in which the imagery was captured, or reverse order (most recent first), or can be ordered based on estimated relevance to the user, or in some other non-chronological fashion.

Such interactions, and analysis, may be regarded as employing a session-based construct. The user can start the review in the middle of the image sequence, and traverse it forwards or backwards, continuously, or jumping around. One of the advantages to such a session arrangement, as contrasted with viewing results in real-time, is that later-acquired imagery can help inform understanding of earlier-acquired imagery. To cite but one example, a person's face may be revealed in frame 10 (and recognized using facial recognition techniques), whereas only the back of the person's head may be shown in frame 5. Yet by analyzing the imagery as a collection, the person can be correctly labeled in frame 5, and other understanding of the frame 5 scene can be based on such knowledge. In contrast, if scene analysis is based exclusively on the present and preceding frames, the person would be anonymous in frame 5.

More on Vision Operations and Related Notions

Because of its ability to dynamically apportion the desired tasks among on-device resources and "the cloud," the detailed systems are well suited for optimizing application response in the context of limited memory and computational resources.

For complex tasks, such as confirming the denomination of a banknote, one could refer the entire task to the most time- or cost-effective provider. If the user wants to recognize a U.S. banknote, and an external provider (e.g., bidder) is found that can do it, the high-level task can be performed in the cloud. For efficiency, the cloud service provider can use image feature data extracted by subtasks performed on the device—e.g., processing the image data to minimize the external bandwidth required, or filtered to remove personally-identifiable or extraneous data. (This locally processed data can simultaneously also be made available to other tasks—both local and remote.)

In some arrangements, the details of the external provider's processing aren't known to the local device, which is instructed only as to the type and format of input data required, and the type/format of output data provided. In other arrangements, the provider publishes information about the particular algorithms/analyses applied in performing its processing, so that the local device can consider same in making a choice between alternate providers.

To the extent that the computational model focuses on certain tasks always being capable of being performed on the device, these basic operations would be tailored to the type of likely cloud applications envisioned for each device. For example, if applications will need images with specific resolution, contrast, and coverage of a banknote or other document, matching capabilities will be required for the 'image acquire' functions provided.

In general, top-down thinking provides some very specific low-level features and capabilities for a device to provide. At that point, the designer will brainstorm a bit. What more useful features or capabilities do these suggest? Once a list of such generally useful capabilities has been compiled, a suite of basic operations can be selected and provision made to minimize memory and power requirements.

As an aside, Unix has long made use of "filter chains" that can minimize intermediate storage. To perform a sequence of transformations, cascadable "filters" are provided for each step. For instance, suppose the transformation A→B is actually a sequence:

$A|op1|opt2|op3>B$

If each step takes an item into a new item of the same or similar size, and assuming that A is still to be available at the end, the memory requirement is size(A)+size(B)+2 buffers, with each buffer typically much smaller than the full object size, and de-allocated when the operation completes. Complex local transformations, for instance, can be obtained by combining a few simple local operations in this way. Both storage and the number of operations performed can be reduced, saving time, power or both.

At least some applications are naturally conceived with short image sequences as input. A system design can support this idea by providing a short, perhaps fixed length (e.g., three or four, or 40, frames) image sequence buffer, which is the destination for every image acquisition operation. Varying application requirements can be supported by providing a variety of ways of writing to the buffers: one or more new images FIFO inserted; one or more new images combined via filters (min, max, average, . . . ) then FIFO inserted; one or more new images combined with the corresponding current buffer elements via filters then inserted, etc.

If an image sequence is represented by a fixed-size buffer, filled in a specific fashion, extracting an image from a sequence would be replaced by extracting an image from the buffer. Each such extraction can select a set of images from the buffer and combine them via filters to form the extracted image. After an extraction, the buffer may be unchanged, may have had one or more images removed, or may have some of its images updated by a basic image operation.

There are at least three types of subregions of images that are commonly used in pattern recognition. The most general is just a set of extracted points, with their geometric relationships intact, usually as a list of points or row fragments. The next is a connected region of the image, perhaps as a list of successive row fragments. The last is a rectangular sub-image, perhaps as an array of pixel values and an offset within the image.

Having settled on one or more of these feature types to support, a representation can be selected for efficiency or generality—for instance, a "1-d" curve located anywhere on an image is just a sequence of pixels, and hence a type of blob. Thus, both can use the same representation, and hence all the same support functions (memory management, etc).

Once a representation is chosen, any blob 'extraction' might be a single two-step operation. First: define the blob 'body,' second: copy pixel values from the image to their corresponding blob locations. (This can be a 'filter' operation, and may follow any sequence of filter ops that resulted in an image, as well as being applicable to a static image.)

Even for images, an "auction" process for processing can involve having operations available to convert from the internal format to and from the appropriate external one. For blobs and other features, quite a variety of format conversions might be supported.

Its perhaps useful to digress a bit from a "normal" discussion of an image processing or computer vision package, to return to the nature of applications that may be run in the detailed arrangements, and the (atypical) constraints and freedoms involved.

For example, while some tasks will be 'triggered' by a direct user action, others may simply be started, and expected to trigger themselves, when appropriate. That is, a user might aim a smart phone at a parking lot and trigger a 'find my car' application, which would snap an image, and try to analyze it. More likely, the user would prefer to trigger the app, and then wander through the lot, panning the camera about, until the device signals that the car has been identified. The display may then present an image captured from the user's current location, with the car highlighted.

While such an application may or may not become popular, it is likely that many would contain processing loops in which images are acquired, sampled and examined for likely presence of a target, whose detection would trigger the 'real' application, which would bring more computational power to bear on the candidate image. The process would continue until the app and user agree that it has been successful, or apparent lack of success causes the user to terminate it. Desirably, the 'tentative detection' loop should be able to run on the camera alone, with any outside resources called in only when there was reason to hope that they might be useful.

Another type of application would be for tracking an object. Here, an object of known type having been located (no matter how), a succession of images is thereafter acquired, and the new location of that object determined and indicated, until the application is terminated, or the object is lost. In this case, one might use external resources to locate the object initially, and very likely would use them to specialize a known detection pattern to the specific instance that had been detected, while the ensuing 'tracking' app, using the new pattern instance, desirably runs on the phone, unaided. (Perhaps such an application would be an aid in minding a child at a playground.)

For some applications, the pattern recognition task may be pretty crude—keeping track of a patch of blue (e.g., a sweater) in a sequence of frames, perhaps—while in others it might be highly sophisticated: e.g., authenticating a banknote. It is likely that a fairly small number of control loops, like the two mentioned above, would be adequate for a great many simple applications. They would differ in the features extracted, the pattern-matching technique employed, and the nature of external resources (if any) resorted to.

As indicated, at least a few pattern recognition applications may run natively on the basic mobile device. Not all pattern recognition methods would be appropriate for such limited platforms. Possibilities would include: simple template matching, especially with a very small template, or a composite template using very small elements; Hough-style matching, with modest resolution requirements for the detected parameters; and neural-net detection. Note that training the net would probably require outside resources, but applying it can be done locally, especially if a DSP or graphics chip can be employed. Any detection technique that employs a large data-base lookup, or is too computationally intensive (e.g., N-space nearest-neighbor) is probably best done using external resources.

More on Clumping

As noted earlier, clumping refers to a process for identifying groups of pixels as being related.

One particular approach is to group scene items with a "common fate," e.g., sharing common motion. Another approach relies on a multi-threshold or scale space tree. A data structure can store symbolic tags indicating the method(s) by which a clump was identified.

Common motion methods consider 2D motions of points/features between images. The motions can be, e.g., nearly identical displacement, or nearly linear displacement along an image direction, or nearly common rotation around an image point.

Figure 20A:
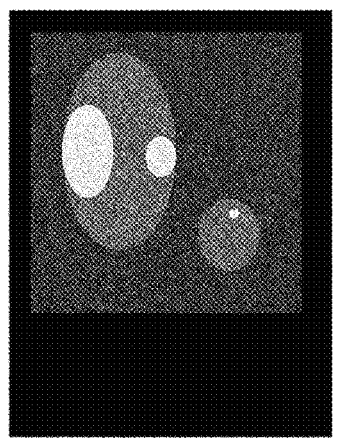
FIGS. 20A and 20B illustrate a method of object segmentation using thresholded blobs.
Figure 20B:
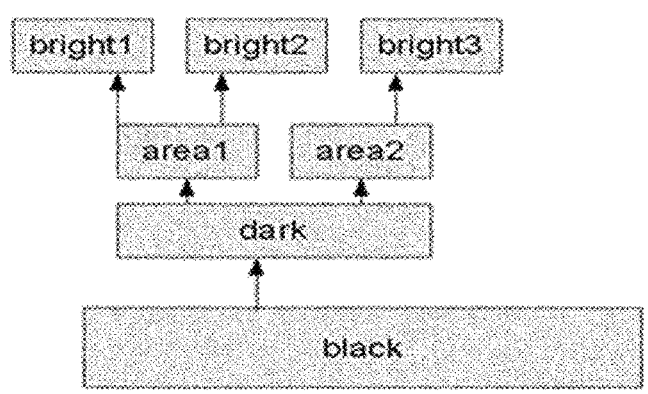

Multi-threshold tree methods can be used to associate a tree of nested blobs within an image. FIGS. 20A and 20B are illustrative. Briefly, the image (or an excerpt) is thresholded—with each pixel value examined to determine whether it meets or exceeds a threshold. Initially the threshold may be set to black. Every pixel passes this criterion. The threshold value is then raised. Parts of the image begin not to meet the threshold test. Areas (blobs) appear where the threshold test is met. Eventually the threshold reaches a bright (high) level. Only a few small locations remain that pass this test.

As shown by FIGS. 20A and 20B, the entire image passes the black threshold. At a dark threshold, a single blob (rectangular) meets the test. As the threshold is increased, two oval blob areas differentiate. Continuing to raise the threshold to a bright value causes the first area to separate into two bright ovals, and the second area to resolve down to a single small bright area.

Testing the pixel values against such a varying threshold provides a quick and check way to identify related clumps of pixels within the image frame.

In practical implementation, the image may first be processed with a Gaussian or other slight blur to prevent slight noise artifacts from unduly influencing the results.

(Variants of this method can serve as edge detectors. E.g., if a contour of one of the blobs stays generally fixed while the threshold is raise over several values, the contour is discerned to be an edge. The strength of the edge is indicated by the range of threshold values over which the contour is essentially fixed.)

While thresholding against luminance value was detailed, other threshold metrics can similarly be compared against, e.g., color, degree of texture, etc.

Clumps identified by such methods can serve as organizing constructs for other data, such as image features and keyvectors. For example, one approach for identifying that features/keyvectors extracted from image data are related is to identify the smallest thresholded blob that contains them. The smaller the blob, the more related the features probably are. Similarly, if first and second features are known to be related, then other features that relate can be estimated by finding the smallest thresholded blob that contains the first two features. Any other features within that blob are also probably related to the first and second features.

Freedoms and Constraints

Practicality of some pattern recognition methods is dependent on the platform's ability to perform floating point operations, or invoke a DSP's vector operations, at an application's request.

More generally, there are a number of specific freedoms and constraints on an Intuitive Computing Platform. Freedoms include the ability of tasks to make use of off-device resources, whether on a nearby communicating accessory device or in the cloud, allowing applications which "couldn't possibly" run on the device, seem to do so. Constraints include: limited CPU power, limited available memory, and the need for applications to proceed with varying resources. For instance, the memory available might not only be limited, but might suddenly be reduced (e.g., a phone call is begun) and then made available again as the higher priority application terminates.

Speed is also a constraint—generally in tension with memory. The desire for a prompt response might push even mundane applications up against a memory ceiling.

In terms of feature representations, memory limits may encourage maintaining ordered lists of elements (memory requirement proportional to number of entries), rather than an explicit array of values (memory requirement proportional to the number of possible parameters). Operation sequences might use minimal buffers (as noted above) rather than full intermediate images. A long sequence of images might be "faked" by a short actual sequence along with one or more averaged results.

Some "standard" imaging features, such as Canny edge operators, may be too resource-intensive for common use. However, the same was formerly said about FFT processing—an operation that smart phone apps increasingly employ.

On-Device Processing Suitable for Consideration

Within the context of the constraints above, the following outline details classes of widely useful operations that may be included in the repertoire of the local device:

I. Task-related operations
  A. Image related
    i. Image sequence operations
      a) extracting an image from the sequence
      b) generating an image from a sequence range
      c) tracking a feature or ROI through a sequence ii. Image transformation
    a) pointwise remapping
    b) affine transformation
    c) local operation: e.g., edge, local average, ...
    d) FFT, or related
  iii. Visual feature extraction from image
    a) 2D features
    b) 1D features
    c) 3D-ish features
    d) full image→list of ROI
    e) nonlocal features (color histogram, ...)
    f) scale, rotation-invariant intensity features
  iv. feature manipulation
    a) 2D features from 2D features
    b) 1D to 1D etc
    c) 1D features from 2D features
  v. UI—image feedback (e.g., overlaying tag-related symbols on image)
B. Pattern recognition
  i. Extracting a pattern from a set of feature sets
  ii. associating sequences, images, or feature sets with tags
  iii. 'recognizing' a tag or tag set from a feature set
  iv. 'recognizing' a composite or complex tag from a simpler set of 'recognized' tags
C. App-related communication
  i. Extract a list of necessary functions from a system state
  ii. Broadcast a request for bids—collect responses
  iii. transmit distilled data, receive outsources results
II. Action related operations (many will already be present among basic system actions)
  i. activate/deactivate a system function
  ii. produce/consume a system message
  iii. detect the system state
  iv. transition system to a new state
  v. maintain queues of pending, active, and completed actions User Experience and User Interface One particular embodiment of the present technology allows an untrained user to discover information about his environment (and/or about objects in his presence) through use of a mobile device, without having to decide which tools to use, and while providing the ability to continue an interrupted discovery experience whenever and wherever desired.

The reader will recognize that existing systems, such as the iPhone, do not meet such needs. For example, the user must decide which one(s) of thousands of different iPhone applications should be launched to provide information of the particular type desired. And if the user is interrupted while directing the operation, there is no way of resuming the discovery process at a later time or place. That is, the user must experience the discovery at the point of interaction with the object or environment. There is no ability to "save" the experience for later exploration or sharing.

Figure 19:
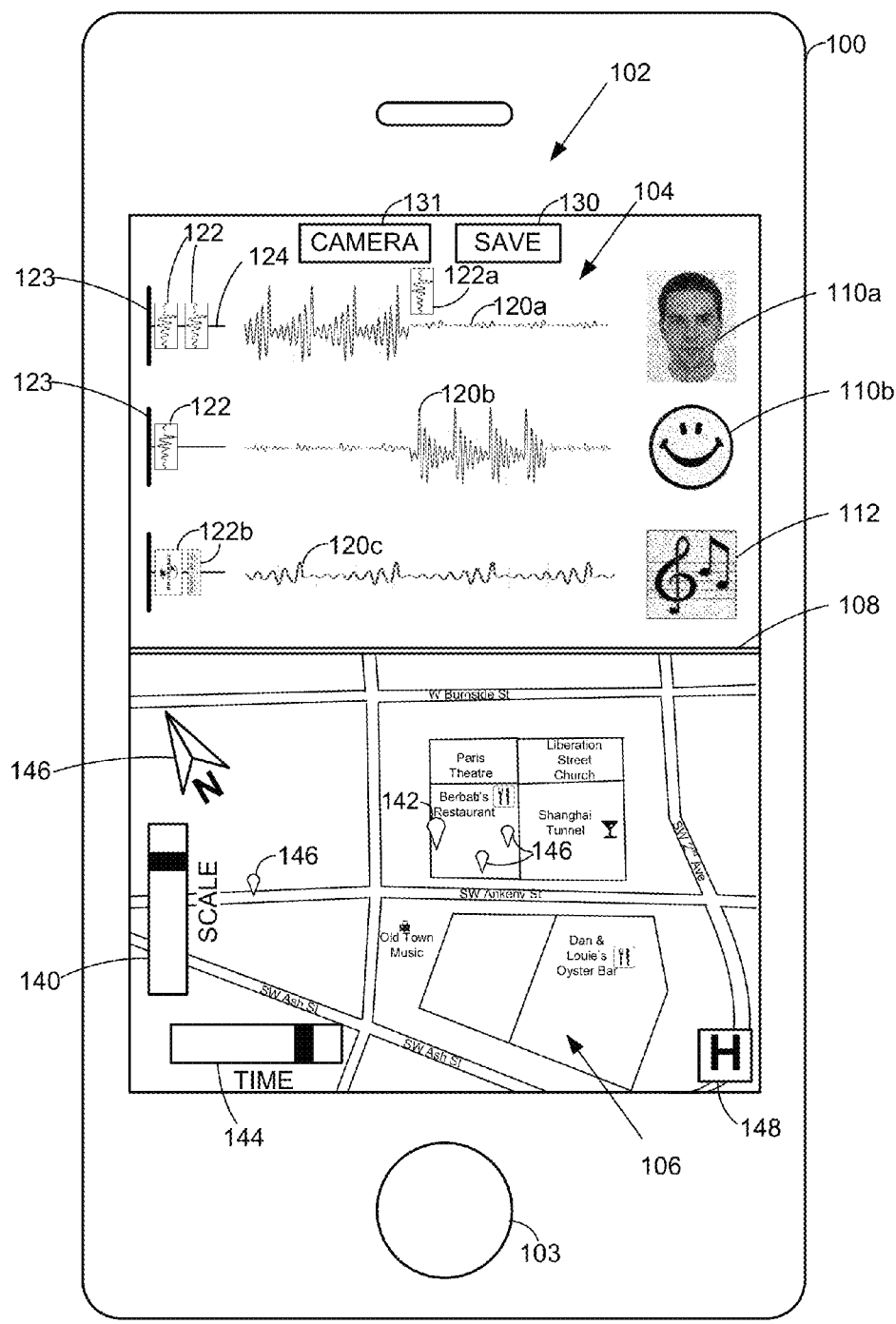
FIGS. 19 and 19A show a variety of possible user interface features.

FIG. 19 shows a smart phone 100 with an illustrative user interface including a screen 102 and a discover button 103.

The discover button 103 is hardwired or programmed to cause the phone to activate its discovery mode—analyzing incoming stimuli to discern meaning and/or information. (In some modalities the phone is always analyzing such stimulus, and no button action is needed.)

Depicted screen 102 has a top pane portion 104 and a lower pane portion 106. The relative sizes of the two panes is controlled by a bar 108, which separates the depicted panes. The bar 108 can be dragged by the user to make the top pane larger, or the bottom pane larger, using constructs that are familiar to the graphical user interface designer.

The illustrative bottom pane 106 serves to present spatial information, such as maps, imagery, GIS layers, etc. This may be termed a geolocation pane, although this should not be construed as limiting its functionality.

The illustrative top pane 104 is termed the sensor pane in the following discussion—although this again is not limiting. In the mode shown, this pane presents audio information, namely an auditory scene visualization. However, a button 131 is presented on the UI by which this top pane can be switched to present visual information (in which case button then reads AUDIO—allowing the user to switch back). Other types of sensor data, such as magnetometer, accelerometer, etc., can be presented in this pane also.

Starting with the top pane, one or more audio sensors (microphones) in the smart phone listens to the audio environment. Speaker/speech recognition software analyzes the captured audio, to attempt to identify person(s) speaking, and discern the words being spoken. If a match is made (using, e.g., stored speaker characterization data stored locally or in the cloud), an icon 110 corresponding to the identified speaker is presented along an edge of the display. If the smart phone has access to a stored image 110a of a recognized speaker (e.g., from the user's phonebook or from Facebook), it can be used as the icon. If not, a default icon 110b can be employed. (Different default icons may be employed for male and female speakers, if the recognition software can make a gender determination with a specified confidence.) The illustrated UI shows that two speakers have been detected, although in other situations there may be more or fewer.

In addition to speech recognition, processes such as watermark detection and fingerprint calculation/lookup can be applied to the audio streams to identify same. By these or other approaches the software may detect music in the ambient audio, and present an icon 112 indicating such detection.

Other distinct audio types may also be detected and indicated (e.g., road noise, birdsongs, television, etc., etc.)

To the left of each of the icons (110, 112, etc.) is a waveform display 120. In the depicted embodiment, waveforms based on actual data are displayed, although canned depictions can be used if desired. (Other forms of representation can be used, such as spectral histograms.) The illustrated analog waveforms move to the left, with the newest data to the right (akin to our experience in reading a line of text). Only the most recent interval of each waveform are presented (e.g., 3, 10 or 60 seconds) before moving out of sight to the left.

The segmentation of the ambient audio into distinct waveforms is an approximation; accurate separation is difficult. In a simple embodiment employing two different microphones, a difference signal between the two audio streams is determined—providing a third audio stream. When the first speaker is sensed to be speaking, the stronger of these three signals is presented (waveform 120a). When that speaker is not speaking, that waveform (or another) is presented at a greatly attenuated scale—indicating that he has fallen silent (although the ambient audio level may not have diminished much in level).

Likewise with the second speaker, indicated by icon 110b. When that person's voice is recognized (or a human voice is discerned, but not identified—but known not be to be the speaker indicated by icon 110a), then the louder of the three audio signals is displayed in waveform form 120b. When that speaker falls silent, a much-attenuated waveform is presented.

A waveform 120c is similarly presented to indicate the sensed background music. Data from whichever of the three sources is least correlated with the speakers' audio may be presented. Again, if the music is interrupted, the waveform can be attenuated by the software to indicate same.

As noted, only a few seconds of audio is represented by the waveforms 120. Meanwhile, the smart phone is analyzing the audio, discerning meaning. This meaning can include, e.g., speech recognition text for the speakers, and song identification for the music.

When information about an audio stream is discerned, it can be represented by a bauble (icon) 122. If the bauble corresponds to an excerpt of audio that is represented by a waveform still traversing the screen, the bauble can be placed adjacent the waveform, such as bauble 122a (which can indicate, e.g., a text file for the speaker's recent utterance). The bauble 122a moves with the waveform to which it corresponds, to the left, until the waveform disappears out of sight at a virtual stop-gate 123. At that point the bauble is threaded onto a short thread 124.

Baubles 122 queue up on thread 124, like pearls on a string. Thread 124 is only long enough to hold a limited number of baubles (e.g., two to five). After the thread is full, each added bauble pushes the oldest out of sight. (The disappearing bauble is still available in the history.) If no new baubles arrive, existing baubles may be set to "age-out" after an interval of time, so that they disappear from the screen. The interval may be user-configured; exemplary intervals may be 10 or 60 seconds, or 10 or 60 minutes, etc.

(In some embodiments, proto-baubles may be presented in association with waveforms or other features even before any related information has been discerned. In such case, tapping the proto-bauble causes the phone to focus its processing attention on obtaining information relating to the associated feature.)

The baubles 122 may include visible indicia to graphically indicate their contents. If, for example, a song is recognized, the corresponding bauble can contain associated CD cover artwork, the face of the artist, or the logo of the music distributor (such as baubles 122b).

Figure 19A:
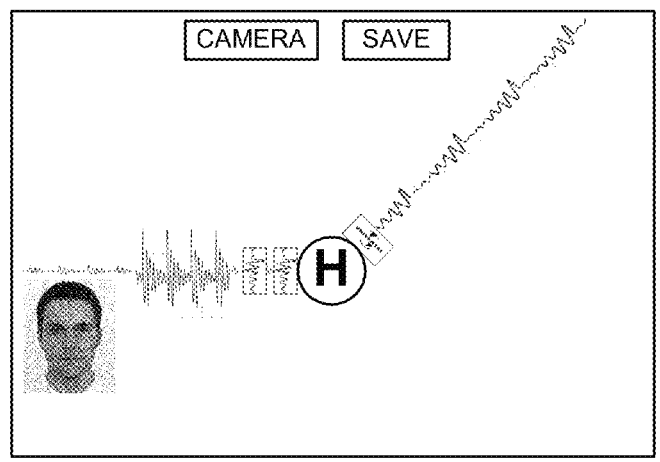

Another audio scene visualization identifies, and depicts, different audio streams by reference to their direction relative to the phone. For example, one waveform might be shown as incoming from the upper right; another may be shown as arriving from the left. A hub at the center serves as the stop-gate for such waveforms, against which baubles 122 accumulate (as on strings 124). Tapping the hub recalls the stored history information. Such an arrangement is shown in FIG. 19A.

A history of all actions discoveries by the smart phone may be compiled and stored—locally and/or remotely. The stored information can include just the discovered information (e.g., song titles, spoken text, product information, TV show titles), or it can include more—such as recordings of the audio streams, and image data captured by the camera. If the user elects by appropriate profile settings, the history can include all data processed by the phone in session, including keyvectors, accelerometer and all other sensor data, etc.

In addition, or alternatively, the user interface can include a "SAVE" button 130. User activation of this control causes the information state of the system to be stored. Another user control (not shown) allows the stored information to be restored to the system, so device analysis and user discovery can continue—even at a different place and time. For example, if a user is browsing books at a bookstore, and a pager summons him to an available table at a nearby restaurant, the user can press SAVE. Later, the session can be recalled, and the user can continue the discovery, e.g., with the device looking up a book of interest by reference to its jacket art or barcode, and with the device identifying a song that was playing in the background.

While FIG. 19 shows information about the audio environment in the sensor pane 104, similar constructs can be employed to present information about the visual environment, e.g., using arrangements detailed elsewhere in this specification. As noted, tapping the CAMERA button 131 switches modalities from audio to visual (and back). In the visual mode this sensor pane 104 can be used to display augmented reality modes of interaction.

Turning to the lower, geolocation pane 106 of FIG. 19, map data is shown. The map may be downloaded from an online service such as Google Maps, Bing, etc.

The resolution/granularity of the map data initially depends on the granularity with which the smart phone knows its present location. If highly accurate location information is known, a finely detailed map may be presented (e.g., zoomed-in); if only gross location is known, a less detailed map is shown. The user may zoom in or out, to obtain more or less detail, by a scale control 140, as is conventional. The user's location is denoted by a larger push pin 142 or other indicia.

Each time the user engages in a discovery operation, e.g., by tapping a displayed bauble, a smaller pin 146 is lodged on the map—memorializing the place of the encounter. Information about the discovery operation (including time and place) is stored in association with the pin.

If the user taps a pin 146, information about the prior discovery is recalled from storage and presented in a new window. For example, if the user had a discovery experience with a pair of boots at the mall, an image of the boots may be displayed (either user-captured, or a stock photo), together with price and other information presented to the user during the earlier encounter. Another discovery may have involved recognition of a song at a nightclub, or recognition of a face in a classroom. All such events are memorialized by pins on the displayed map.

The geolocation pane facilitates review of prior discoveries, by a time control 144 (e.g., a graphical slider). At one extreme, no previous discoveries are indicated (or only discoveries within the past hour). However, by varying the control, the map is populated with additional pins 146—each indicating a previous discovery experience, and the location at which it took place. The control 144 may be set to show, e.g., discoveries within the past week, month or year. A "H" (history) button 148 may be activated to cause slider 144 to appear—allowing access to historical discoveries.

In some geographical locations (e.g., a mall, or school), the user's history of discoveries may be so rich that the pins must be filtered so as not to clutter the map. Thus, one mode allows start- and end-date of discoveries to be user-set (e.g., by a pair of controls like slider 144). Or keyword filters may be applied, e.g., Nordstrom, boot, music, face, peoples' names, etc.

A compass arrow 146 is presented on the display, to aid in understanding the map. In the depicted mode, "up" on the map is the direction towards which the phone is oriented. If the arrow 146 is tapped, the arrow snaps to a vertical orientation. The map is then rotated so that "up" on the map corresponds to north.

The user can make available for sharing with others as much or as little information about the user's actions as desired. In one scenario, a user's profile allows sharing of her discoveries at the local mall, but only with selected friends on her FaceBook social network account, and only if the user has expressly saved the discovery (as opposed to the system's history archive, which automatically logs all actions). If she discovers information about a particular book at the bookstore, and saves the bauble, this information is posted to a data store cloud. If she returns to the mall a week later, and reviews baubles from earlier visits, she may find that a friend was at the bookstore in the meantime and looked at the book, based on the user's stored discovery experience. That friend may have posted comments about the book, and possibly recommended another book on the same subject. Thus, cloud archives about discoveries can be shared for others to discover and augment with content of their own.

Similarly, the user may consent to make some or all of the user's discovery history available to commercial entities, e.g., for purposes such as audience measurement, crowd traffic analysis, etc.

Illustrative Sequences of Operations

It will be understood that the FIG. 19 arrangement can be presented with no user interaction. The displayed mode of operation can be the device's default, such as a screen saver to which the device reverts following any period of inactivity.

In one particular arrangement, the software is activated when the phone is picked up. The activation can be triggered by device movement or other sensor event (e.g., visual stimulus change, or sensing a tap on the screen). In the first second or so of operation, the camera and microphone are activated, if not already. The phone makes a quick approximation of position (e.g., by identifying a local WiFi node, or other gross check). As soon as some location information is available, corresponding map data is presented on the screen (a cached frame of map data may suffice, if the phone's distance from the location to which the center of the map corresponds does not exceed a stored threshold, such as 100 yards, or a mile). The phone also establishes a connection to a cloud service, and transmits the phone's location. The user's profile information is recalled, optionally together with recent history data.

Between one and three seconds of activation, the device starts to process feedback about the environment. Image and/or audio scene segmentation is launched. Keyvectors relating to sensed data can start streaming to a cloud process. A more refined geolocation can be determined, and updated map data can be obtained/presented. Push pins corresponding to previous discovery experiences can be plotted on the map. Other graphical overlays may also be presented, such as icons showing the location of the users' friends. If the user is downtown or at a mall, another overlay may show stores, or locations within stores, that are offering merchandise on sale. (This overlay may be provided on an opt-in basis, e.g., to members of a retailer's frequent shopper club. RSS-type distribution may feed such subscription information to the phone for overlay presentation.) Another overlay may show current traffic conditions on nearby roadways, etc.

Conspicuous features of interest may already be identified within the visual scene (e.g., barcodes) and highlighted or outlined in a camera view. Results of fast image segmentation operations (e.g., that's a face) can be similarly noted, e.g., by outlining rectangles. Results of device-side recognition operations may appear, e.g., as baubles on the sensor pane 104. The bauble UI is activated, in the sense that it can be tapped, and will present related information. Baubles can similarly be dragged across the screen to signal desired operations.

Still, the user has taken no action with the phone (except, e.g., to lift it from a pocket or purse).

If the phone is in the visual discovery mode, object recognition data may start appearing on the sensor pane (e.g., locally, or from the cloud). It may recognize a box of Tide detergent, for example, and overlay a correspondingly-branded bauble.

The user may drag the Tide bauble to different corners of the screen, to signal different actions. One corner may have a garbage pail icon. Another corner may have a SAVE icon. Dragging it there adds it to a history data store that may be later recalled and reviewed to continue the discovery.

If the user taps the Tide bauble, any other baubles may be greyed-out on the screen. The phone shunts resources to further analysis of the object indicated by the selected bauble—understanding the tap to be a user expression of interest/intent.

Tapping the bauble can also summon a contextual menu for that bauble. Such menus can be locally-sourced, or provided from the cloud. For Tide, the menu options may include use instructions, a blog by which the user can provide feedback to the manufacturer, etc.

One of the menu options can signal that the user wants further menu options. Tapping this option directs the phone to obtain other, less popular, options and present same to the user.

Alternatively, or additionally, one of the menu options can signal that the user is not satisfied with the object recognition results. Tapping this option directs the phone (and/or cloud) to churn more, to try and make a further discovery.

For example, a user in a bookstore may capture an image of a book jacket that depicts Albert Einstein. The phone may recognize the book, and provide links such as book reviews and purchasing options. The user's intent, however, may have been to obtain further information about Einstein. Telling the phone to go back and work some more may lead to the phone recognizing Einstein's face, and then presenting a set of links relating to the person rather, than the book.

In some user interfaces the menu options may have alternate meanings, depending on whether they are tapped once, or twice. A single tap on a particular menu option may indicate that the user wants more menu options displayed. Two taps on the same menu option may signal that the user is not satisfied with the original object recognition results, and wants others. The dual meanings may be textually indicated in the displayed menu legend.

Alternatively, conventions may arise by which users can infer the menu meaning of two taps, given the meaning of a single tap. For example, a single tap may indicate instruction to perform an indicated task using the phone's local resources, whereas a double-tap directs performance of that same task by cloud resources. Or a single tap may indicate instruction to perform the indicated task using computer resources exclusively, whereas a double-tap may indicate instruction to refer the task for human-aided performance, such as by using Amazon's Mechanical Turk service.

Instead of tapping a bauble, a user may indicate interest by circling one or more baubles—tracing a finger around the graphic on the screen. This form of input allows a user to indicate interest in a group of baubles.

Such a gesture (indicating interest in two or more baubles) can be used to trigger action different than simply tapping two baubles separately. For example, circling the Apple and NASA baubles in FIG. 24 within a common circle can direct the system to seek information that relates to both Apple and NASA. In response, the device may provide information, e.g., on the NASA iPhone ap, which makes NASA imagery available to users of the iPhone. Such discovery would not have arisen by tapping the Apple and NASA logos separately. Similarly, circling the NASA logo and the Rolling Stones logo, together, may trigger a search leading to discovery of a Wikipedia article about inclusion of a Rolling Stones song on a gold-plated copper disk included aboard the Voyager spacecraft (a fiction—introduced by the movie Starman).

Figure 21A:
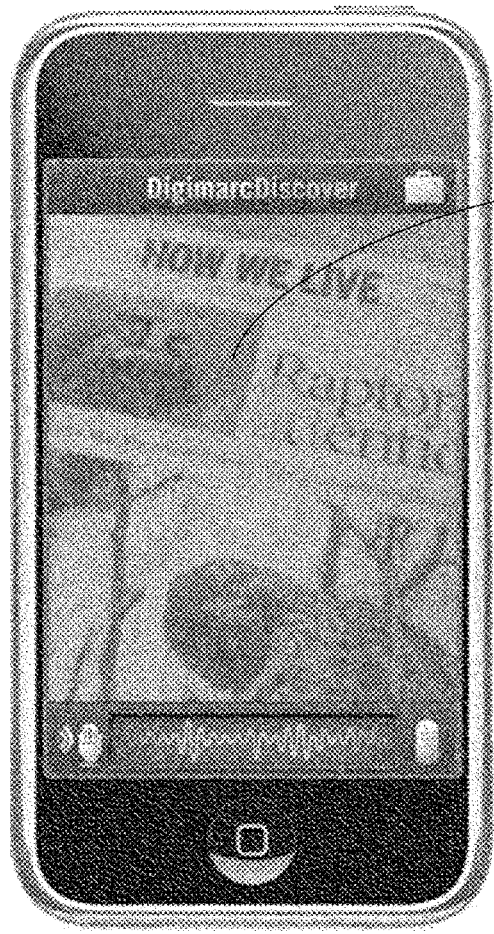
FIGS. 21A, 21B, and 22 show other exemplary user interface features.

FIG. 21A shows a discovery UI somewhat different from FIG. 19. Visual discovery occupies most of the screen, with the bottom band of the screen displaying sensed audio information. Although not conspicuous in this black and white depiction, across the center of the FIG. 21A screen is an overlayed red bauble 202 consisting of a stylized letter "O" (using the typeface from the banner of the Oregonian newspaper). In this case, the phone sensed a digital watermark signal from an article in the Oregonian—triggering display of the bauble.

Figure 21B:
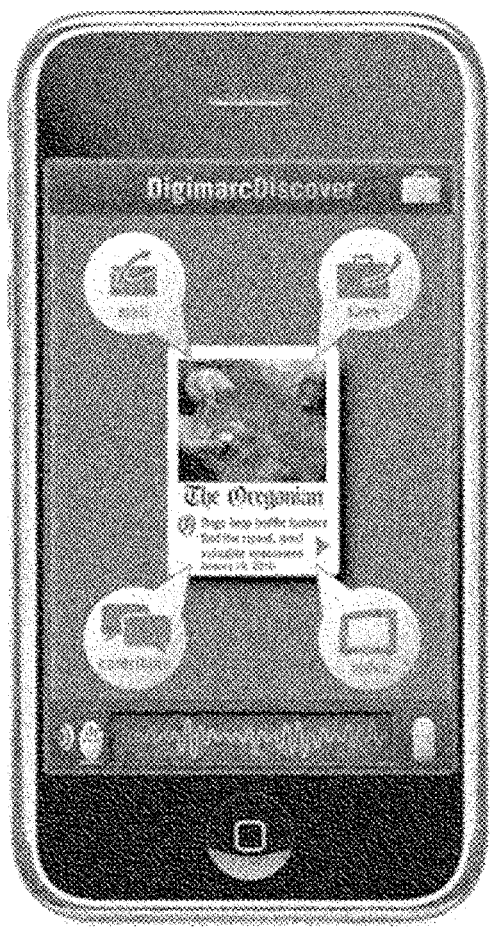

Clicking on the bauble causes it to transform, in animated fashion, into the context-sensitive menu shown in FIG. 21B. At the center is a graphic representing the object discovered in FIG. 21A (e.g., an article in the newspaper). At the upper left is a menu item by which the user can mail the article, or a link, to others. At the upper right is a menu item permitting the article to be saved in a user archive.

At the lower left is a link to a blog on which the user can write commentary relating to the article. At the lower right is a link to a video associated with the article.

A reader of the newspaper may next encounter an advertisement for a casino. When sensed by the phone, a bauble again appears. Tapping the bauble brings up a different set of menu options, e.g., to buy tickets to a performer's upcoming concert, to enter a contest, and to take a 360 degree immersive tour of the casino hall. A "save" option is also provided. At the center of the screen is a rectangle with the casino's logo.

Figure 22:
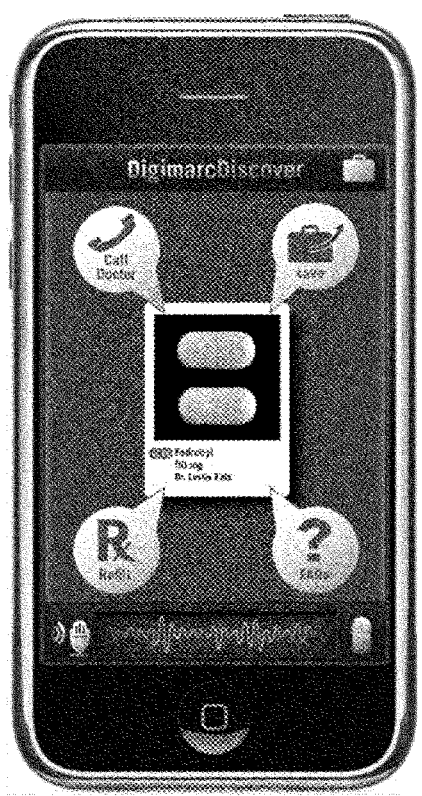

Viewing a digitally watermarked pharmaceutical bottle brings up yet another context menu, shown in FIG. 22. At the center is an image of what the pills should look like—allowing a safety check when taking medicines (e.g., from a bottle in which a traveler has co-mingled several different pills). The medicine is also identified by name ("Fedratryl"), strength ("50 mg") and by the prescribing doctor ("Leslie Katz"). One menu option causes the phone to call the user's doctor (or pharmacist). This option searches the user's phone book for the prescribing doctor's name, and dials that number. Another option submits an automated prescription refill request to the pharmacy. Another link leads to a web site presenting frequently asked questions about the drug, and including FDA-required disclosure information. A "save" option is also provided.

In like fashion, a watermark in a PDF document can reveal document-specific menu options; a barcode on a Gap jeans tag can lead to care instructions and fashion tips; recognition of artwork on a book jacket can trigger display of menu options including book reviews and purchase opportunities; and recognition of a face can bring up options such as viewing the person's FaceBook page, storing the name-annotated photo on Flickr, etc. Similarly, watermarked radio or television audio/video can lead to discovery of information about the sampled program, etc.

Figure 23A:
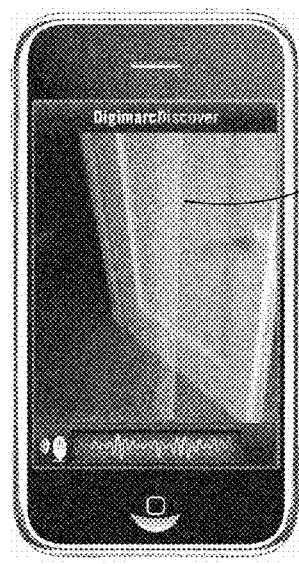
FIGS. 23A and 23B show a radar feature in a user interface.

FIG. 23 depicts a "radar" user interface clue associated with image processing. An illuminated red bar 202 (shown in FIG. 24A) sweeps repeatedly across the image—from a virtual pivot point. (This pivot point is off-screen, in the depicted cases.) The sweep alerts the user to the phone's image processing activity. Each sweep can indicate a new analysis of the captured data.

Digital watermarks typically have an orientation that must be discerned before the watermark payload can be detected. Detection is facilitated if the captured image is oriented in general alignment with the watermark's orientation. Some watermarks have an orientation signal that can be quickly discerned to identify the watermark's orientation.

Figure 23B:
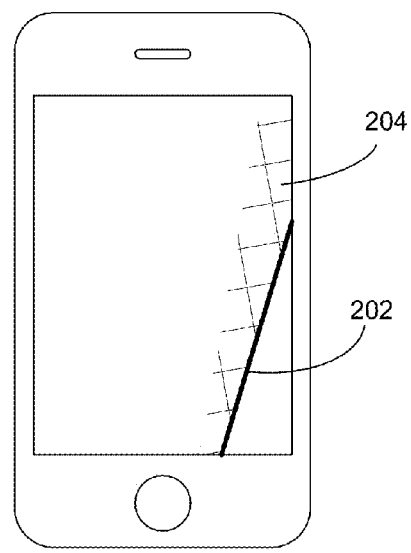

In the screen shot of FIG. 23B, the radar trace 202 causes a momentary ghost pattern to appear in its wake. This pattern shows a grid aligned with the watermark orientation. Seeing an inclined grid (such as depicted in FIG. 23B) may prompt the user to re-orient the phone slightly, so that the grid lines are parallel to the screen edges—aiding watermarking decoding.

Figure 24:
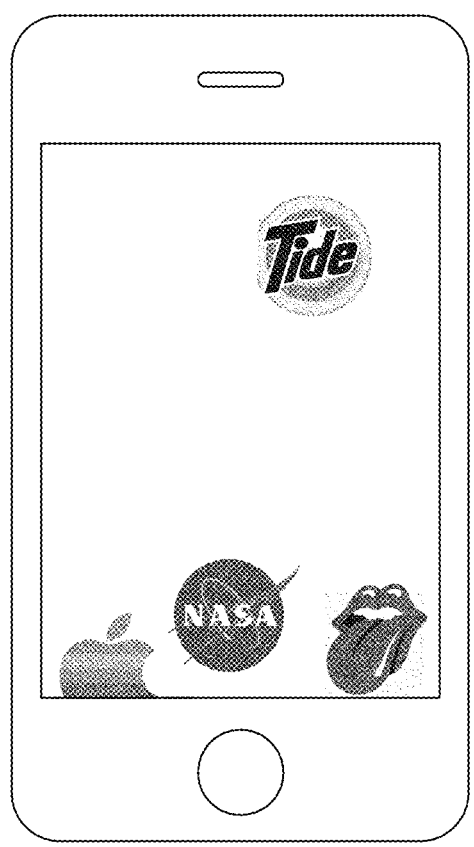
FIG. 24 serves to detail other user interface techniques.

As another visual clue—this one temporal, baubles may lose their spatial moorings and drift to an edge of the screen after a certain time has elapsed. Eventually they may slip out of sight (but still be available in the user's history file). Such an arrangement is shown in FIG. 24. (In other embodiments, the baubles stay spatially associated with image features—disappearing only when the associated visual features move out of view. For audio, and optionally for imagery, baubles may alternatively effervesce in place with the passage of time.)

Audio discovery can parallel the processes detailed above. Proto-baubles can be immediately associated with detected sounds, and refined into full baubles when more information is available. Different types of audio watermark decoding and fingerprinting/lookups can be used to identify songs, etc. Speech recognition can be on-going. Some audio may be quickly processed locally, and undergo more exhaustive processing in the cloud. A bauble resulting from the local processing may take on a different appearance (e.g., bolded, or brighter, or in color vs. monochrome) once cloud processing is completed and confirms the original conclusion. (Likewise for visual analysis, when a first identification is confirmed—either by local and cloud processing, or by alternate identification mechanisms, e.g., SIFT and barcode reading.)

As before, the user can tap baubles to reveal associated information and contextual menus. When one bauble is tapped, processing of other objects is suspended or reduced, so that processing can focus where the user has indicated interest. If the user taps one of the displayed menu options, the device UI changes to one that supports the selected operation.

For a recognized song, the contextual menu may include a center pane presenting the artist name, track name, distributor, CD name, CD artwork, etc. Around the periphery can be links, e.g., allowing the user to purchase the music at iTunes or Amazon, or see a YouTube music video of the song. For spoken audio, a tap may open a menu that displays a transcript of the speaker's words, and offering options such as sending to friends, posting to FaceBook, playing a stored recording of the speaker's speech, etc.

Due to the temporal nature of audio, the user interface desirably includes a control allowing user access to information from an earlier time—for which baubles may have already been removed from the screen. One approach is to allow the user to sweep a desired audio track backwards (e.g., waveform 120b to the right). This action suspends ongoing display of the waveform (although all the information is buffered), and instead sequentially recalls audio, and associated baubles, from the stored history. When a desired bauble is restored to the screen in such fashion, the user can tap it for the corresponding discovery experience. (Other devices for navigating the time domain can alternatively be provided, e.g., a shuttle control.)

To facilitate such temporal navigation, the interface may provide a display of relative time information, such as tic codes every 10 or 60 seconds along the recalled waveform, or with textual timestamps associated with recalled baubles (e.g., "2:45 ago").

The software's user interface can include a "Later" button or the like, signaling that the user will not be reviewing discovery information in real time. A user at a concert, for example, may activate this mode—acknowledging that her attention will be focused elsewhere.

This control indicates to the phone that it need not update the display with discovery data, nor even process the data immediately. Instead, the device can simply forward all of the data to the cloud for processing (not just captured audio and image data, but also GPS location, accelerometer information, etc.). Results from the cloud can be stored in the user's history when done. At a later, more convenient time, the user may recall the stored data and explore the noted discoveries—perhaps richer in their detail because they were not processed under the constraint of immediacy.

Another user interface feature can be a "dock" to which baubles are dragged and where they stick, e.g., for later access (akin to the dock in Apple's OS X operating system). When a bauble is docked in such fashion, all keyvectors associated with that bauble are saved. (Alternatively, all keyvectors associated with the current session are saved—providing more useful context for later operations.) Device preferences can be set so that if a bauble is dragged to the dock, related data (either bauble-specific, or the entire session) is processed by the cloud to discern more detailed information relating to the indicated object.

Still another interface feature can be a "wormhole" (or SHARE icon) to which baubles can be dragged. This posts the bauble, or related information (e.g., bauble-related keyvectors, or the entire session data) for sharing with the user's friends. Baubles deposited into the wormhole can pop up on devices of the user's friends, e.g., as a distinctive pin on a map display. If the friend is accompanying the user, the bauble may appear on the camera view of the friend's device, as an overlay on the corresponding part of the scene as viewed by the friend's device. Other displays of related information can of course be used.

More on Sound Source Localization

As smart phones become ubiquitous, they can cooperate in novel ways. One is to perform advanced sound source localization.

As is known from the prior art (e.g., US20080082326 and US20050117754), signals from spatially separated microphones can be used to discern the direction from which audio emanates, based on time delays between correlated features in the sensed audio signals. Phones carried by different individuals can serve as the spatially separated microphones.

A prerequisite to sound source localization is understanding the positions of the component audio sensors. GPS is one location technology that can be used. However, more accurate technologies are emerging. One is detailed in patent publication WO08/073,347. By this, or other technologies, relative locations of cell phones may be determined to within an accuracy of less than a meter (in some cases closer to a centimeter).

Such localization technologies can be used to identify the position of each cooperating phone in three spatial dimensions. Further refinement can derive from knowing the location and orientation of the sensor(s) on the phone body, and knowing the orientation of the phone. The former information is specific to each phone, and may be obtained from local or remote data storage. Sensors in the phone, such as accelerometers and magnetometers, can be used to provide the phone orientation information. Ultimately, a 6D pose for each microphone may be determined.

The phones then share this information with other phones. The phones can be programmed to broadcast time-stamped digital streams of audio as sensed by their microphones. (Data for several streams may be broadcast by a phone with several microphones.) Location information can also be broadcast by each phone, or one phone may discern the location of another using suitable technology, such as that detailed in WO08/073,347. The broadcasts can be by short range radio technologies, such as Bluetooth or Zigbee or 802.11. A service discovery protocol such as Bonjour can be used to exchange data between the phones, or another protocol can be used.

While MP3 compression is commonly used for audio compression, its use is not favored in the present circumstance. MP3 and the like represent audio as serial sets of frequency coefficients, per a sampling window. This sampling window is, in effect, a window of temporal uncertainty. This uncertainty limits the accuracy with which a sound source can be localized. In order for feature correlation to accurately be related to time delay, it is preferred that uncompressed audio, or compression that faithfully preserves temporal information (e.g., lossless data compression) be used.

In one embodiment, a first phone receives audio data sensed by and broadcast from one or more second phones, and—in conjunction with data sensed by its own microphone—judges the source direction of a sound. This determination may then be shared with other phones, so that they do not need to make their own determinations. The sound source location can be expressed as a compass direction from the first phone. Desirably, the location of the first phone is known to the others, so that the sound source localization information relative to the first phone can be related to the positions of the other phones.

In another arrangement, a dedicated device within an environment serves to collect audio streams from nearby sensors, makes sound source localization determinations, and broadcasts its findings to the participating phones. This functionality may be built into other infrastructure devices, such as lighting controllers, thermostats, etc.

Determining audio direction in two dimensions is sufficient for most applications. However, if the microphones (phones) are spaced in three dimensions (e.g., at different elevations), then sound source direction can be determined in three dimensions.

If the sensors are spaced by meters rather than centimeters (as is common in many applications, such as multiple microphones on a single phone), the source of a sound can be localized not just by its direction, but also by its distance. Using triangulation based on directional information, and knowing their own respective locations, two or more spatially-separated phones can determine the distance from each to the sound source. Distance and direction from a known phone location allows the position of the sound source to be determined. As before, this position information can be resolved in three dimensions, if the sensors are distributed in three dimensions. (Again, these calculations can be performed by one phone, using data from the other. The resulting information can then be shared.)

Linked Data

In accordance with another aspect of the present technology, Web 2.0 notions of data and resources (e.g., in connection with Linked Data) are used with tangible objects and/or related keyvector data, and associated information.

Linked data refers to arrangements promoted by Sir Tim Berners Lee for exposing, sharing and connecting data via de-referenceable URIs on the web. (See, e.g., T. B. Lee, Linked Data, www<dot>w3<dot>org/DesignIssues/LinkedData.html.)

Briefly, URIs are used to identify tangible objects and associated data objects. HTTP URIs are used so that these objects can be referred to and looked up ("de-refeerenced") by people and user agents. When a tangible object is de-referenced, useful information (e.g., structured metadata) about the tangible object is provided. This useful information desirably includes links to other, related URIs—to improve discovery of other related information and tangible objects.

A partial view of data maintained by a cloud-based registry can include:

| Subject | Predicate | Object |
|---|---|---|
| TangibleObject#HouseID6789 | Has_the_Color | Blue |
| TangibleObject#HouseID6789 | Has_the_Geolocation | 45.51N 122.67W |
| TangibleObject#HouseID6789 | Belongs_to_the_Neighborhood | Sellwood |
| TangibleObject#HouseID6789 | Belongs_to_the_City | Portland |
| TangibleObject#HouseID6789 | Belongs_to_the_Zip_Code | 97211 |
| TangibleObject#HouseID6789 | Belongs_to_the_Owner | Jane A. Doe |
| TangibleObject#HouseID6789 | Is_Physically_Adjacent_To | TangibleObject#HouseID6790 |
| ImageData#94D6BDFA623 | Was_Provided_From_Device | iPhone 3Gs DD69886 |
| ImageData#94D6BDFA623 | Was_Captured_at_Time | November 30, 2009, 8:32:16 pm |
| ImageData#94D6BDFA623 | Was_Captured_at_Place | 45.51N 122.67W |
| ImageData#94D6BDFA623 | Was_Captured_While_Facing | 5.3 degrees E of N |
| ImageData#94D6BDFA623 | Was_Produced_by_Algorithm | Canny |
| ImageData#94D6BDFA623 | Corresponds_to_Item | Barcode |
| ImageData#94D6BDFA623 | Corresponds_to_Item | Soup can |

RDF (Resource Description Framework) is commonly used to represent information about resources. RDF describes a resource (e.g., tangible object) as a number of triples, composed of a subject, predicate and object. These triples are sometimes termed assertions.

The subject of the triple is a URI identifying the described resource. The predicate indicates what kind of relation exists between the subject and object. The predicate is typically a URI as well—drawn from a standardized vocabulary relating to a particular domain. The object can be a literal value (e.g., a name or adjective), or it can be the URI of another resource that is somehow related to the subject.

Different knowledge representation languages can be used to express ontologies relating to tangible objects, and associated data. The Web Ontology language (OWL) is one, and uses a semantic model that provides compatibility with the RDF schema. SPARQL is a query language for use with RDF expressions—allowing a query to consist of triple patterns, together with conjunctions, disjunctions, and optional patterns.

According to this aspect of the present technology, items of data captured and produced by mobile devices are each assigned a unique and persistent identifier. These data include elemental keyvectors, segmented shapes, recognized objects, information obtained about these items, etc. Each of these data is enrolled in a cloud-based registry system, which also supports related routing functions. (The data objects, themselves, may also be pushed to the cloud for long term storage.) Related assertions concerning the data are provided to the registry from the mobile device. Thus, each data object known to the local device is instantiated via data in the cloud.

A user may sweep a camera, capturing imagery. All objects (and related data) gathered, processed and/or identified through such action are assigned identifiers, and persist in the cloud. A day or a year later, another user can make assertions against such objects (e.g., that a tree is a white oak, etc.). Even a quick camera glance at a particular place, at a particular time, is memorialized indefinitely in the cloud. Such content, in this elemental cloud-based form, can be an organizing construct for collaboration.

Naming of the data can be assigned by the cloud-based system. (The cloud based system can report the assigned names back to the originating mobile device.) Information identifying the data as known to the mobile device (e.g., clump ID, or UID, noted above) can be provided to the cloud-based registry, and can be memorialized in the cloud as another assertion about the data.

Thus, in this aspect, the mobile device provides data allowing the cloud-based registry to instantiate plural software objects (e.g., RDF triples) for each item of data the mobile device processes, and/or for each physical object or feature found in its camera's field of view. Numerous assertions can be made about each (I am Canny data; I am based on imagery captured at a certain place and time; I am a highly textured, blue object that is visible looking north from latitude X, longitude/Y, etc.).

Importantly, these attributes can be linked with data posted by other devices—allowing for the acquisition and discovery of new information not discernible by a user's device from available image data and context alone.

For example, John's phone may recognize a shape as a building, but not be able to discern its street address, or learn its tenants. Jane, however, may work in the building. Due to her particular context and history, information that her phone earlier provided to the registry in connection with building-related image data may be richer in information about the building, including information about its address and some tenants. By similarities in geolocation information and shape information, the building about which Jane's phone provided information can be identified as likely the same building about which John's phone provided information. (A new assertion can be added to the cloud registry, expressly relating Jane's building assertions with John's, and vice-versa.) If John's phone has requested the registry to do so (and if relevant privacy safeguards permit), the registry can send to John's phone the assertions about the building provided by Jane's phone. The underlying mechanism at work here may be regarded as mediated crowd-sourcing, wherein assertions are created within the policy and business-rule framework that participants subscribe too.

Locations (e.g., determined by place, and optionally also by time) that have a rich set of assertions associated with them provide for new discovery experiences. A mobile device can provide a simple assertion, such as GPS location and current time, as an entry point from which to start a search or discovery experience within the linked data, or other data repository.

It should also be noted that access or navigation of assertions in the cloud can be influenced by sensors on the mobile device. For example, John may be permitted to link to Jane's assertions regarding the building only if he is within a specific proximity of the building as determined by GPS or other sensors (e.g., 10 m, 30 m, 100 m, 300 m, etc.). This may be further limited to the case where John either needs to be stationary, or traveling at a walking pace as determined by GPS, accelerometers or other sensors (e.g., less than 100 feet, or 300 feet, per minute). Such restrictions based on data from sensors in the mobile device can reduce unwanted or less relevant assertions (e.g., spam, such as advertising), and provide some security against remote or drive-by (or fly-by) mining of data. (Various arrangements can be employed to combat spoofing of GPS or other sensor data.)

Similarly, assertions stored in the cloud may be accessed (or new assertions about subjects may be made) only when the two involved parties share some trait, such as proximity in geolocation, time, social network linkage, etc. (The latter can be demonstrated by reference to a social network data store, such as Facebook or LinkedIn, showing that John is socially linked to Jane, e.g., as friends.) Such use of geolocation and time parallels social conventions, i.e. when large groups of people gather, spontaneous interaction that occurs can be rewarding as there is a high likelihood that the members of the group have a common interest, trait, etc. Ability to access, and post, assertions, and the enablement of new discovery experiences based on the presence of others follows this model.

Location is a frequent clue that sets of image data are related. Others can be used as well.

Consider an elephant researcher. Known elephants (e.g., in a preserve) are commonly named, and are identified by facial features (including scars, wrinkles and tusks). The researcher's smart phone may submit facial feature vectors for an elephant to a university database, which exists to associate facial vectors with an elephant's name. However, when such facial vector information is submitted to the cloud-based registry, a greater wealth of information may be revealed, e.g., dates and locations of prior sightings, the names of other researchers who have viewed the elephant, etc. Again, once correspondence between data sets is discerned, this fact can be memorialized by the addition of further assertions to the registry.

It will be recognized that such cloud-based repositories of assertions about stimuli sensed by cameras, microphones and other sensors of mobile devices may quickly comprise enormous stores of globally useful information, especially when related with information in other linked data systems (a few of which are detailed at linkeddata<dot>org). Since the understanding expressed by the stored assertions reflects, in part, the profiles and histories of the individual users whose devices contribute such information, the knowledge base is particularly rich. (Google's index of the web may look small by comparison.)

(In connection with identification of tangible objects, a potentially useful vocabulary is the AKT (Advanced Knowledge Technologies) ontology. It has, as its top level, the class "Thing," under which are two sub-classes: "Tangible-Thing" and "Intangible-Thing." "Tangible-Thing" includes everything from software to sub-atomic particles, both real and imaginary (e.g., Mickey Mouse's car). "Tangible-Thing" has subclasses including "Location," "Geographical-Region," "Person," "Transportation-Device," and "Information-Bearing-Object." This vocabulary can be extended to provide identification for objects expected to be encountered in connection with the present technology.)

Augmented Space

One application of the present technology is a function that presents information on imagery (real or synthetic) concerning the night sky.

A user may point a smart phone at a particular point of the sky, and capture an image. The image may not, itself, be used for presentation on-screen, due to the difficulties of capturing starlight in a small handheld imaging device. However, geolocation, magnetometer and accelerometer data can be sampled to indicate the location from, and orientation at which, the user pointed the camera. Night sky databases, such as the Google Sky project (available through the Google Earth interface), can be consulted to obtain data corresponding to that portion of the key. The smart phone processor can then reproduce this data on the screen, e.g., directly from the Google service. Or it can overlay icons, baubles, or other graphical indicia at locations on the screen corresponding to the positions of stars in the pointed-to portion of the sky. Lines indicating the Greek (and/or Indian, Chinese, etc.) constellations can be drawn on the screen.

Although the stars themselves may not be visible in imagery captured by the camera, other local features may be apparent (trees, houses, etc.). Star and constellation data (icons, lines, names) can be displayed atop this actual imagery—showing where the stars are located relative to the visible surroundings. Such an application may also include provision for moving the stars, etc., through their apparent arcs, e.g., with a slider control allowing the user to change the displayed viewing time (to which the star positions correspond) forward and backward. The user may thus discover that the North Star will rise from behind a particular tree at a particular time this evening.

Other Comments

While this specification earlier noted its relation to the assignee's previous patent filings, it bears repeating. These disclosures should be read in concert and construed as a whole. Applicants intend that features in each disclosure be combined with features in the others. Thus, for example, the arrangements and details described in the present specification can be used in variant implementations of the systems and methods described in application Ser. Nos. 12/271,772 and 12/490,980, while the arrangements and details of those patent applications can be used in variant implementations of the systems and methods described in the present specification. Similarly for the other noted documents. Thus, it should be understood that the methods, elements and concepts disclosed in the present application be combined with the methods, elements and concepts detailed in those related applications. While some have been particularly detailed in the present specification, many have not—due to the large number of permutations and combinations. However, implementation of all such combinations is straightforward to the artisan from the provided teachings.

Having described and illustrated the principles of our inventive work with reference to illustrative features and examples, it will be recognized that the technology is not so limited.

For example, while reference has been made to mobile devices such as smart phones, it will be recognized that this technology finds utility with all manner of devices—both portable and fixed. PDAs, organizers, portable music players, desktop computers, laptop computers, tablet computers, netbooks, ultraportables, wearable computers, servers, etc., can all make use of the principles detailed herein. Particularly contemplated smart phones include the Apple iPhone, and smart phones following Google's Android specification (e.g., the G1 phone, manufactured for T-Mobile by HTC Corp., the Motorola Droid phone, and the Google Nexus phone). The term "smart phone" (or "cell phone") should be construed to encompass all such devices, even those that are not strictly-speaking cellular, nor telephones (e.g., the recently announced Apple iPad device).

(Details of the iPhone, including its touch interface, are provided in Apple's published patent application 20080174570.)

Similarly, this technology also can be implemented using face-worn apparatus, such as augmented reality (AR) glasses. Such glasses include display technology by which computer information can be viewed by the user—either overlaid on the scene in front of the user, or blocking that scene. Virtual reality goggles are an example of such apparatus. Exemplary technology is detailed in patent documents U.S. Pat. No. 7,397,607 and 20050195128. Commercial offerings include the Vuzix iWear VR920, the Naturalpoint Trackir 5, and the ezVision X4 Video Glasses by ezGear. An upcoming alternative is AR contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometer, camera(s), projector(s), GPS, etc.

Further out, features such as laser range finding (LIDAR) may become standard on phones (and related devices), and be employed in conjunction with the present technology.

While the detailed technology made frequent reference to baubles, other graphical icons—not necessarily serving the purpose of baubles in the detailed arrangements, can be employed, e.g., in connection with user interfaces.

The specification detailed various arrangements for limiting the baubles placed on the user's screen, such as a verbosity control, scoring arrangements, etc. In some embodiments it is helpful to provide a non-programmable, fixed constraint (e.g., thirty baubles), so as to prevent a virus-based Denial of Service attack from overwhelming the screen with baubles, to the point of rendering the interface useless.

While baubles as described in this specification are most generally associated with image and audio features, they can serve other purposes as well. For example, they can indicate to the user which tasks are presently operating, and provide other status information.

It should be noted that commercial implementations of the present technology will doubtless employ user interfaces wholly different than those presented in this specification. Those detailed in this document are props to aid in explanation of associated technologies (although in many instances they are believed to be inventive in their own rights). In like fashion, the detailed user modalities of interaction are illustrative only; commercial implementations will doubtless employ others.

The design of smart phones and other computer devices referenced in this disclosure is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a microphone, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc).

More generally, the processes and system components detailed in this specification may be implemented as instructions for computing devices, including general purpose processor instructions for a variety of programmable processors, including microprocessors, graphics processing units (GPUs, such as the nVidia Tegra APX 2600), digital signal processors (e.g., the Texas Instruments TMS320 series devices), etc. These instructions may be implemented as software, firmware, etc. These instructions can also be implemented to various forms of processor circuitry, including programmable logic devices, FPGAs (e.g., Xilinx Virtex series devices), FPOAs (e.g., PicoChip brand devices), and application specific circuits—including digital, analog and mixed analog/digital circuitry. Execution of the instructions can be distributed among processors and/or made parallel across processors within a device or across a network of devices. Transformation of content signal data may also be distributed among different processor and memory devices. References to "processors" or "modules" (such as a Fourier transform processor, or an FFT module, etc.) should be understood to refer to functionality, rather than requiring a particular form of implementation.

Software instructions for implementing the detailed functionality can be readily authored by artisans, from the descriptions provided herein, e.g., written in C, C++, Visual Basic, Java, Python, Tcl, Perl, Scheme, Ruby, etc. Mobile devices according to the present technology can include software modules for performing the different functions and acts. Known artificial intelligence systems and techniques can be employed to make the inferences, conclusions, and other determinations noted above.

Commonly, each device includes operating system software that provides interfaces to hardware resources and general purpose functions, and also includes application software which can be selectively invoked to perform particular tasks desired by a user. Known browser software, communications software, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

In addition to storing the software, the various memory components referenced above can be used as data stores for the various information utilized by the present technology (e.g., context information, tables, thresholds, etc.).

This technology can be implemented in various different environments. One is Android, an open source operating system available from Google, which runs on a Linux kernel. Android applications are commonly written in Java, and run in their own virtual machines.

Instead of structuring applications as large, monolithic blocks of code, Android applications are typically implemented as collections of "activities" and "services," which can be selectively loaded as needed. In one implementation of the present technology, only the most basic activities/services are loaded. Then, as needed, others are started. These can send messages to each other, e.g., waking one another up. So if one activity looks for ellipses, it can activate a face detector activity if a promising ellipse is located.

Android activities and services (and also Android's broadcast receivers) are activated by "intent objects" that convey messages (e.g., requesting a service, such as generating a particular type of keyvector). By this construct, code can lie dormant until certain conditions arise. A face detector may need an ellipse to start. It lies idle until an ellipse is found, at which time it starts into action.

For sharing information between activities and services (e.g., serving in the role of the blackboard noted earlier), Android makes use of "content providers." These serve to store and retrieve data, and make it accessible to all applications.

Android SDKs, and associated documentation, are available at developer<dot>android<dot>com/index.html.

Different of the functionality described in this specification can be implemented on different devices. For example, in a system in which a smart phone communicates with a server at a remote service provider, different tasks can be performed exclusively by one device or the other, or execution can be distributed between the devices. Extraction of barcode, or eigenvalue, data from imagery are but two examples of such tasks. Thus, it should be understood that description of an operation as being performed by a particular device (e.g., a smart phone) is not limiting but exemplary; performance of the operation by another device (e.g., a remote server, or the cloud), or shared between devices, is also expressly contemplated. (Moreover, more than two devices may commonly be employed. E.g., a service provider may refer some tasks, such as image search, object segmentation, and/or image classification, to servers dedicated to such tasks.)

In like fashion, description of data being stored on a particular device is also exemplary; data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in a task—such as contributing data from a local geography; see in this regard U.S. Pat. No. 7,254,406 to Beros.)

Similarly, while certain functions have been detailed as being performed by certain modules, agents, processes, etc., in other implementations such functions can be performed by other of such entities, or otherwise (or dispensed with altogether).

Reference is sometimes made to "recognition agents," and sometimes to "operations," while other times to "functions," and sometimes to "applications" or "services" or "modules" or "tasks" or "stages," etc. In different software development environments these terms may have different particular meanings. In the present specification, however, these terms are generally used interchangeably.

As noted, many functions can be implemented by a sequential operation of plural component stages. Such functions may be regarded as multi-stage (cascaded) classifiers, in which the later stages only consider regions or values that have been processed the earlier stages. For many functions of this type, there can be a threshold or similar judgment that examines the output from one stage, and only activates the next stage if a criterion is met. (The barcode decoder, which triggered only if a parameter output by a preceding stage had a value in excess of 15,000, is one example of this type.)

In many embodiments, the functions performed by various components, as well as their inputs and outputs, are specified or published (e.g., by the components) in the form of standardized metadata, so that same can be identified, such as by the dispatch process. The XML-based WSDL standard can be used in some embodiments. (See, e.g., Web Services Description Language (WSDL) Version 2.0 Part 1: Core Language, W3C, June, 2007.) An extension of WSDL, termed WSDL-S, extends WSDL to include semantic elements that improve reusability by, among other features, facilitating the composition of services. (An alternative semantic-capable standard is the Ontology Web Language for Services: OWL-S.) For communicating with cloud-based service providers, the XML-based Simple Object Access Protocol (SOAP) can be utilized—commonly as a foundation layer of a web services protocol stack. (Other service-based technologies, such as Jini, Common Object Request Broker Architecture (CORBA), Representational State Transfer (REST) and Microsoft's Windows Communication Foundation (WCF) are also suitable.)

Orchestration of web services can be accomplished using the Web Service Business Process Execution Language 2.0 (WS-BPEL 2.0). Choreography can employ W3C's Web Service Choreography Description Language (WS-CDL). JBoss's jBPM product is an open source platform adapted for use with both WM-BPEL 2.0 and WS-CDL. Active Endpoints offers an open source solution for WS-BPEL 2.0 under the name ActiveBPEL; pi4SOA on SourceForge is an open-source implementation of WS-CDL. Security for web services can be provided through use of the WS-Security (WSS) communications protocol, a popular Java library implementation of which is Apache's WSS4J.

Certain implementations of the present technology make use of existing libraries of image processing functions (software). These include CMVision (from Carnegie Mellon University—particularly good at color image segmentation), ImageJ (a freely distributable package of Java routines developed by the National Institutes of Health; see, e.g., en<dot>Wikipedia<dot>org/wiki/ImageJ), and OpenCV (a package developed by Intel; see, e.g., en<dot>Wikipedia<dot>org/wiki/OpenCV, and the book Bradski, Learning OpenCV, O'Reilly, 2008). Well regarded commercial vision library packages include Vision Pro, by Cognex, and the Matrox Imaging Library.

The refresh rate at which repeated operations are undertaken depends on circumstances, including the computing context (battery capacity, other processing demands, etc.). Some image processing operations may be undertaken for every captured frame, or nearly so (e.g., checking whether a lens cap or other obstruction blocks the camera's view). Others may be undertaken every third frame, tenth frame, thirtieth frame, hundredth frame, etc. Or these operations may be triggered by time, e.g., every tenth second, half second, full second, three seconds, etc. Or they may be triggered by change in the captured scene, etc. Different operations may have different refresh rates—with simple operations repeated frequently, and complex operations less so.

As noted earlier, image data (or data based on image data), may be referred to the cloud for analysis. In some arrangements this is done in lieu of local device processing (or after certain local device processing has been done). Sometimes, however, such data can be passed to the cloud and processed both there and in the local device simultaneously. The cost of cloud processing is usually small, so the primary cost may be one of bandwidth. If bandwidth is available, there may be little reason not to send data to the cloud, even if it is also processed locally. In some cases the local device may return results faster; in others the cloud may win the race. By using both, simultaneously, the user can always be provided the quicker of the two responses. (And, as noted, if local processing bogs down or becomes unpromising, it may be curtailed. Meanwhile, the cloud process may continue to churn—perhaps yielding results that the local device never provides.) Additionally, a cloud service provider such as Google may glean other benefits from access to the cloud-based data processing opportunity, e.g., learning details of a geographical environment about which its data stores are relatively impoverished (subject, of course, to appropriate privacy safeguards).

Sometimes local image processing may be suspended, and resumed later. One such instance is if a telephone call is made, or received; the device may prefer to apply its resources exclusively to serving the phone call. The phone may also have a UI control by which the user can expressly direct the phone to pause image processing. In some such cases, relevant data is transferred to the cloud, which continues the processing, and returns the results to the phone.

If local image processing does not yield prompt, satisfactory results, and the subject of the imagery continues to be of interest to the user (or if the user does not indicate otherwise), the imagery may be referred to the cloud for more exhaustive, and lengthy, analysis. A bookmark or the like may be stored on the smart phone, allowing the user to check back and learn the results of such further analysis. Or the user can be alerted if such further analysis reaches an actionable conclusion.

It will be understood that decision-making involved in operation of the detailed technology can be implemented in a number of different ways. One is by scoring. Parameters associated with relevant inputs for different alternatives are provided, and are combined, weighted and summed in different combinations, e.g., in accordance with a polynomial equation. The alternative with the maximum (or minimum) score is chosen, and action is taken based on that alternative. In other arrangements, rules-based engines can be employed. Such arrangements are implemented by reference to stored data expressing conditional rules, e.g., IF (condition(s)), THEN action(s), etc. Adaptive models can also be employed, in which rules evolve, e.g., based on historical patterns of usage. Heuristic approaches can also be employed. The artisan will recognize that still other decision processes may be suited to particular circumstances.

Artisans implementing systems according to the present specification are presumed to be familiar with the various technologies involved.

An emerging field of radio technology is termed "cognitive radio." Viewed through that lens, the present technology might be entitled "cognitive imaging." Adapting a description from cognitive radio, the field of cognitive imaging may be regarded as "The point in which wireless imaging devices and related networks are sufficiently computationally intelligent in the extraction of imaging constructs in support of semantic extraction and computer-to-computer communications to detect user imaging needs as a function of user context, and to provide imaging services wirelessly in a fashion most appropriate to those needs."

While this disclosure has detailed particular ordering of acts and particular combinations of elements in the illustrative embodiments, it will be recognized that other methods may re-order acts (possibly omitting some and adding others), and other combinations may omit some elements and add others, etc.

Although disclosed as complete systems, sub-combinations of the detailed arrangements are also separately contemplated.

Reference was made to the internet in certain embodiments. In other embodiments, other networks—including private networks of computers—can be employed also, or instead.

While detailed primarily in the context of systems that perform image capture and processing, corresponding arrangements are equally applicable to systems that capture and process audio, or other stimuli (e.g., touch, smell, motion, orientation, temperature, humidity, barometric pressure, trace chemicals, etc.). Some embodiments can respond to plural different types of stimuli.

Figure 18:
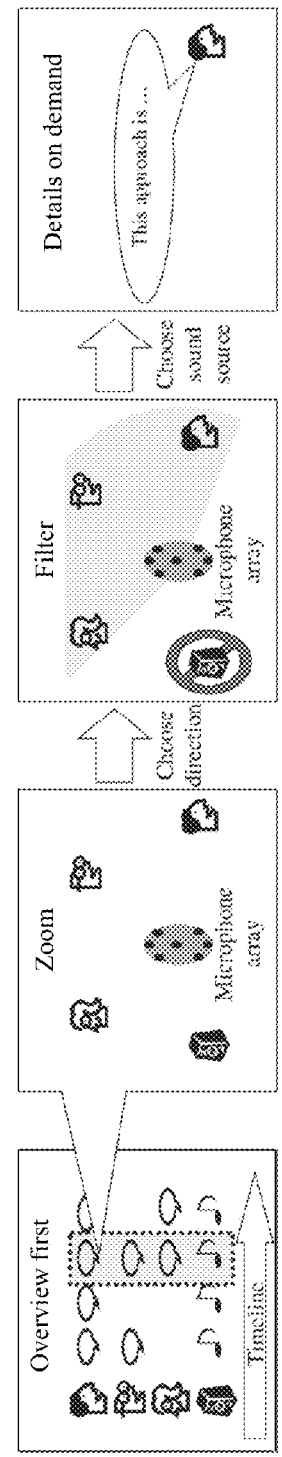
FIG. 18 shows aspects of an audio-based implementation.

Consider FIG. 18, which shows aspects of an audio scene analyzer (from Kubota, et al, Design and Implementation of 3D Auditory Scene Visualizer—Towards Auditory Awareness With Face Tracking, $10^{th}$ IEEE Multimedia Symp., pp. 468-476, 2008). The Kubota system captures 3D sounds with a microphone array, localizes and separates sounds, and recognizes the separated sounds by speech recognition techniques. Java visualization software presents a number of displays. The first box in FIG. 18 shows speech events from people, and background music, along a timeline. The second box shows placement of the sound sources relative to the microphone array at a selected time point. The third box allows directional filtering so as to remove undesired sound sources. The fourth box allows selection of a particular speaker, and a transcription of that speaker's words. User interaction with these displays is achieved by face tracking, e.g., moving closer to the screen and towards a desired speaker allows the user to choose and filter that speaker's speech.

In the context of the present technology, a system can provide a common visualization of a 3D auditory scene using arrangements analogous to the Spatial Model component for camera-based systems. Baubles can be placed on identified audio sources as a function of position, time and/or class. The user may be engaged in segmenting the audio sources through interaction with the system—enabling the user to isolate those sounds they want more information on. Information can be provided, for example, about background music, identifying speakers, locating the source of audio, classifying by genre, etc. Existing cloud-based services (e.g., popular music recognition services, such as Shazam and Midomi) can be adapted to provide some of the audio identification/classification in such arrangements.

In a university lecture context, a student's mobile device may capture the voice of the professor, and some incidental side conversations of nearby students. Distracted by colorful details of the side conversation, the student may have momentarily missed part of the lecture. Sweeping a finger across the phone screen, the student goes back about 15 seconds in time (e.g., 5 seconds per frame), to a screen showing various face baubles. Recognizing the face bauble corresponding to the professor, the student taps it, and transcribed text from only the professor's voice is then presented (and/or audibly rendered)—allowing the student to catch what had been missed. (To speed review, the rendering may skip over, or shorten, pauses in the professor's speech. Shortening may be by a percentage, e.g., 50%, or it can trim every pause longer than 0.5 seconds down to 0.5 seconds.) Or, the student may simply swipe the professor's bauble to the top of the screen—storing a bookmark to that location in stored audio data of the speaker, the contents of which the student can then review later.

To perform sound source localization, two or more microphones are desirably used. The Nexus phone handset by Google, and the Droid phone handset by Motorola, are equipped with two microphones, albeit not for this purpose.

(The multiple microphones are employed in active noise-cancelling arrangements.) Thus, these handsets can be adapted to perform sound source location (as well as sound source recognition) through use of appropriate software in conjunction with the second audio sensor. (The second audio sensor in each is a micromechanical MEMs microphone. Such devices are becoming increasingly common in phone handsets. Illustrative multi-microphone sound source location systems are detailed in publications US20080082326 and US20050117754).

Additional information on sound source recognition is found, e.g., in Martin, Sound Source Recognition: A Theory and Computational Model, PhD Thesis, MIT, June, 1999. Additional information on sound source location is found, e.g., in publications US20040240680 and US20080181430. Such technology can be combined with facial recognition and/or speech recognition technologies in certain embodiments.

While the detailed embodiments are described as being relatively general purpose, others may be specialized to serve particular purposes or knowledge domains. For example, one such system may be tailored to birdwatchers, with a suite of image and sound recognition agents particularly crafted to identify birds and their calls, and to update crowdsourced databases of bird sightings, etc. Another system may provide a collection of diverse but specialized functionality. For example, a device may include a Digimarc-provided recognition agent to read printed digital watermarks, a LinkMe Mobile recognition agent to read barcodes, an AlpVision recognition agent to decode authentication markings from packaging, a Shazam- or Gracenote music recognition agent to identify songs, a Nielsen recognition agent to recognize television broadcasts, an Arbitron recognition agent to identify radio broadcasts, etc., etc. (In connection with recognized media content, such a system can also provide other functionality, such as detailed in application Ser. Nos. 12/271,772 and 12/490,980.)

The detailed technology can be used in conjunction with video data obtained from the web, such as User Generated Content (UGC) obtained from YouTube<dot>com. By arrangements like that detailed herein, the content of video may be discerned, so that appropriate ad/content pairings can be determined, and other enhancements to the users' experience can be offered. In particular, applicants contemplate that the technology disclosed herein can be used to enhance and extend the UGC-related systems detailed in published patent applications 20080208849 and 20080228733 (Digimarc), 20080165960 (TagStory), 20080162228 (Trivid), 20080178302 and 20080059211 (Attributor), 20080109369 (Google), 20080249961 (Nielsen), and 20080209502 (MovieLabs).

It will be recognized that the detailed processing of content signals (e.g., image signals, audio signals, etc.) includes the transformation of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed in various ways and for various purposes during processing, producing various data structure representations of the signals and related information. In turn, the data structure signals in memory are transformed for manipulation during searching, sorting, reading, writing and retrieval. The signals are also transformed for capture, transfer, storage, and output via display or audio transducer (e.g., speakers).

The reader will note that different terms are sometimes used when referring to similar or identical components, processes, etc. This is due, in part, to development of this technology over time, and with involvement of several people.

Elements and teachings within the different embodiments disclosed in the present specification are also meant to be exchanged and combined.

References to FFT5 should be understood to also include inverse FFT5, and related transforms (e.g., DFT, DCT, their respective inverses, etc.).

Reference has been made to SIFT which, as detailed in certain of the incorporated-by-reference documents, performs a pattern-matching operation based on scale-invariant features. SIFT data serves, essentially, as a fingerprint by which an object can be recognized.

In similar fashion, data posted to the blackboard (or other shared data structure) can also serve as a fingerprint—comprising visually-significant information characterizing an image or scene, by which it may be recognized. Likewise with a video sequence, which can yield a blackboard comprised of a collection of data, both temporal and experiential, about stimuli the user device is sensing. Or the blackboard data in such instances can be further distilled, by applying a fingerprinting algorithm to it, generating a generally unique set of identification data by which the recently captured stimuli may be identified and matched to other patterns of stimuli. (Picasso long ago foresaw that a temporal, spatially jumbled set of image elements provides knowledge relevant to a scene, by which its essence may be understood.)

As noted, artificial intelligence techniques can play an important role in embodiments of the present technology. A recent entrant into the field is the Alpha product by Wolfram Research. Alpha computes answers and visualizations responsive to structured input, by reference to a knowledge base of curated data. Information gleaned from arrangements detailed herein can be presented to the Wolfram Alpha product to provide responsive information back to the user. In some embodiments, the user is involved in this submission of information, such as by structuring a query from terms and other primitives gleaned by the system, by selecting from among a menu of different queries composed by the system, etc. In other arrangements, this is handled by the system. Additionally, or alternatively, responsive information from the Alpha system can be provided as input to other systems, such as Google, to identify further responsive information. Wolfram's patent publications 20080066052 and 20080250347 further detail aspects of the Alpha technology, which is now available as an iPhone app.

Another adjunct technology is Google Voice, which offers a number of improvements to traditional telephone systems. Such features can be used in conjunction with the present technology.

For example, the voice to text transcription services offered by Google Voice can be employed to capture ambient audio from the speaker's environment using the microphone in the user's smart phone, and generate corresponding digital data (e.g., ASCII information). The system can submit such data to services such as Google or Wolfram Alpha to obtain related information, which the system can then provide back to the user—either by a screen display, by voice (e.g., by known text-to-speech systems), or otherwise. Similarly, the speech recognition afforded by Google Voice can be used to provide a conversational user interface to smart phone devices, by which features of the technology detailed herein can be selectively invoked and controlled by spoken words.

In another aspect, when a user captures content (audio or visual) with a smart phone device, and a system employing the presently disclosed technology returns a response, the response information can be converted from text to speech, and delivered to the user, e.g., to the user's voicemail account in Google Voice. The user can access this data repository from any phone, or from any computer. The stored voice mail can be reviewed in its audible form, or the user can elect instead to review a textual counterpart, e.g., presented on a smart phone or computer screen.

(Aspects of the Google Voice technology are detailed in patent application 20080259918.)

Audio information can sometimes aid in understanding visual information. Different environments are characterized by different sound phenomena, which can serve as clues about the environment. Tire noise and engine sounds may characterize an in-vehicle or roadside environment. The drone of an HVAC blower, or keyboard sounds, may characterize an office environment. Bird and wind-in-tree noises may signal the outdoors. Band-limited, compander-processed, rarely-silent audio may suggest that a television is playing nearby—perhaps in a home. The recurrent sound of breaking water waves suggests a location at a beach.

Such audio location clues can serve various roles in connection with visual image processing. For example, they can help identify objects in the visual environment. If captured in the presence of office-like sounds, an image depicting a seemingly-cylindrical object is more likely to be a coffee mug or water bottle than a tree trunk. A roundish object in a beach-audio environment may be a tire, but more likely is a seashell.

Utilization of such information can take myriad forms. One particular implementation seeks to establish associations between particular objects that may be recognized, and different (audio) locations. A limited set of audio locations may be identified, e.g., indoors or outdoors, or beach/car/office/home/indeterminate. Different objects can then be given scores indicating the relative likelihood of being found in such environment (e.g., in a range of 0-10). Such disambiguation data can be kept in a data structure, such as a publicly-accessible database on the internet (cloud). Here's a simple example, for the indoors/outdoors case:

|  | Indoors Score | Outdoors Score |
| --- | --- | --- |
| Seashell | 6 | 8 |
| Telephone | 10 | 2 |
| Tire | 4 | 5 |
| Tree | 3 | 10 |
| Water bottle | 10 | 6 |
| ... | ... | ... |

(Note that the indoors and outdoors scores are not necessarily inversely related; some objects may be of a sort likely found in both environments.)

If a cylindrical-seeming object is discerned in an image frame, and—from available image analysis—is ambiguous as to whether it is a tree trunk or water bottle, reference can then be made to the disambiguation data, and information about the auditory environment. If the auditory environment has attributes of "outdoors" (and/or is lacking attributes of being "indoors"), then the outdoor disambiguation scores for candidate objects "tree" and "water bottle" are checked. The outdoor score for "tree" is 10; the outdoor score for "water bottle" is 8, so the toss-up is decided in favor of "tree."

Recognition of auditory environments can be performed using techniques and analysis that are audio counterparts to the image analysis arrangements described elsewhere in this specification. Or other techniques can be used. Often, however, recognition of auditory environments is uncertain. This uncertainty can be factored into use of the disambiguation scores.

In the example just-given, the audio captured from the environment may have some features associated with indoor environments, and some features associated with outdoor environments. Audio analysis may thus conclude with a fuzzy outcome, e.g., 60% chance it is outdoors, 40% chance it is indoors. (These percentages may add to 100%, but need not; in some cases they may sum to more or less.) These assessments can be used to influence assessment of the object disambiguation scores.

Although there are many such approaches, one is to weigh the object disambiguation scores for the candidate objects with the audio environment uncertainty by simple multiplication, such as shown by the following table:

|  | Indoors score * Indoors probability (40%) | Outdoors score * Outdoors probability (60%) |
| --- | --- | --- |
| Tree | 3 * 0.4 = 1.2 | 10 * 0.6 = 6 |
| Water bottle | 10 * 0.4 = 4 | 6 * 0.6 = 3.6 |

In this case, the disambiguation data is useful in identifying the object, even through the auditory environment is not known with a high degree of certainty.

In the example just-given, the visual analysis—alone—suggested two candidate identifications with equal probabilities: it could be a tree, it could be a water bottle. Often the visual analysis will determine several different possible identifications for an object—with one more probable than the others. The most probable identification may be used as the final identification. However, the concepts noted herein can help refine such identification—sometimes leading to a different final result.

Consider a visual analysis that concludes that the depicted object is 40% likely to be a water bottle and 30% likely to be a tree (e.g., based on lack of visual texture on the cylindrical shape). This assessment can be cascaded with the calculations noted above—by a further multiplication with the object probability determined by visual analysis alone:

|  | Indoors score * Indoors probability (40%) * Object probability | Outdoors score * Outdoors probability (60%) * Object probability |
| --- | --- | --- |
| Tree (30%) | 3 * 0.4 * 0.3 = 0.36 | 10 * 0.6 * 0.3 = 1.8 |
| Water bottle (40%) | 10 * 0.4 * 0.4 = 1.6 | 6 * 0.6 * .4 = 1.44 |

In this case, the object may be identified as a tree (1.8 is the highest score)—even though image analysis alone concluded the shape was most likely a water bottle.

These examples are somewhat simplistic in order to illustrate the principles at work; in actual practice more complex mathematical and logical operations will doubtless be used.

While these examples have simply shown two alternative object identifications, in actual implementation, identification of one type of object from a field of many possible alternatives can similarly be performed.

Nothing has yet been said about compiling the disambiguation data, e.g., associating different objects with different environments. While this can be a large undertaking, there are a number of alternative approaches.

Consider video content sites such as YouTube, and image content sites such as Flickr. A server can download still and video image files from such sources, and apply known image analysis techniques to identify certain objects shown within each—even though many objects may go unrecognized. Each file can be further analyzed to visually guess a type of environment in which the objects are found (e.g., indoors/outdoors; beach/office/etc.) Even if only a small percentage of videos/images give useful information (e.g., identifying a bed and a desk in one indoors video; identifying a flower in an outdoor photo, etc.), and even if some of the analysis is incorrect, in the aggregate, a statistically useful selection of information can be generated in such manner.

Note that in the arrangement just-discussed, the environment may be classified by reference to visual information alone. Walls indicate an indoor environment; trees indicate an outdoor environment, etc. Sound may form part of the data mining, but this is not necessary. In other embodiments, a similar arrangement can alternatively—or additionally—employ sound analysis for content and environment characterization.

YouTube, Flickr and other content sites also include descriptive metadata (e.g., keywords, geolocation information, etc.), which can also be mined for information about the depicted imagery, or to otherwise aid in recognizing the depicted objects (e.g., deciding between possible object identifications). Earlier referenced documents, including PCT/US09/54358, detail a variety of such arrangements.

Audio information can also be used to help decide which types of further image processing operations should be undertaken (i.e., beyond a routine set of operations). If the audio suggests an office environment, this may suggest that text OCR-related operations might be relevant. The device may thus undertake such operations whereas, if in another audio environment (e.g., outdoors), the device may not have undertaken such operations.

Additional associations between objects and their typical environments may be gleaned by natural language processing of encyclopedias (e.g., Wikipedia) and other texts. As noted elsewhere, U.S. Pat. No. 7,383,169 describes how dictionaries and other large works of language can be processed by NLP techniques to compile lexical knowledge bases that serve as formidable sources of such "common sense" information about the world. By such techniques a system can associate, e.g., the subject "mushroom" with the environment "forest" (and/or "supermarket"); "starfish" with "ocean," etc. Another resource is Cyc—an artificial intelligence project that has assembled a large ontology and knowledge base of common sense knowledge. (OpenCyc is available under an open source license.)

Compiling the environmental disambiguation data can also make use of human involvement. Videos and imagery can be presented to human viewers for assessment, such as through use of Amazon's Mechanical Turk Service. Many people, especially in developing countries, are willing to provide subjective analysis of imagery for pay, e.g., identifying depicted objects, and the environments in which they are found.

The same techniques can be employed to associate different sounds with different environments (ribbetting frogs with ponds; aircraft engines with airports; etc.). Speech recognition—such as performed by Google Voice, Dragon Naturally Speaking, ViaVoice, etc. (including Mechanical Turk), can also be employed to recognize the environment, or an environmental attribute. ("Please return your seat backs and trays to their upright and locked positions . . . " indicates an airplane environment.)

While the particular arrangement just-detailed used audio information to disambiguate alternative object identifications, audio information can be used in many other different ways in connection with image analysis. For example, rather than a data structure identifying the scored likelihoods of encountering different objects in different environments, the audio may be used simply to select one of several different glossaries (or assemble a glossary) of SIFT features (SIFT is discussed elsewhere). If the audio comprises beach noises, the object glossary can comprise only SIFT features for objects found near beaches (seashells, not staplers). The universe of candidate objects looked-for by the image analysis system may thus be constrained in accordance with the audio stimulus.

Audio information can thus be employed in a great many ways in aid of image analysis—depending on the requirements of particular applications; the foregoing are just a few.

Just as audio stimulus can help inform analysis/understanding of imagery, visual stimulus can help inform analysis/understanding of audio. If the camera senses bright sunlight, this suggests an outdoors environment, and analysis of captured audio may thus proceed with reference to a library of reference data corresponding to the outdoors. If the camera senses regularly flickering illumination with a color spectrum that is characteristic of fluorescent lighting, an indoor environment may be assumed. If an image frame is captured with blue across the top, and highly textured features below, an outdoor context may be assumed. Analysis of audio captured in these circumstances can make use of such information. E.g., a low level background noise isn't an HVAC blower—it is likely wind; the loud clicking isn't keyboard noises; it is more likely a chiding squirrel.

Just as YouTube and Flickr provide sources for image information, there are many freely available sources for audio information on the internet. One, again, is YouTube. There are also online libraries of sound effects (e.g., soundeffect<dot>com, sounddog<dot>com, soundsnap<dot>com, etc) that offer free, low fidelity counterparts of their retail offerings. These are generally presented in well-organized taxonomies, e.g., Nature:Ocean:SurfGullsAndShipHorn; Weather:Rain:HardRainOnConcreteInTheCity; Transportation:Train:CrowdedTrainInterior, etc. The descriptive text data can be mined to determine the associated environment.

Although the foregoing discussion focused on the interplay between audio and visual stimulus, devices and methods according to the present technology can employ such principles with all manner of stimuli and sensed data: temperature, location, magnetic field, smell, trace chemical sensing, etc.

Regarding magnetic field, it will be recognized that smart phones are increasingly being provided with magnetometers, e.g., for electronic compass purposes. Such devices are quite sensitive—since they need to be responsive to the subtle magnetic field of the Earth (e.g., 30-60 microTeslas, 0.3-0.6 Gauss). Emitters of modulated magnetic fields can be used to signal to a phone's magnetometer, e.g., to communicate information to the phone.

The Apple iPhone 3Gs has a 3-axis Hall-effect magnetometer (understood to be manufactured by Asahi Kasei), which uses solid state circuitry to produce a voltage proportional to the applied magnetic field, and polarity. The current device is not optimized for high speed data communication, although future implementations may prioritize such feature. Nonetheless, useful data rates may readily be achieved. Unlike audio and visual input, the phone does not need to be oriented in a particular direction in order to optimize receipt of magnetic input (due to the 3D sensor). Nor does the phone even need to be removed from the user's pocket or purse.

In one arrangement, a retail store may have a visual promotional display that includes a concealed electromagnet driven with a time-varying signal. This time-varying signal serves to send data to nearby phones. The data may be of any type. It can provide information to a magnetometer-driven smart phone application that presents a coupon usable by recipients, e.g., for one dollar off the promoted item.

The magnetic field data may simply alert the phone to the availability of related information sent through a different communication medium. In a rudimentary application, the magnetic field data can simply signal the mobile device to turn on a specified input component, e.g., BlueTooth, NFC, WiFi, infrared, camera, microphone, etc. The magnetic field data can also provide key, channel, or other information useful with that medium.

In another arrangement, different products (or shelf-mounted devices associated with different products) may emit different magnetic data signals. The user selects from among the competing transmissions by moving the smart phone close to a particular product. Since the magnetic field falls off in exponential proportion to the distance from the emitter, it is possible for the phone to distinguish the strongest (closest) signal from the others.

In still another arrangement, a shelf-mounted emitter is not normally active, but becomes active in response to sensing a user, or a user intention. It may include a button or a motion sensor, which activates the magnetic emitter for five-fifteen seconds. Or it may include a photocell responsive to a change in illumination (brighter or darker). The user may present the phone's illuminated screen to the photocell (or shadow it by hand), causing the magnetic emitter to start a five second broadcast. Etc.

Once activated, the magnetic field can be utilized to inform the user about how to utilize other sensors that need to be positioned or aimed in order to be used, e.g., such as cameras, NFC, or microphones. The inherent directionality and sensitivity to distance make the magnetic field data useful in establishing the target's direction, and distance (e.g., for pointing and focusing a camera). For example, the emitter can create a coordinate system that has a package at a known location (e.g., the origin), providing ground-truth data for the mobile device. Combining this with the (commonly present) mobile device accelerometers, enables accurate pose estimation.

A variety of applications for reading barcodes or other machine readable data from products, and triggering responses based thereon, have been made available for smart phones (and are known from the patent literature, e.g., US20010011233, US20010044824, US20020080396, US20020102966, U.S. Pat. No. 6,311,214, U.S. Pat. No. 6,448,979, U.S. Pat. No. 6,491,217, and U.S. Pat. No. 6,636,249). The same arrangements can be effected using magnetically sensed information, using a smart phone's magnetometer.

In other embodiments, the magnetic field may be used in connection with providing micro-directions. For example, within a store, the magnetic signal from an emitter can convey micro-directions to a mobile device user, e.g., "Go to aisle 7, look up to your left for product X, now on sale for $Y, and with $2 additional discount to the first 3 people to capture a picture of the item" (or of a related promotional display).

A related application provides directions to particular products within a store. The user can key-in, or speak, the names of desired products, which are transmitted to a store computer using any of various signaling technologies. The computer identifies the locations of the desired products within the store, and formulates direction data to guide the user. The directions may be conveyed to the mobile device magnetically, or otherwise. A magnetic emitter, or a network of several emitters, helps in guiding the user to the desired products.

For example, an emitter at the desired product can serve as a homing beacon. Each emitter may transmit data in frames, or packets, each including a product identifier. The original directions provided to the user (e.g., go left to find aisle 7, then halfway down on your right) can also provide the store's product identifiers for the products desired by the user. The user's mobile device can use these identifiers to "tune" into the magnetic emissions from the desired products. A compass, or other such UI, can help the user find the precise location of the product within the general area indicated by the directions. As the user finds each desired product, the mobile device may no longer tune to emissions corresponding to that product.

The aisles and other locations in the store may have their own respective magnetic emitters. The directions provided to the user can be of the "turn by turn" variety popularized by auto navigation systems. (Such navigation technologies can be employed in other embodiments as well.) The mobile device can track the user's progress through the directions by sensing the emitters from the various waypoints along the route, and prompt the user about next step(s). In turn, the emitters may sense proximity of the mobile device, such as by Bluetooth or other signaling, and adapt the data they signal in accord with the user and the user's position.

To serve multiple users, the transmissions from certain networks of emitters (e.g., navigational emitters, rather than product-identifying emitters) can be time-division multiplexed, sending data in packets or frames, each of which includes an identifier indicating an intended recipient. This identifier can be provided to the user in response to the request for directions, and allows the user's device to distinguish transmissions intended for that device from others.

Data from such emitters can also be frequency-division multiplexed, e.g., emitting a high frequency data signal for one application, and a low frequency data signal for another.

The magnetic signal can be modulated using any known arrangement including, but not limited to, frequency-, amplitude-, minimum- or phase-shift keying, quadrature amplitude modulation, continuous phase modulation, pulse position modulation, trellis modulation, chirp- or direct sequence-spread spectrum, etc. Different forward error correction coding schemes (e.g., turbo, Reed-Solomon, BCH) can be employed to assure accurate, robust, data transmission. To aid in distinguishing signals from different emitters, the modulation domain can be divided between the different emitters, or classes or emitters, in a manner analogous to the sharing of spectrum by different radio stations.

The mobile device can be provided with a user interface especially adapted for using the device's magnetometer for the applications detailed herein. It may be akin to familiar WiFi user interfaces—presenting the user with information about available channels, and allowing the user to specify channels to utilize, and/or channels to avoid. In the applications detailed above, the UI may allow the user to specify what emitters to tune to, or what data to listen for—ignoring others.

Reference was made to touchscreen interfaces—a form of gesture interface. Another form of gesture interface that can be used in embodiments of the present technology operates by sensing movement of a smart phone—by tracking movement of features within captured imagery. Further information on such gestural interfaces is detailed in Digimarc's U.S. Pat. No. 6,947,571. Gestural techniques can be employed whenever user input is to be provided to the system.

Looking further ahead, user interfaces responsive to facial expressions (e.g., blinking, etc) and/or biometric signals detected from the user (e.g., brain waves, or EEGs) can also be employed. Such arrangements are increasingly well known; some are detailed in patent documents 20010056225, 20020077534, 20070185697, 20080218472 and 20090214060. The phone's camera system (and auxiliary cloud resources) can be employed to recognize such inputs, and control operation accordingly.

The present assignee has an extensive history in content identification technologies, including digital watermarking and fingerprint-based techniques. These technologies have important roles in certain visual queries.

Watermarking, for example, is the only container-independent technology available to identify discrete media/physical objects within distribution networks. It is widely deployed: essentially all of the television and radio in the United States is digitally watermarked, as are uncountable songs, motion pictures, and printed documents.

By providing an indication of object identity as an intrinsic part of the object itself, digital watermarks facilitate mobile device-object interaction based on an object's identity.

Technology for encoding/decoding watermarks is detailed, e.g., in Digimarc's U.S. Pat. Nos. 6,614,914 and 6,122,403; in Nielsen's U.S. Pat. Nos. 6,968,564 and 7,006,555; and in Arbitron's U.S. Pat. Nos. 5,450,490, 5,764,763, 6,862,355, and 6,845,360.

Digimarc has various other patent filings relevant to the present subject matter. See, e.g., patent publications 20070156726, 20080049971, and 20070266252.

Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 7,516,074 (Auditude), and U.S. Pat. Nos. 6,990,453 and 7,359,889 (both Shazam). Examples of image/video fingerprinting are detailed in U.S. Pat. No. 7,020,304 (Digimarc), U.S. Pat. No. 7,486,827 (Seiko-Epson), 20070253594 (Vobile), 20080317278 (Thomson), and 20020044659 (NEC).

Nokia acquired a Bay Area startup founded by Philipp Schloter that dealt in visual search technology (Pixto), and has continued work in that area in its "Point & Find" program. This work is detailed, e.g., in published patent applications 20070106721, 20080071749, 20080071750, 20080071770, 20080071988, 20080267504, 20080267521, 20080268876, 20080270378, 20090083237, 20090083275, and 20090094289. Features and teachings detailed in these documents are suitable for combination with the technologies and arrangements detailed in the present application, and vice versa.

In the interest of conciseness, the myriad variations and combinations of the described technology are not cataloged in this document. Applicants recognize and intend that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure without unduly lengthening this specification, applicants incorporate-by-reference the documents and patent disclosures referenced above. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

We claim:

1. A cell phone device comprising a processor, a memory, a display, and a microphone, the memory containing programming instructions that configure the device to perform acts including:
    capturing first and second items of audio content using said cell phone microphone;
    presenting, simultaneously on said display, a first graphical indicia corresponding to said first item of audio content, and a second graphical indicia corresponding to said second item of audio content;
    presenting a geographical map, with a plurality of third graphical indicia, on said display, at least one of the third graphical indicia corresponding to an item of audio content that was previously discovered, and being presented on the map at a position corresponding to a geographical location at which said previously discovered item of audio content was sampled, the map including plural roads; and
    responding to user selection of one of said indicia by presenting additional information about an audio item corresponding thereto.

2. The device of claim 1 in which the instructions further configure the device to present, on said map, a further indicia indicating a current location of a user of the device.

3. The device of claim 2 in which the instructions further configure the device to provide audio information sampled by the microphone to a content recognition module, and to present resultant metadata on the display.

4. The device of claim 3 in which the resultant metadata indicates that the audio information corresponds to a birdsong.

5. The device of claim 3 in which the resultant metadata indicates that the audio information corresponds to road noise.

6. The device of claim 3 in which the resultant metadata indicates that the audio information corresponds to music.

7. The device of claim 3 in which the resultant metadata indicates that the audio information corresponds to speech.

8. The device of claim 3 in which the instructions configure the device to present the map on a first area of the display, and to present the resultant metadata on a second area of the display different than the first area, the first and second areas being separated by a straight border.

9. The device of claim 1 in which the third graphical indicia are time-filtered, so that only indicia corresponding to discoveries within a specified previous interval of time are presented on the display.

10. The device of claim 9 in which said instructions perform said time-filtering.

11. The device of claim 1 in which the instructions further configure the device to present a graphical control by which a user can change an interval of time for which third indicia are presented on the display, wherein the user can employ said control to present more or less third indicia on the display.

12. The device of claim 1 in which the instructions further configure the device to filter the third indicia by a user-set criterion, so that only third indicia corresponding to said criterion are presented.

13. The device of claim 1 in which the instructions further configure the device to respond to user input to zoom-in on the display, changing a scale at which the map is presented.

14. The device of claim 1 wherein the first graphical indicia is different than the second graphical indicia.

15. The device of claim 1 wherein at least one of said third graphical indicia corresponds to an item of visual content that was previously discovered.

16. The device of claim 1, wherein the first graphical indicia comprises an image of a person.

17. The device of claim 1 wherein said instructions configure the device to simultaneously present said map and said first and second graphical indicia.

18. The device of claim 1 wherein said instructions enable the device to perform music recognition, and at least one of speaker recognition or speech recognition.

19. The device of claim 1 wherein said instructions enable the device to perform music recognition, speaker recognition, and speech recognition.

20. The device of claim 1 wherein said instructions configure the device to perform visual object recognition, wherein said map includes a third indicium corresponding to a recognized visual object.

21. A non-transitory computer readable medium containing software instructions that enable a cell phone device programmed thereby to perform acts including:
 presenting a geographical map and a plurality of first graphical indicia on a display of the cell phone, each of the first indicia representing a corresponding audio content recognition event, and being presented on the map at a position corresponding to a geographical location at which audio for the audio content recognition event was sampled;
 responding to user operation of a graphical time-based filter control to present on said map only graphical indicia corresponding to audio content recognition events that took place within a particular previous interval of time; and
 responding to user selection of one of said indicia by presenting additional information about the audio content recognition event.

22. A method comprising the acts:
 presenting a map on a display of a device, the map depicting plural roads and including indicia corresponding to plural audio content recognition events, each indicium being presented on the map at a position corresponding to a geographical location at which audio for the audio content recognition event was sampled, the map being presented in a first part of a user interface;
 responding to user selection of one of said indicia by presenting additional information about the corresponding audio content recognition event;
 sampling ambient audio with a microphone of the device, and providing associated information to a content recognition module; and
 presenting metadata received from said content recognition module on said display;
 wherein one or more of said acts is performed by a hardware processor of a cell phone; and
 wherein the audio content recognition event comprises (a) recognizing words spoken by a person whose speech was captured by said microphone; or (b) recognizing said person.

23. The method of claim 22 that further includes presenting a pin indicium on the map to indicate the metadata received from the content recognition module.

24. The method of claim 22 wherein said providing comprises sending said associated information to a content recognition module at a processing system remote from the device.

\* \* \* \* \*